Aug. 29, 1933.　　　W. S. GUBELMANN　　　1,924,653
CALCULATING MACHINE
Original Filed Sept. 19, 1912　　25 Sheets-Sheet 1

INVENTOR
William S. Gubelmann
ATTORNEYS

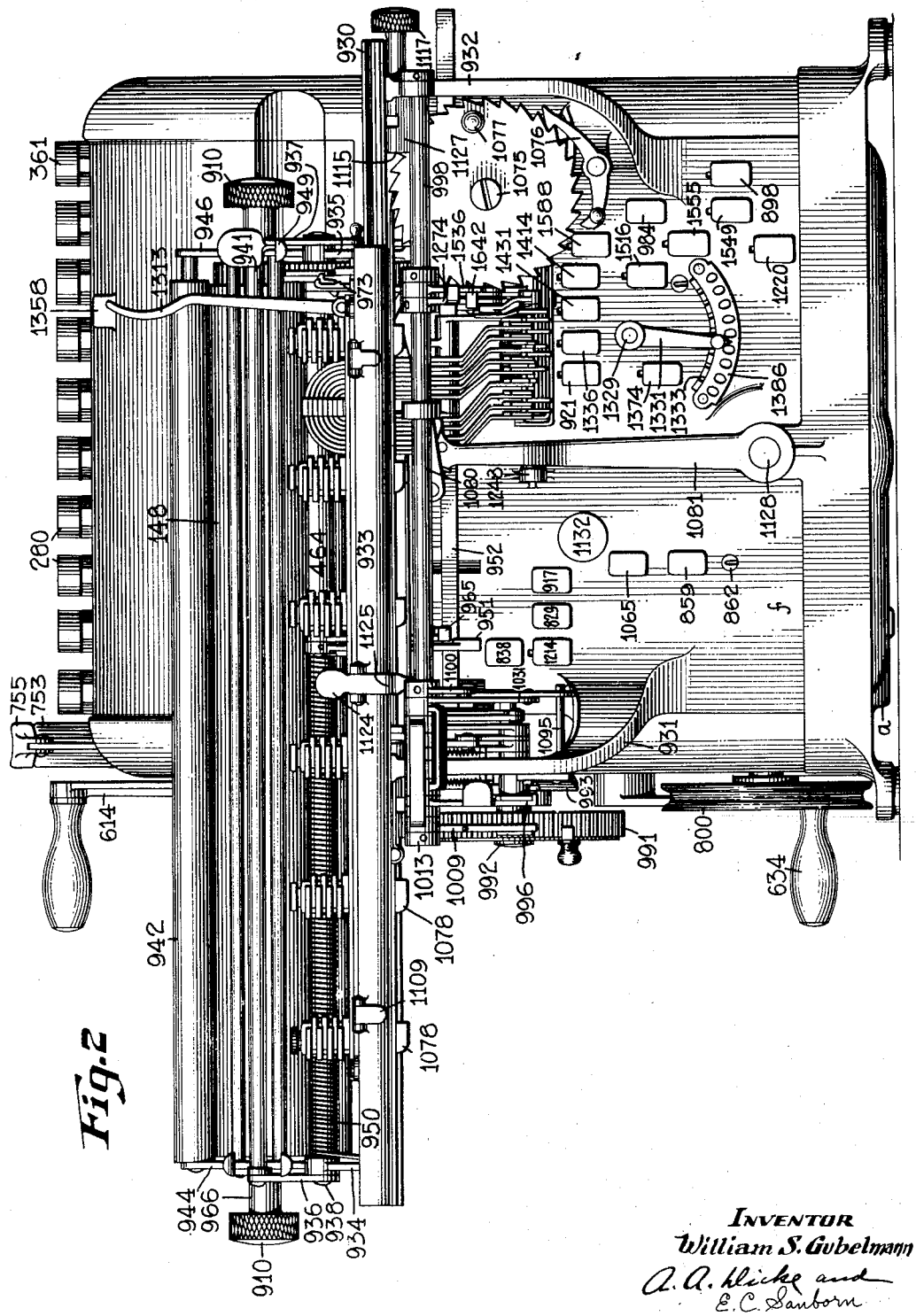

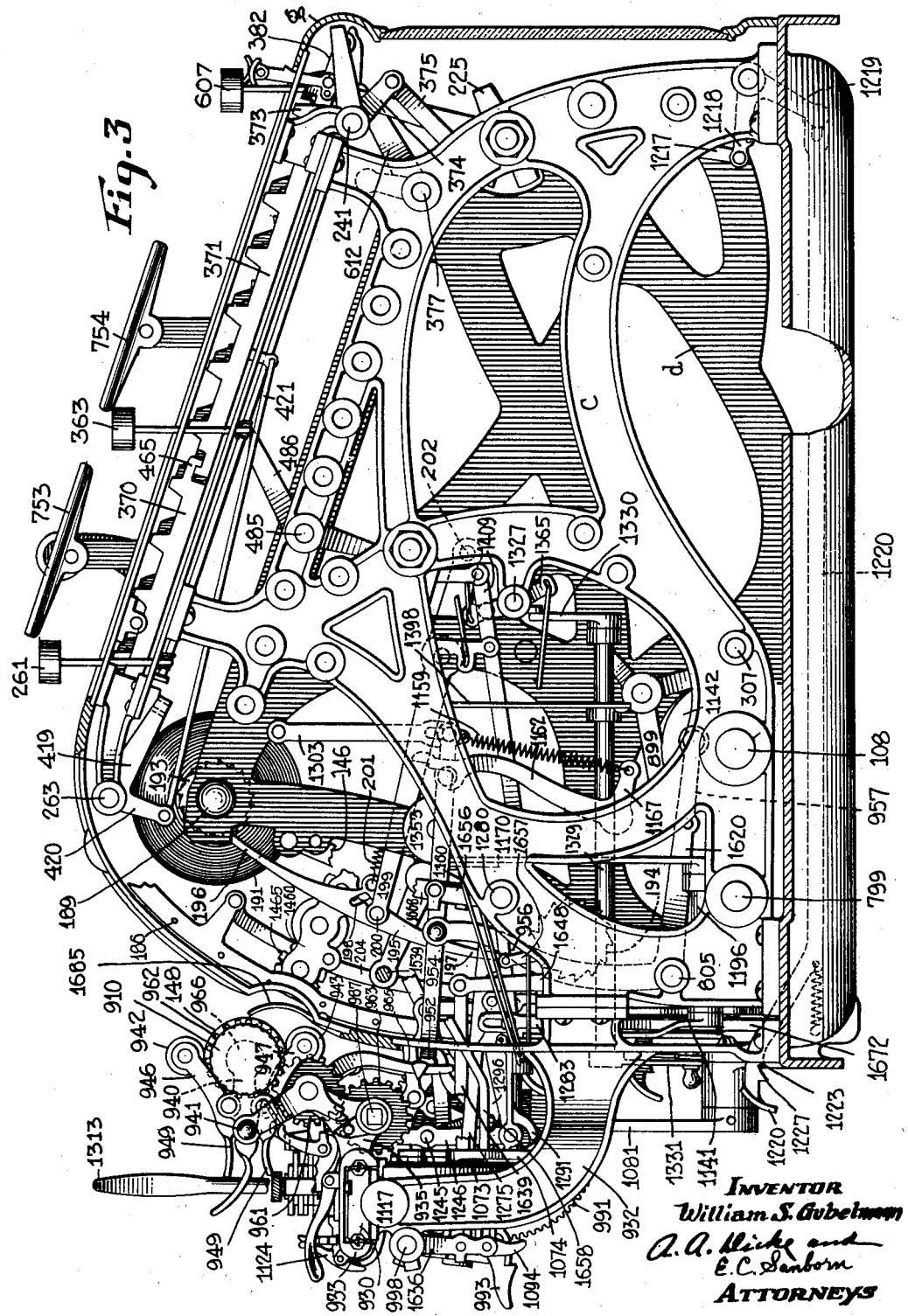

Aug. 29, 1933.  W. S. GUBELMANN  1,924,653
CALCULATING MACHINE
Original Filed Sept. 19, 1912   25 Sheets-Sheet 4
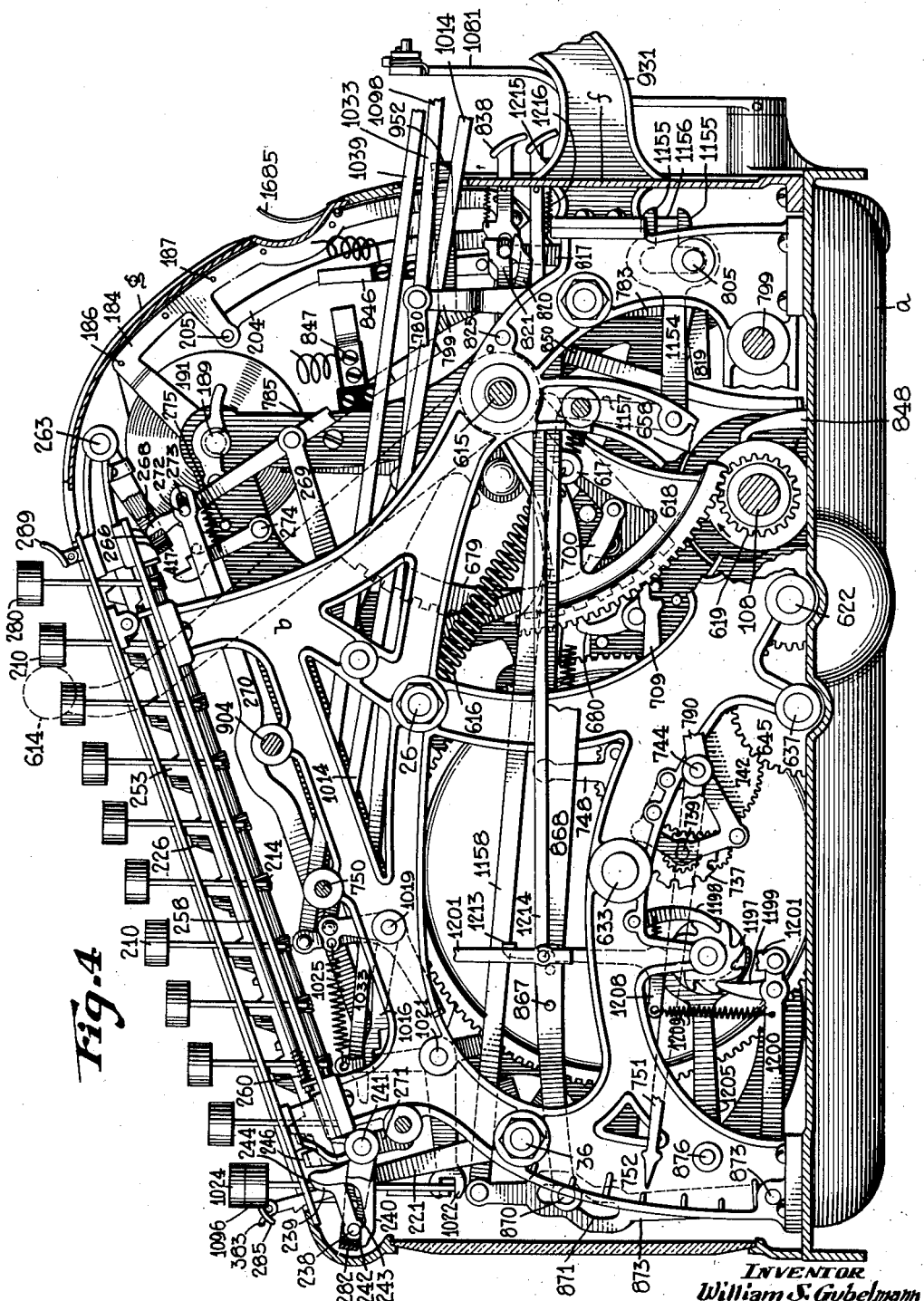

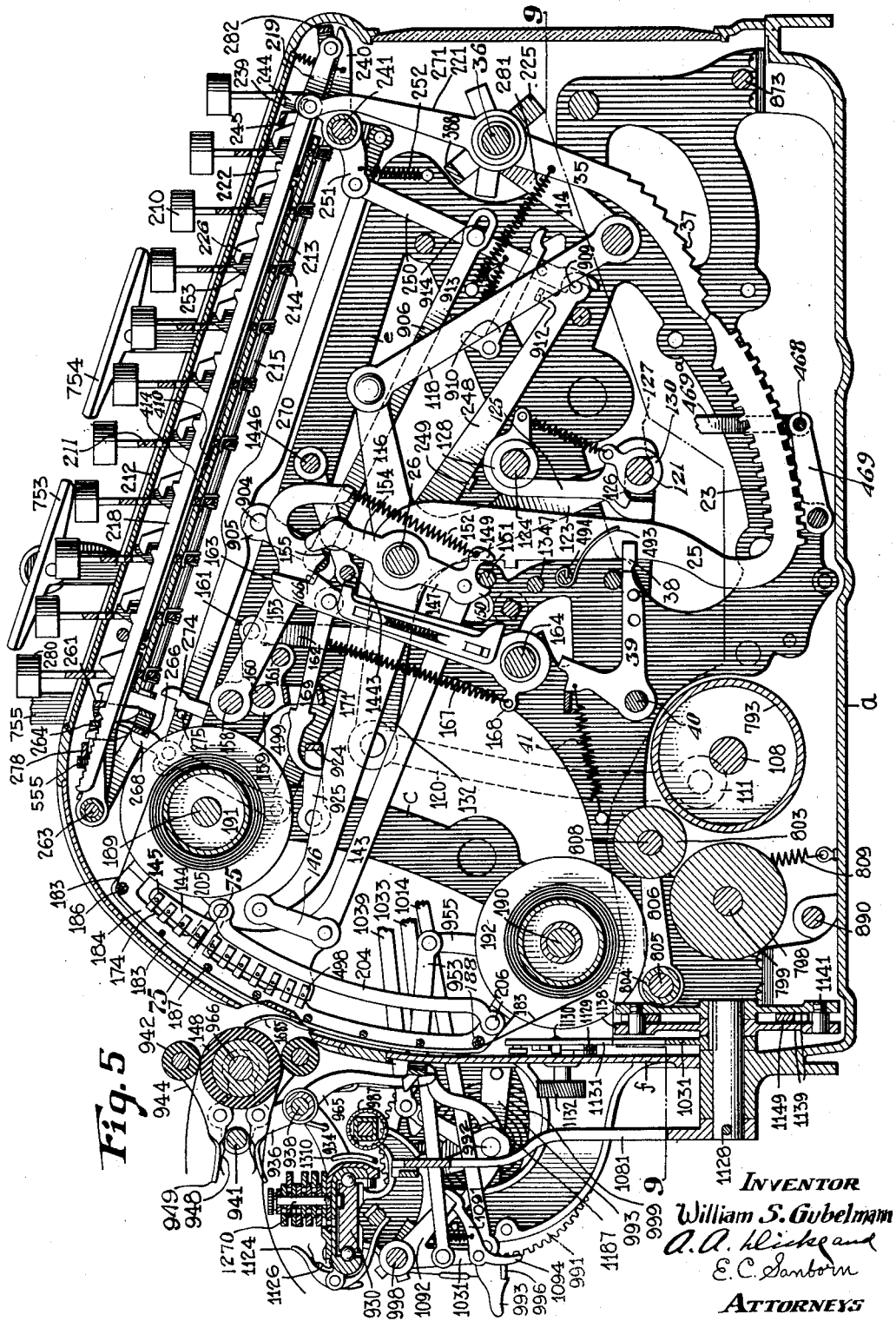

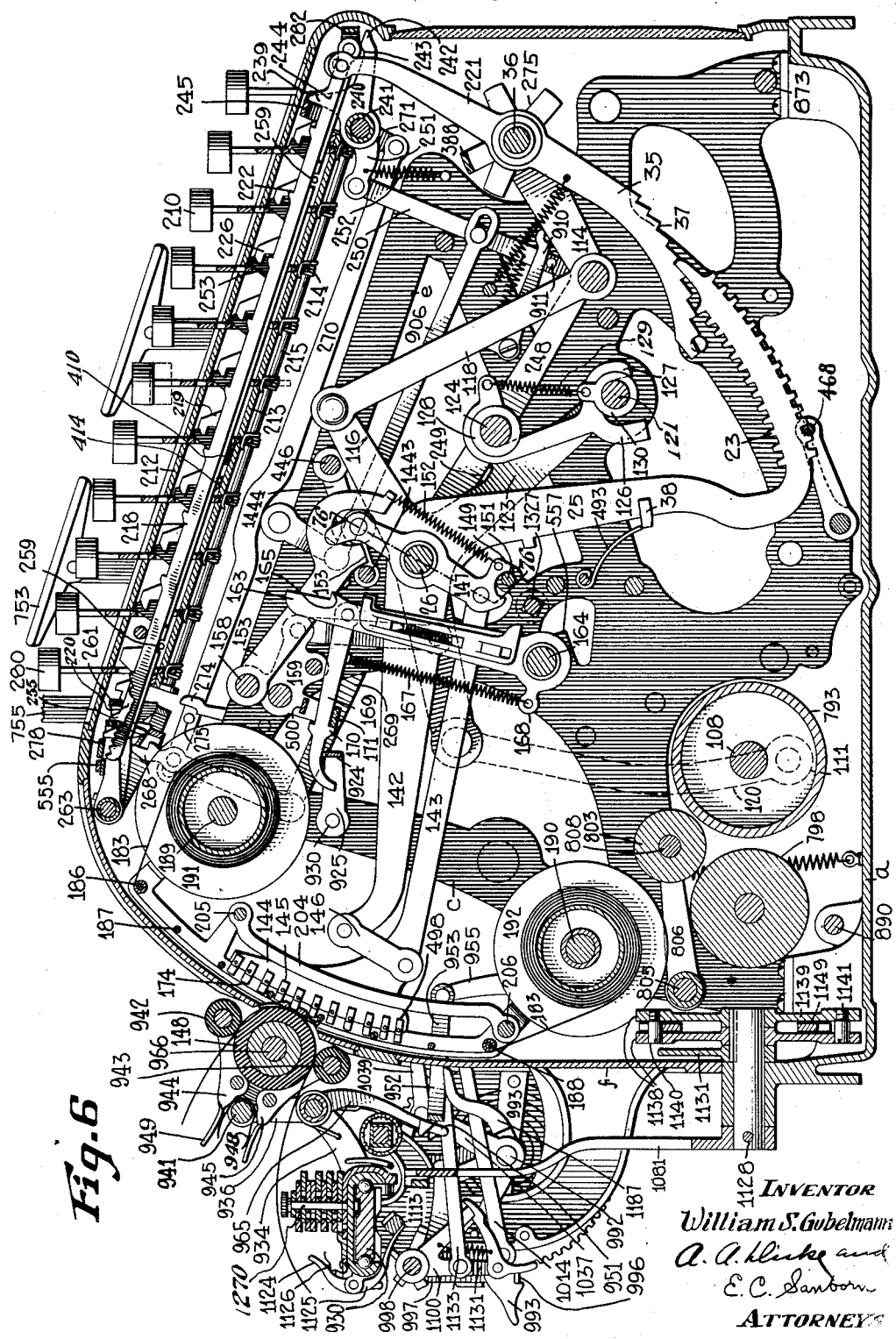

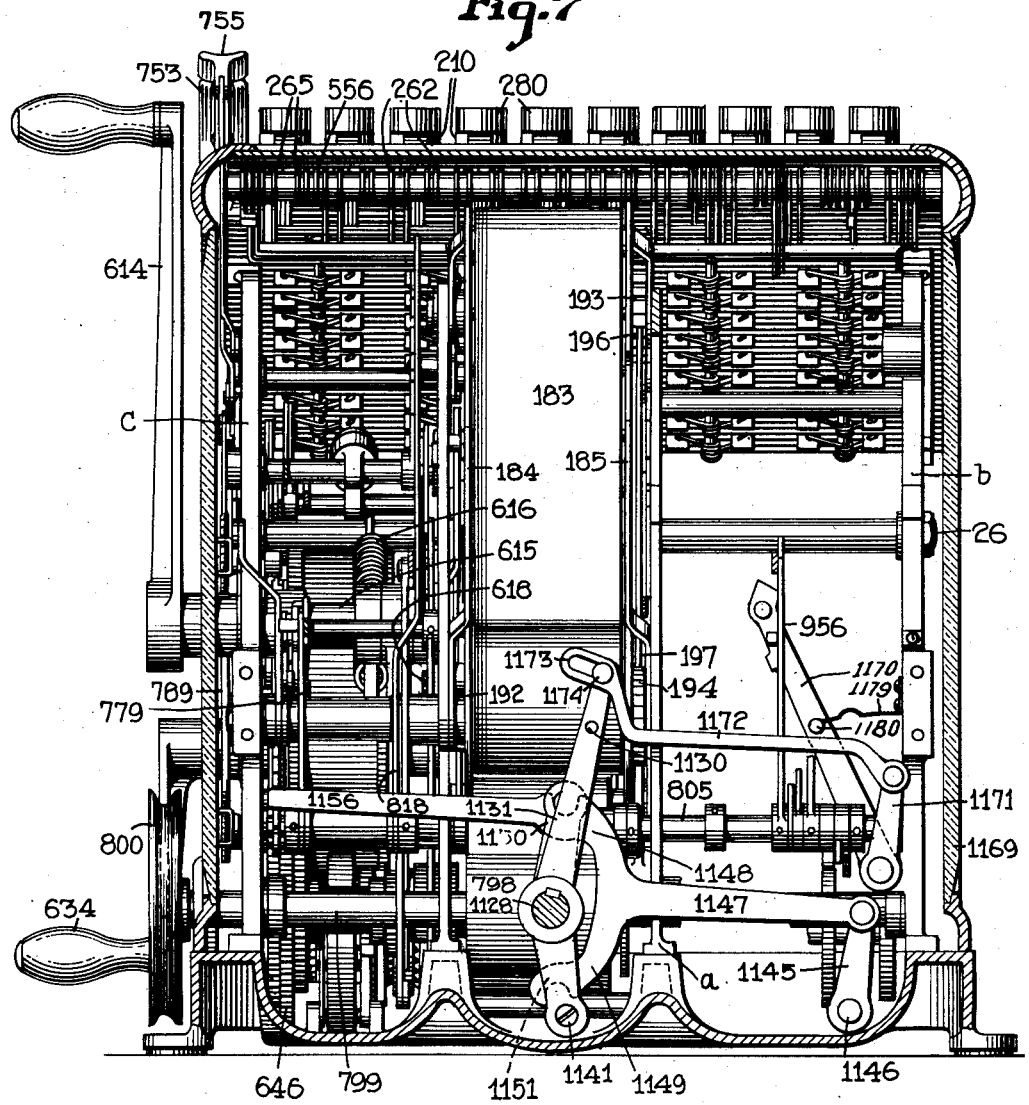

Aug. 29, 1933.   W. S. GUBELMANN   1,924,653
CALCULATING MACHINE
Original Filed Sept. 19, 1912   25 Sheets-Sheet 8
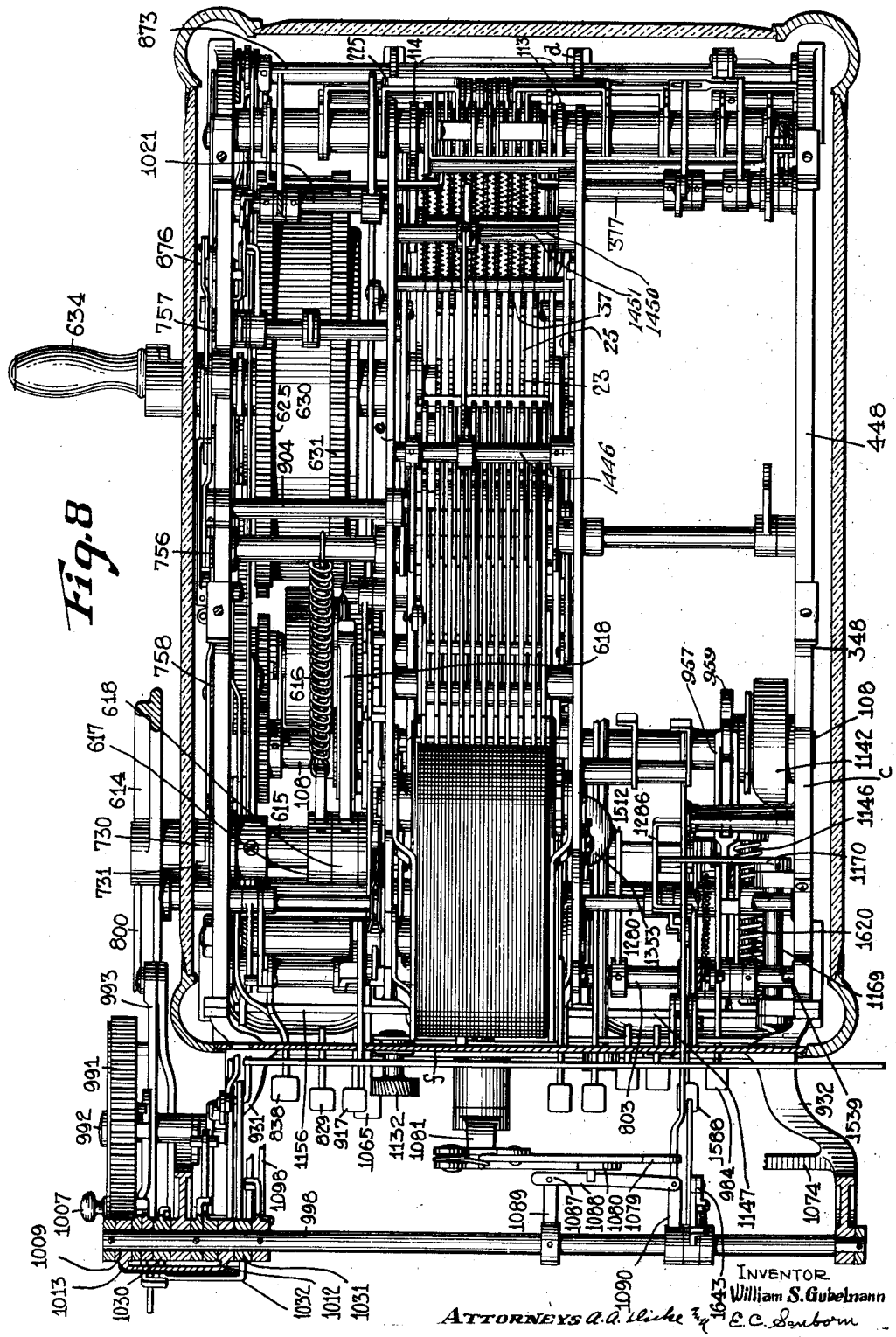

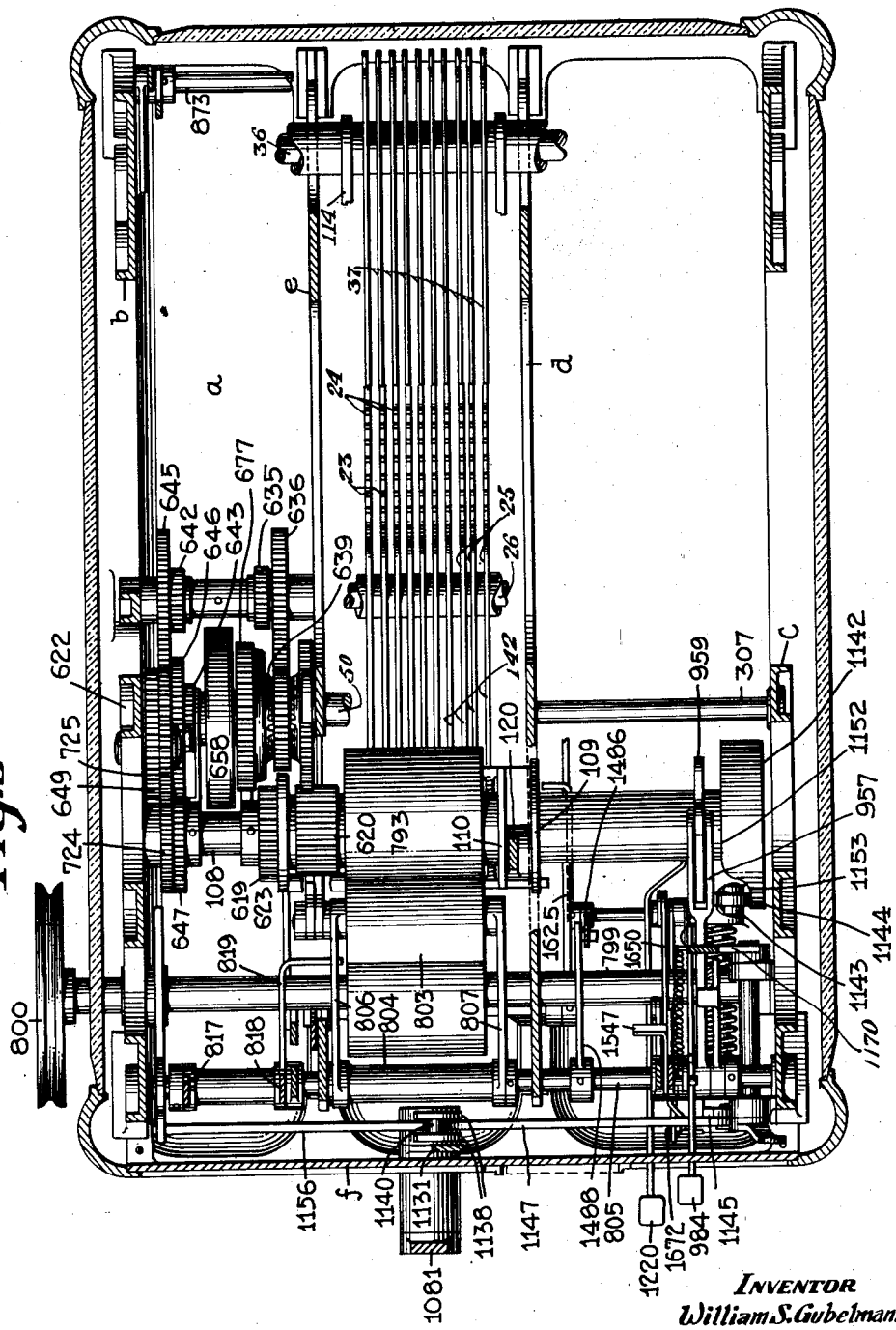

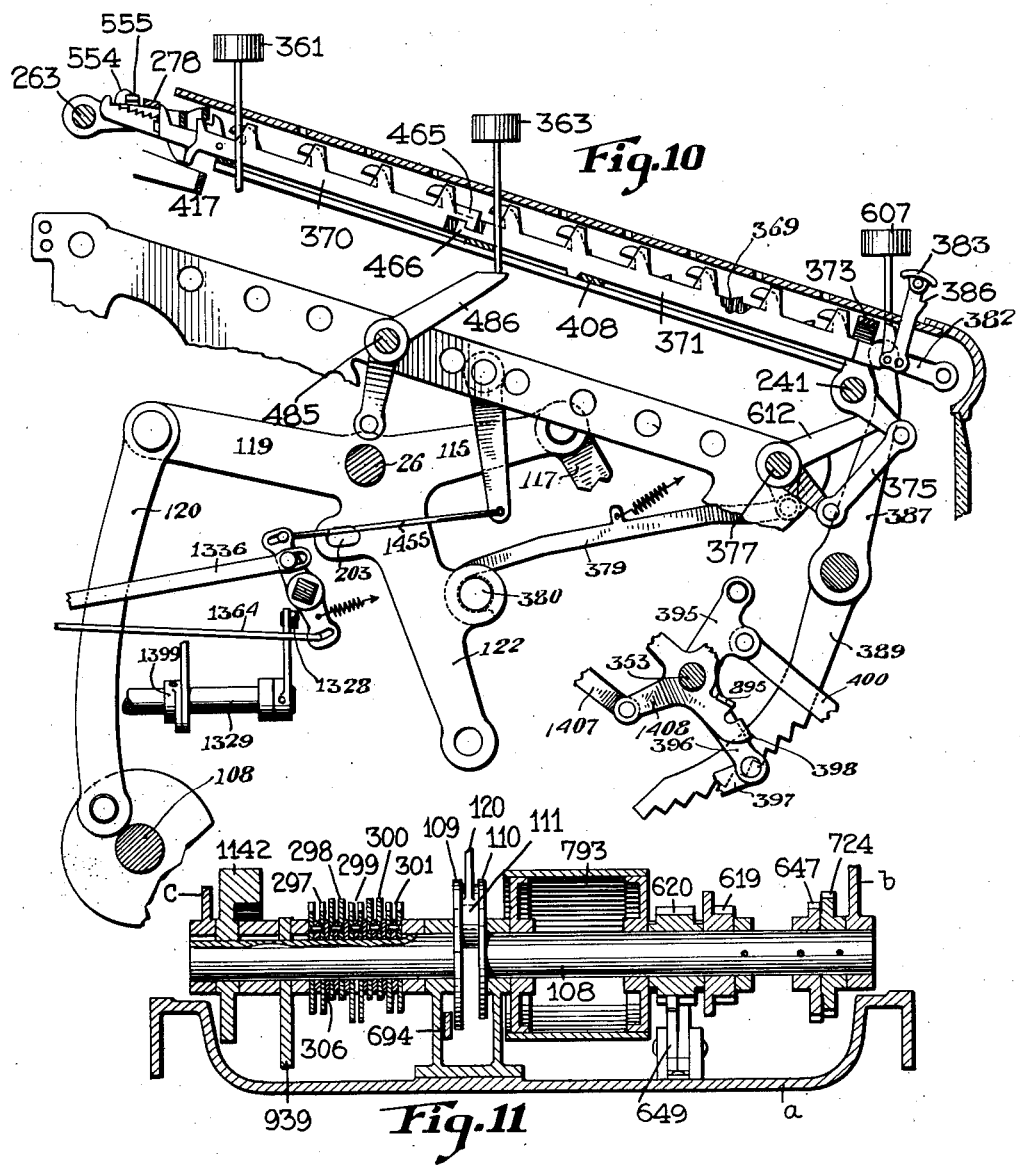
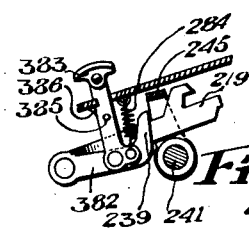

Aug. 29, 1933.     W. S. GUBELMANN     1,924,653
CALCULATING MACHINE
Original Filed Sept. 19, 1912    25 Sheets-Sheet 11
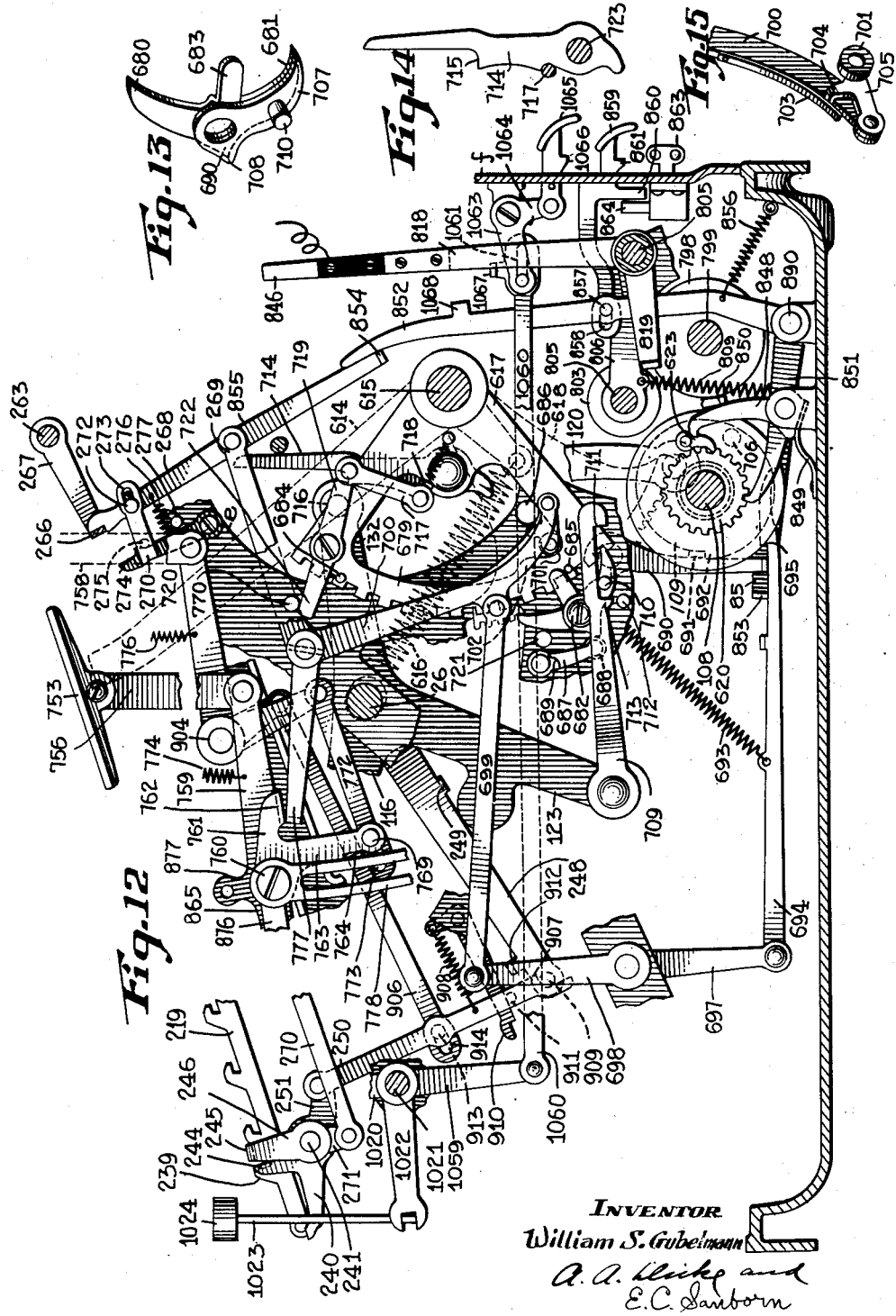

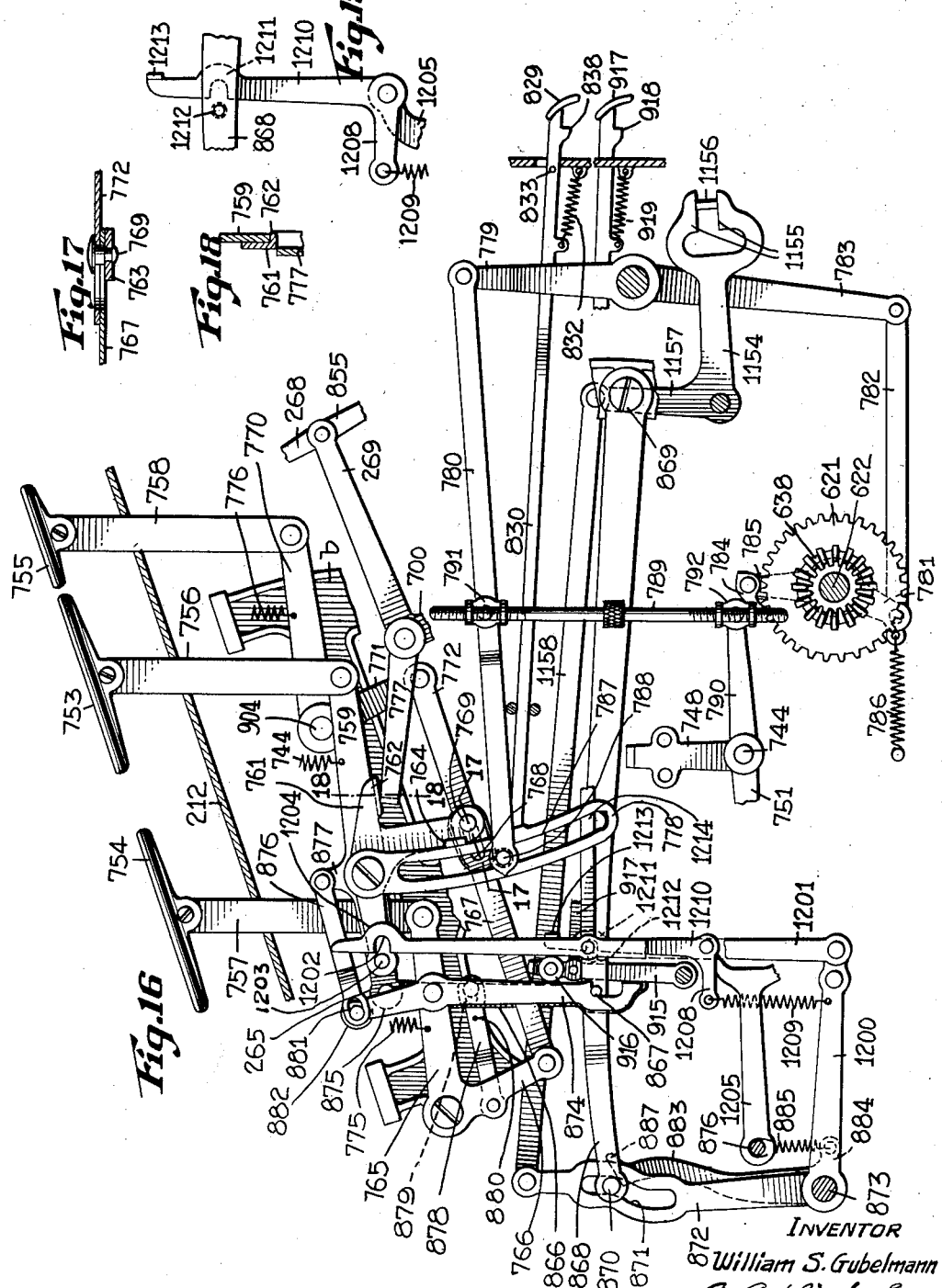

Aug. 29, 1933.  W. S. GUBELMANN  1,924,653
CALCULATING MACHINE
Original Filed Sept. 19, 1912   25 Sheets-Sheet 13
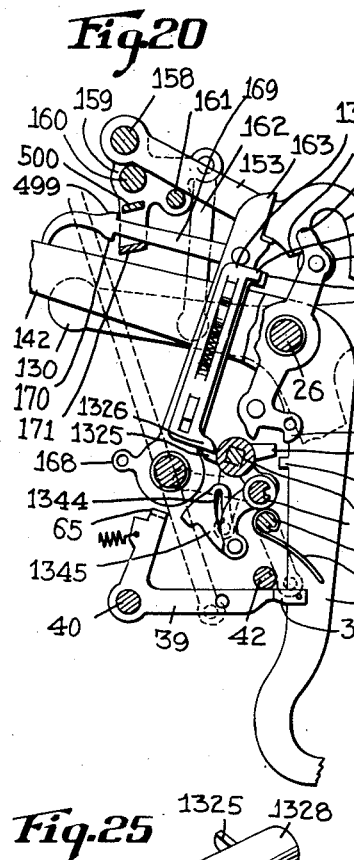
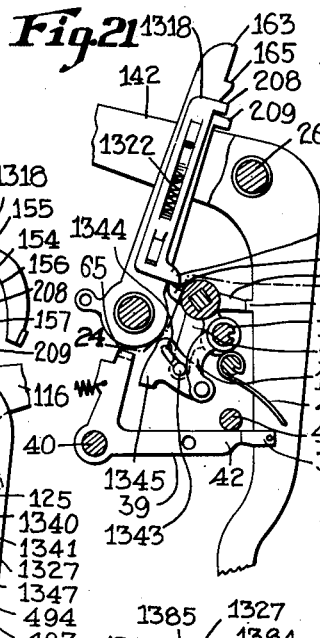
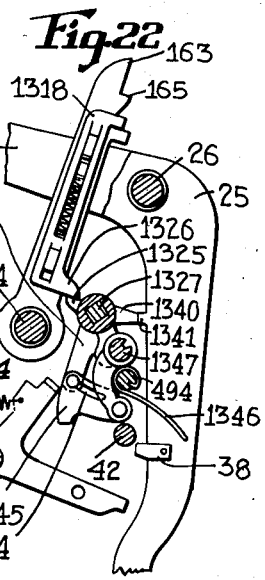
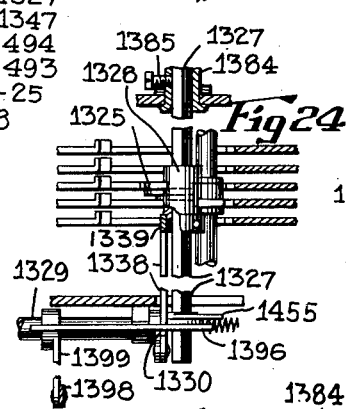
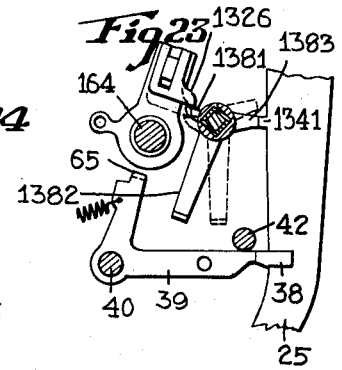
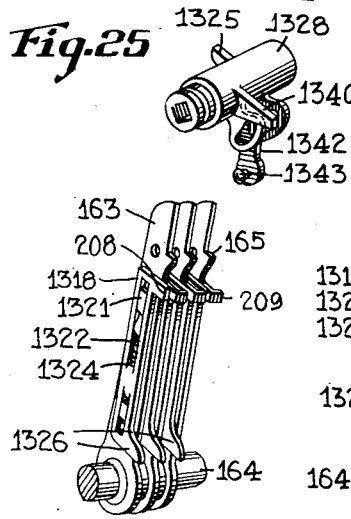
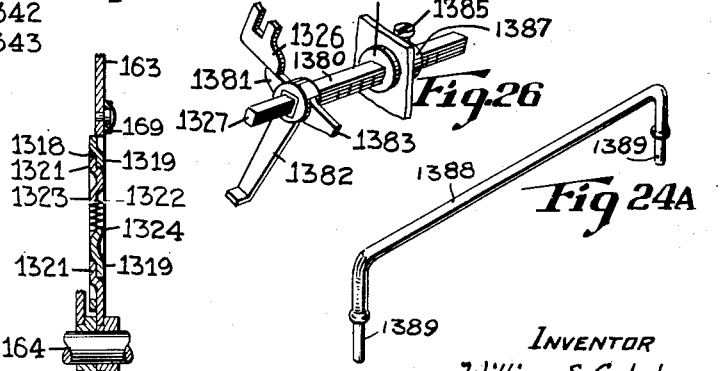
INVENTOR
William S. Gubelmann
ATTORNEYS

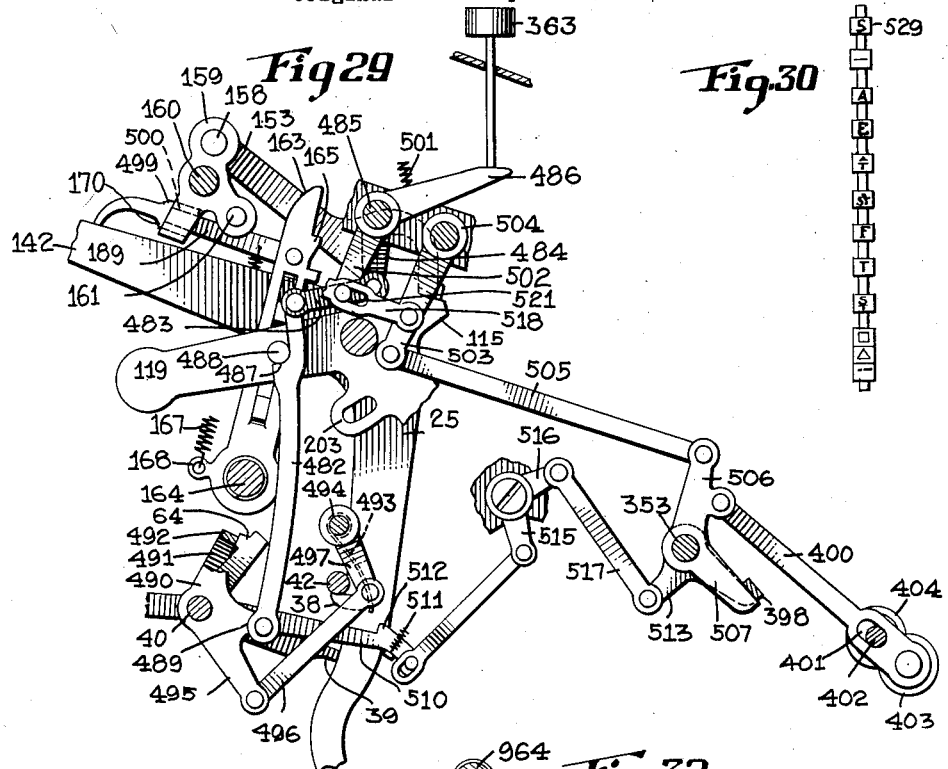

Aug. 29, 1933.    W. S. GUBELMANN    1,924,653
CALCULATING MACHINE
Original Filed Sept. 19, 1912    25 Sheets-Sheet 15
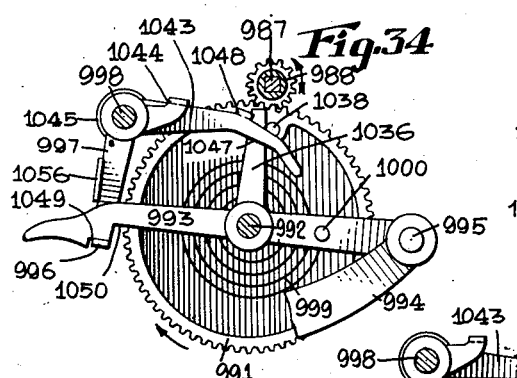
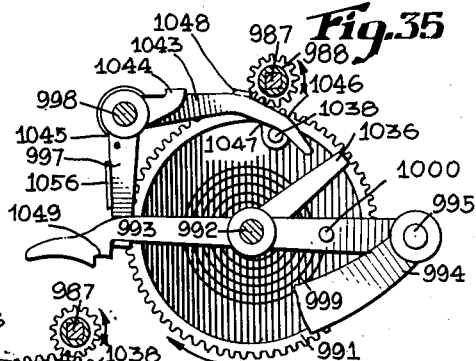
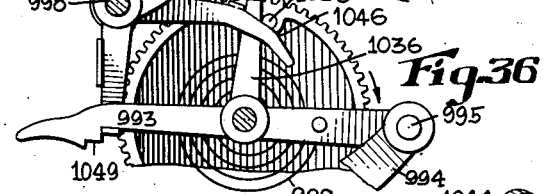
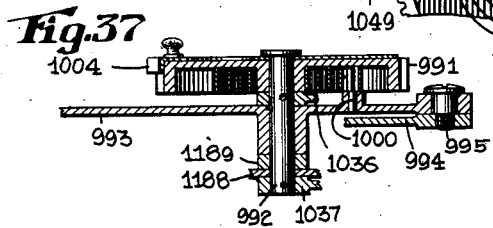
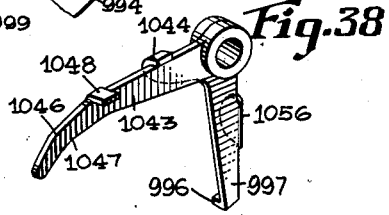
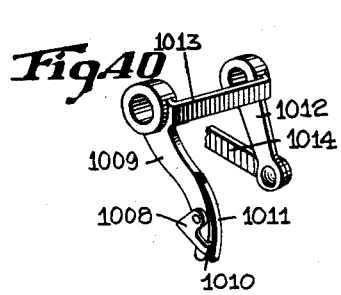
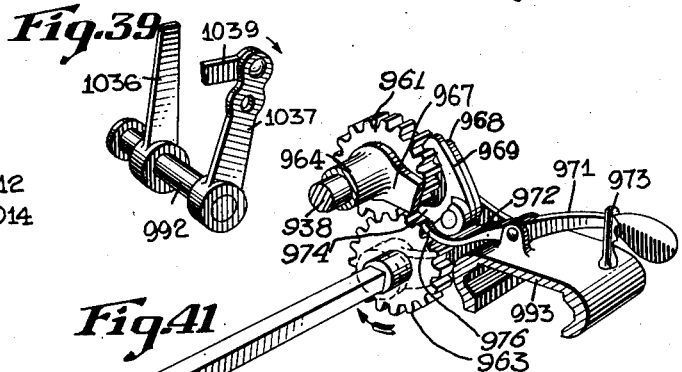
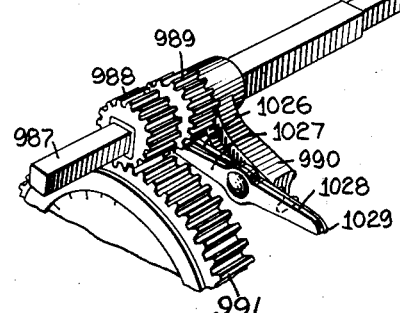
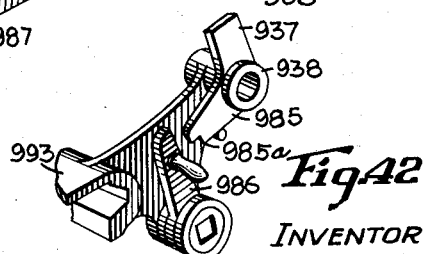
INVENTOR
William S. Gubelmann
ATTORNEYS Aug. 29, 1933.  W. S. GUBELMANN  1,924,653
CALCULATING MACHINE
Original Filed Sept. 19, 1912   25 Sheets-Sheet 16
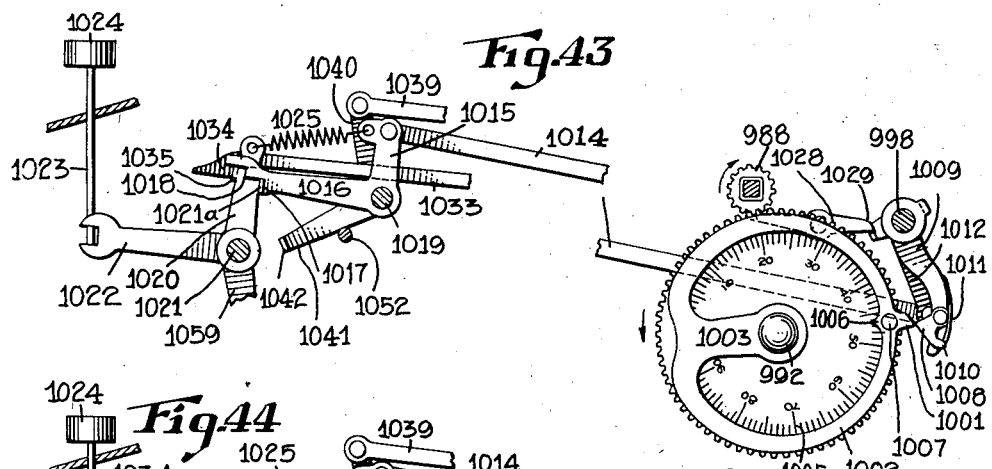
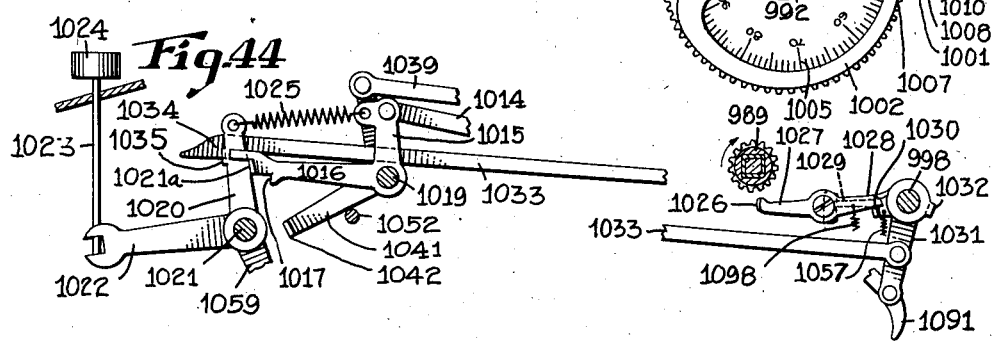
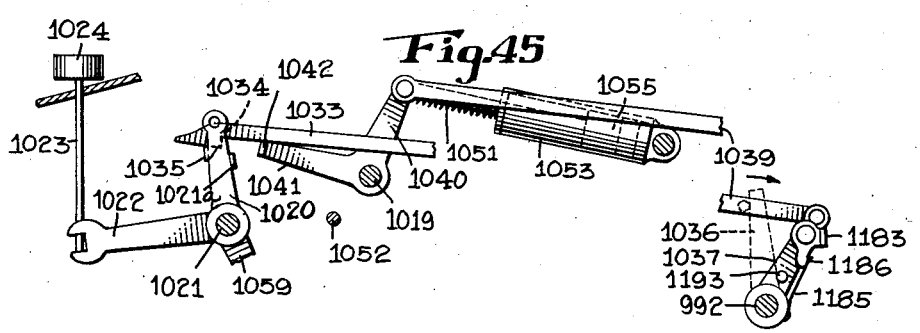
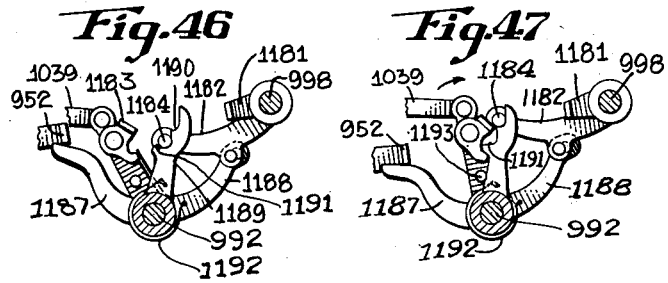
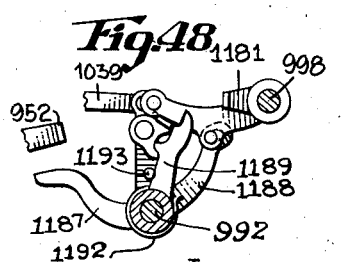
INVENTOR
William S. Gubelmann
ATTORNEYS

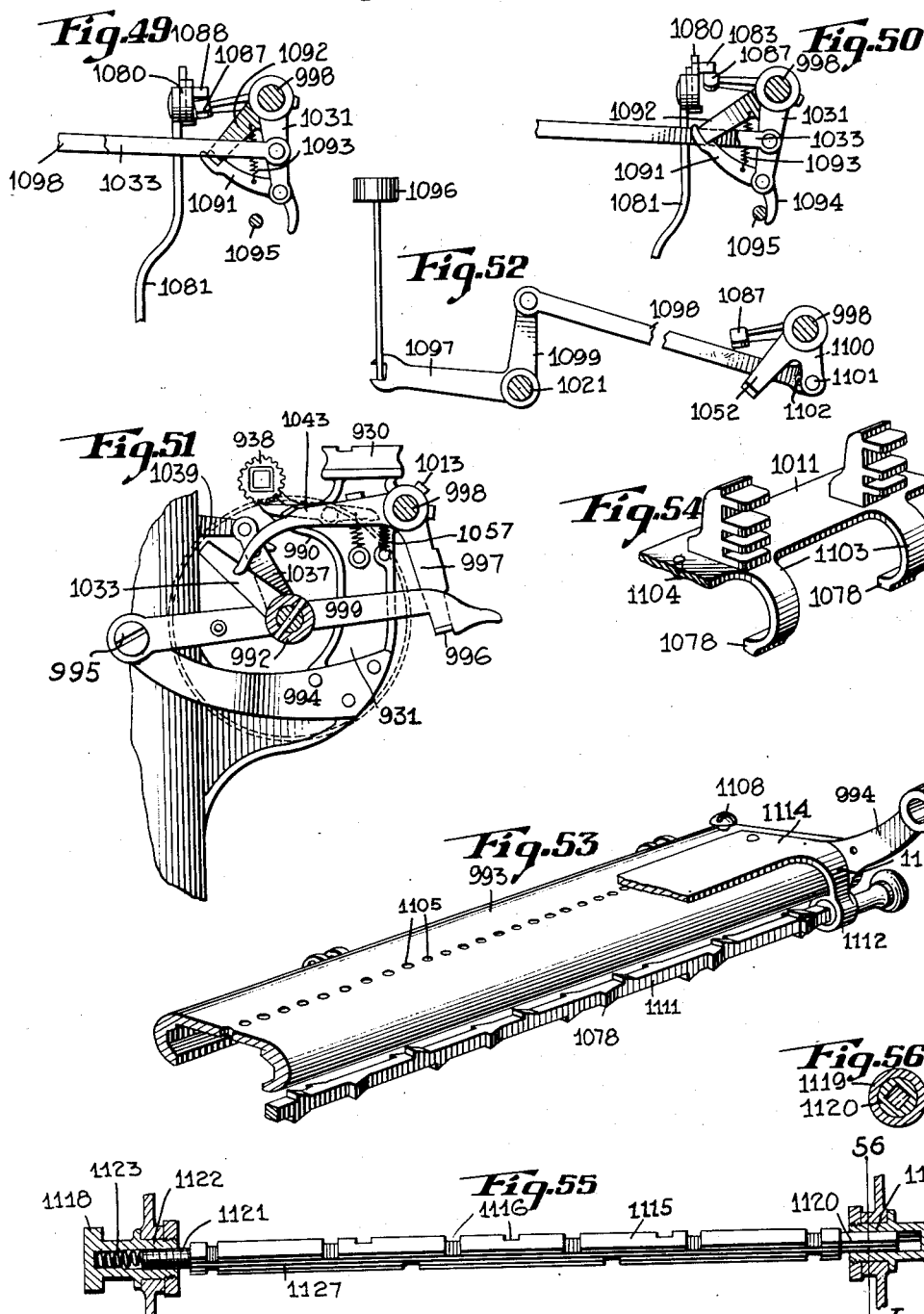

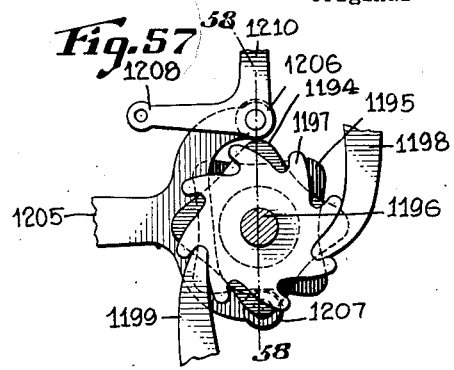
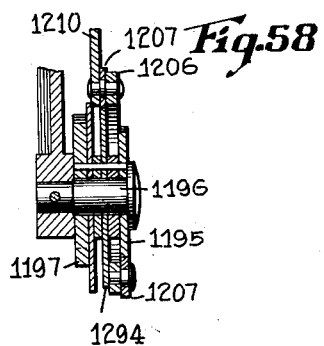
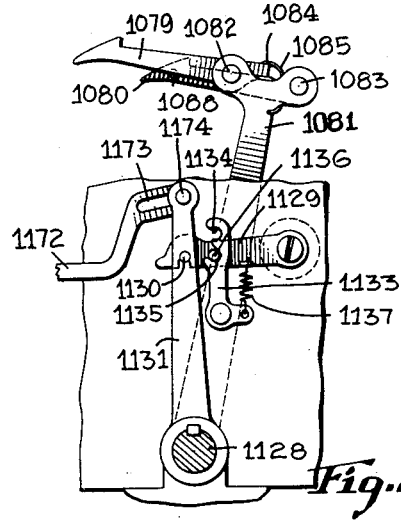
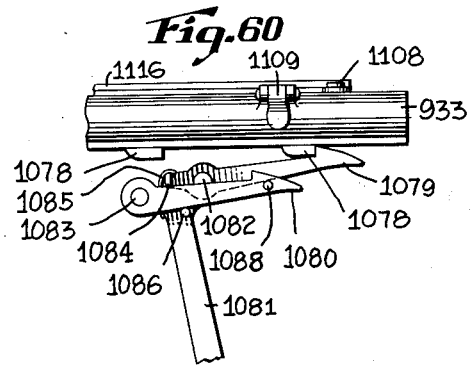
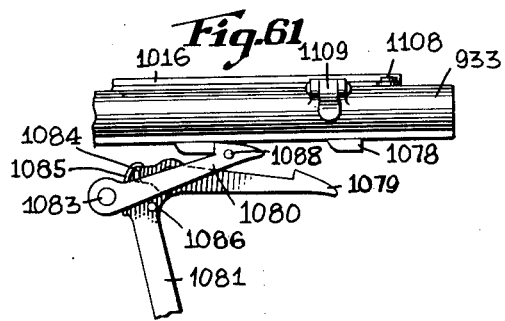
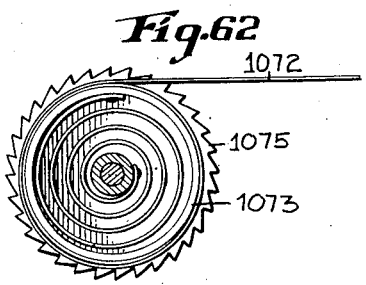

Aug. 29, 1933.     W. S. GUBELMANN     1,924,653
CALCULATING MACHINE
Original Filed Sept. 19, 1912     25 Sheets-Sheet 19
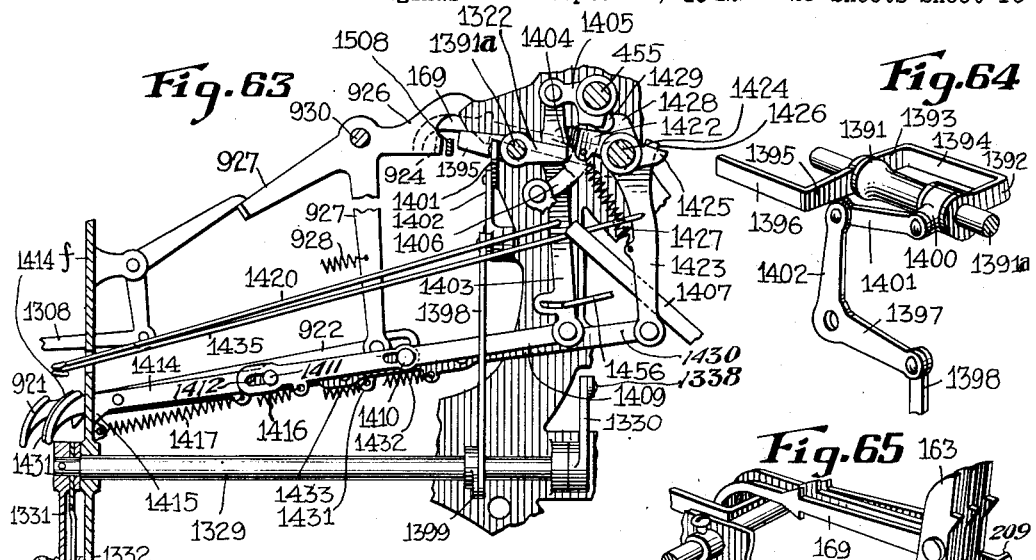
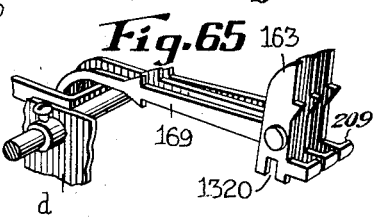
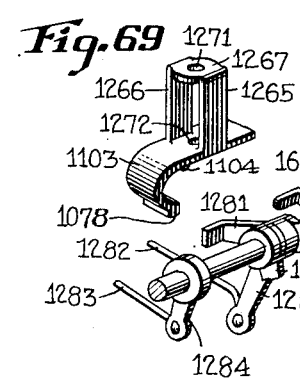
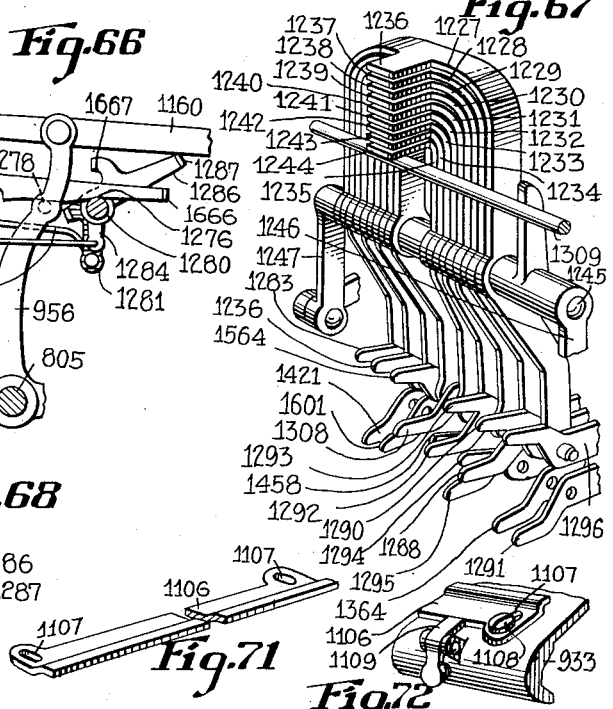
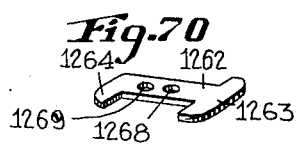
INVENTOR
William S. Gubelmann
ATTORNEYS

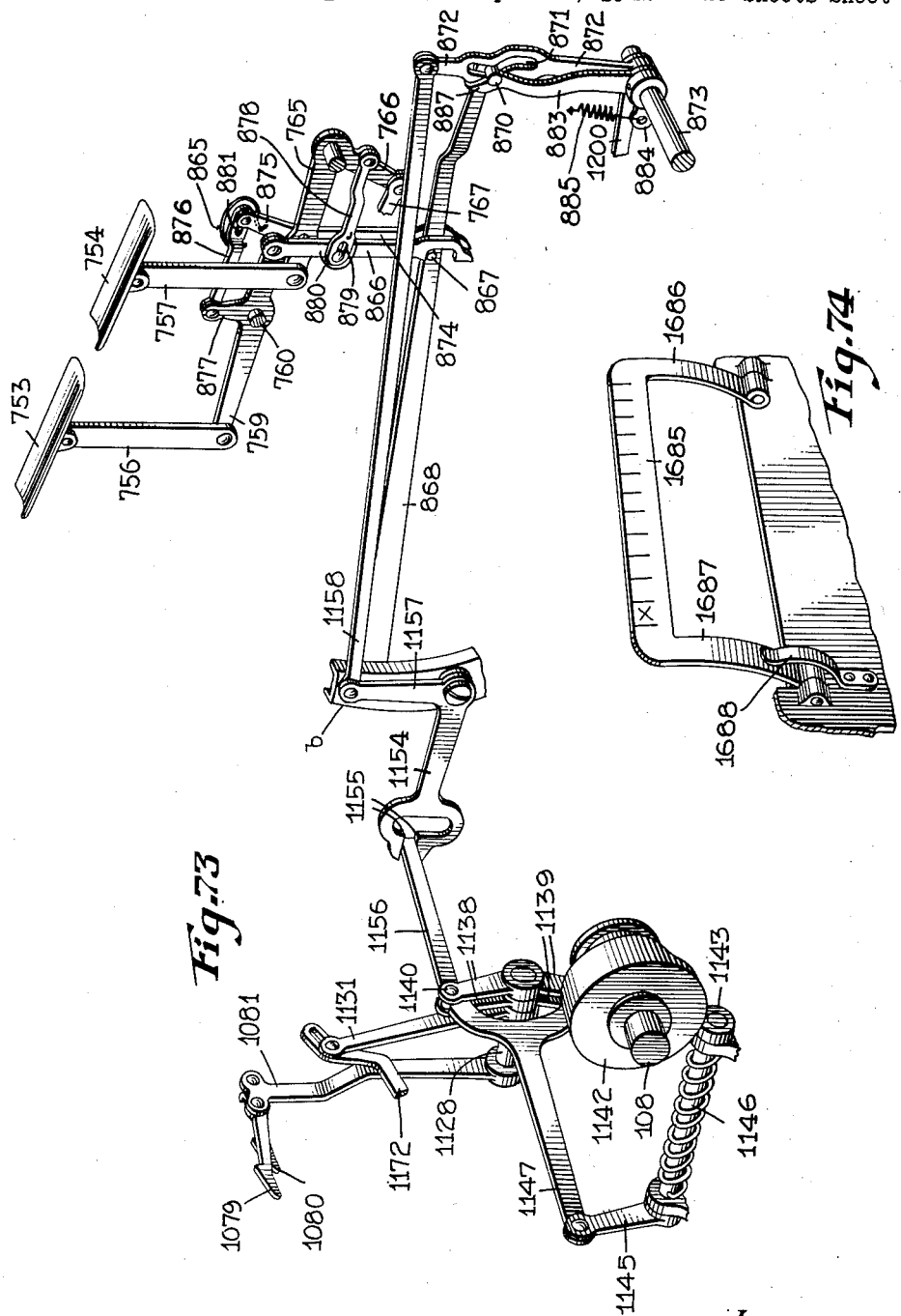

Aug. 29, 1933.  W. S. GUBELMANN  1,924,653
CALCULATING MACHINE
Original Filed Sept. 19, 1912  25 Sheets-Sheet 21
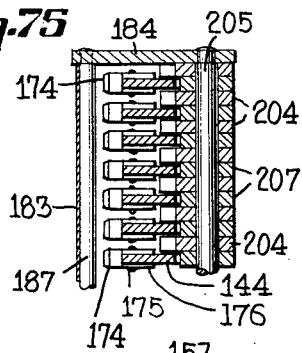
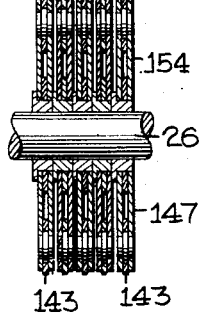
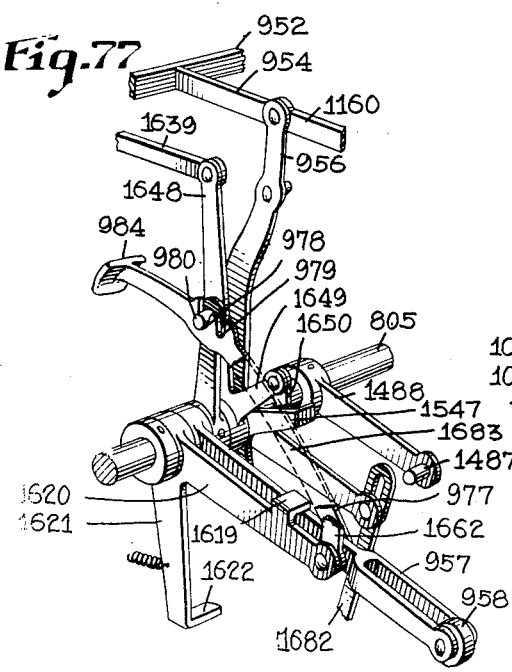
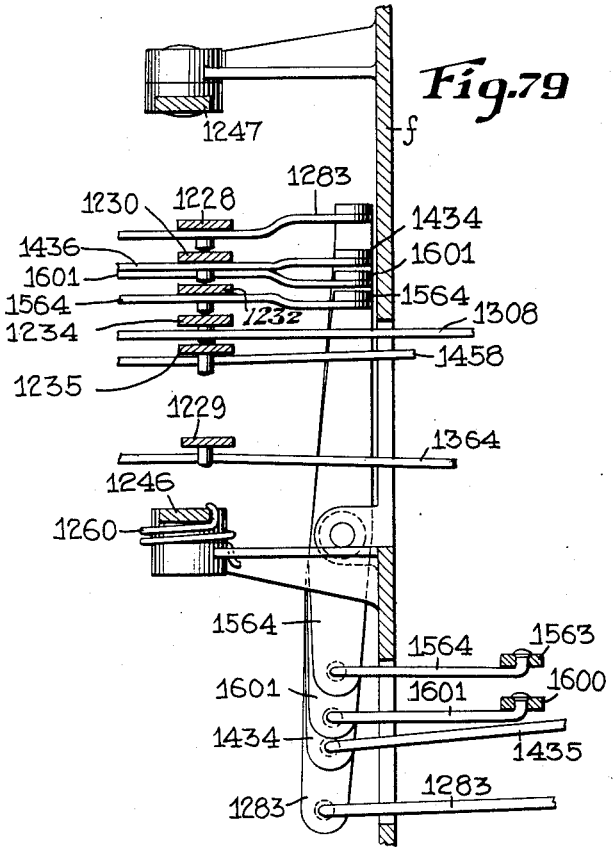
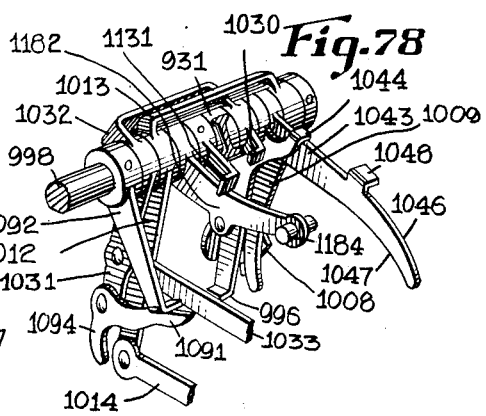
INVENTOR
William S. Gubelmann
ATTORNEYS Aug. 29, 1933.    W. S. GUBELMANN    1,924,653
CALCULATING MACHINE
Original Filed Sept. 19, 1912    25 Sheets-Sheet 22
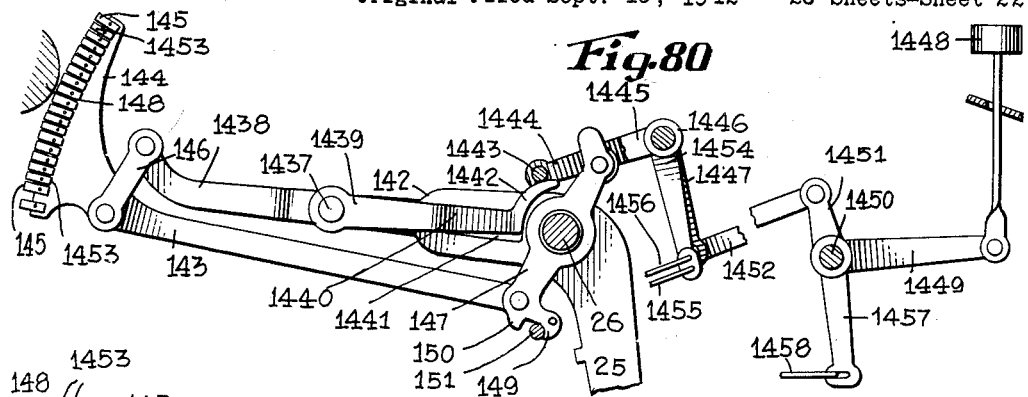
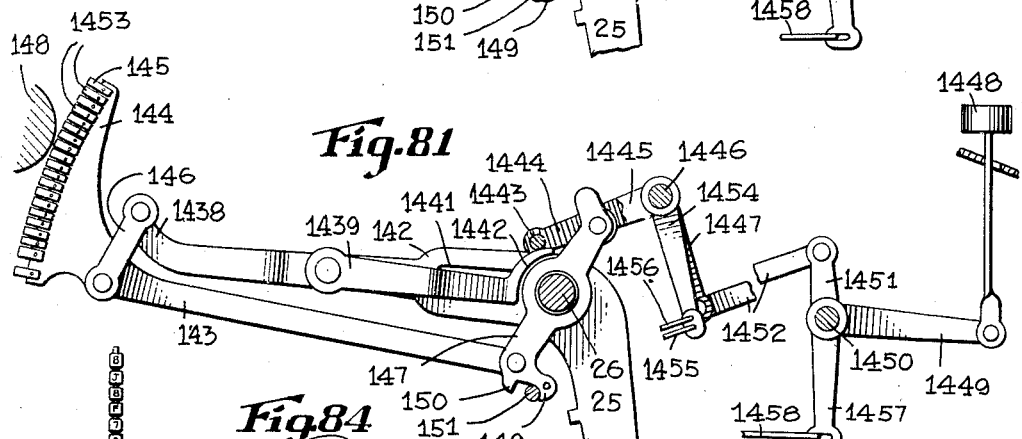
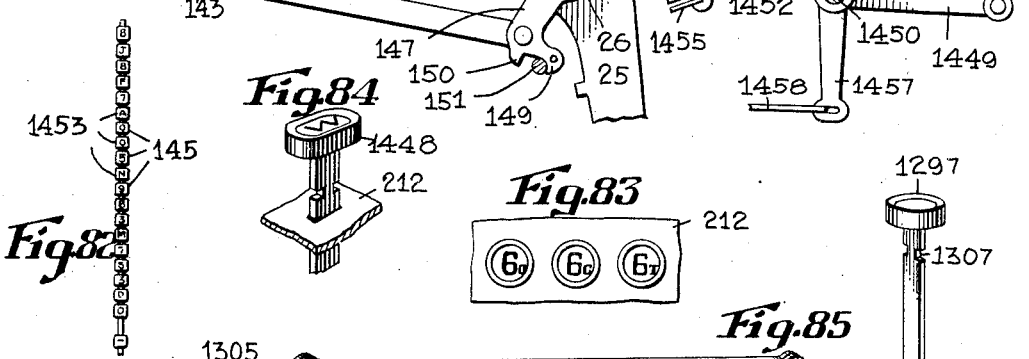
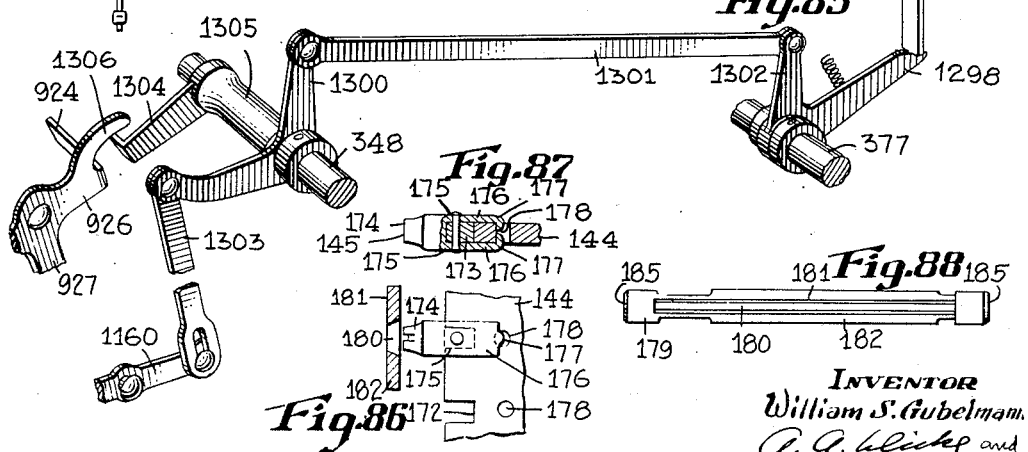
INVENTOR
William S. Gubelmann,
A. A. Wicks and
E. C. Sanborn
ATTORNEYS

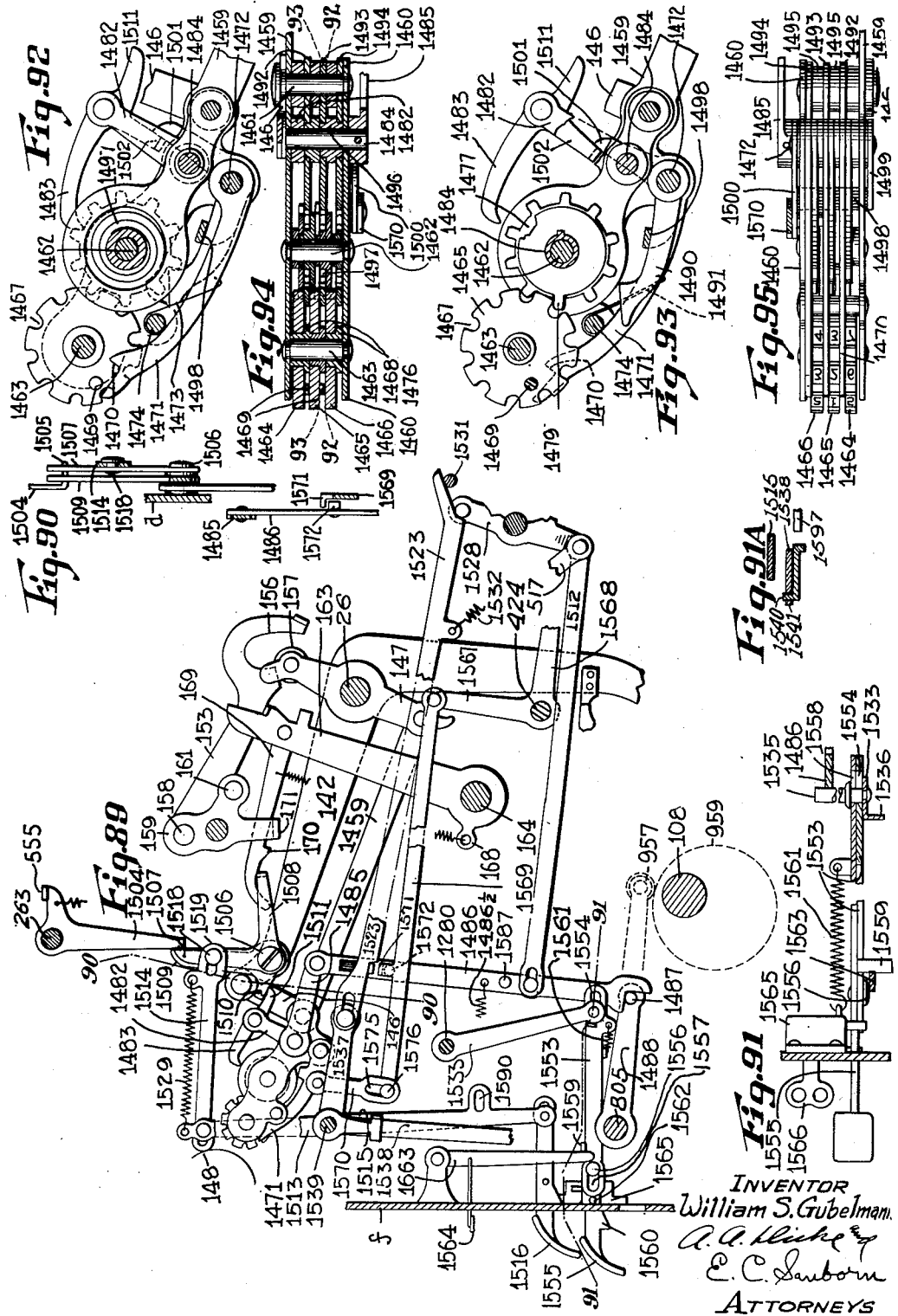

Aug. 29, 1933.                W. S. GUBELMANN                1,924,653
                              CALCULATING MACHINE
                     Original Filed Sept. 19, 1912    25 Sheets-Sheet 24

*INVENTOR*
*William S. Gubelmann*
*A. A. Schlicke and*
*E. C. Sanborn*
*ATTORNEYS*

Aug. 29, 1933.  W. S. GUBELMANN  1,924,653
CALCULATING MACHINE
Original Filed Sept. 19, 1912   25 Sheets-Sheet 25
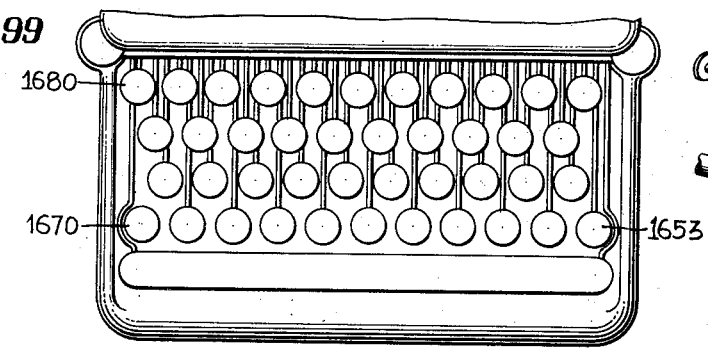
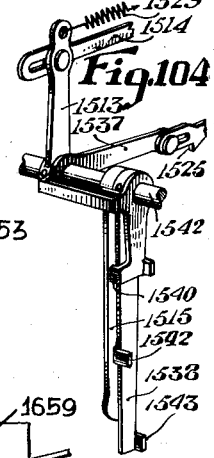
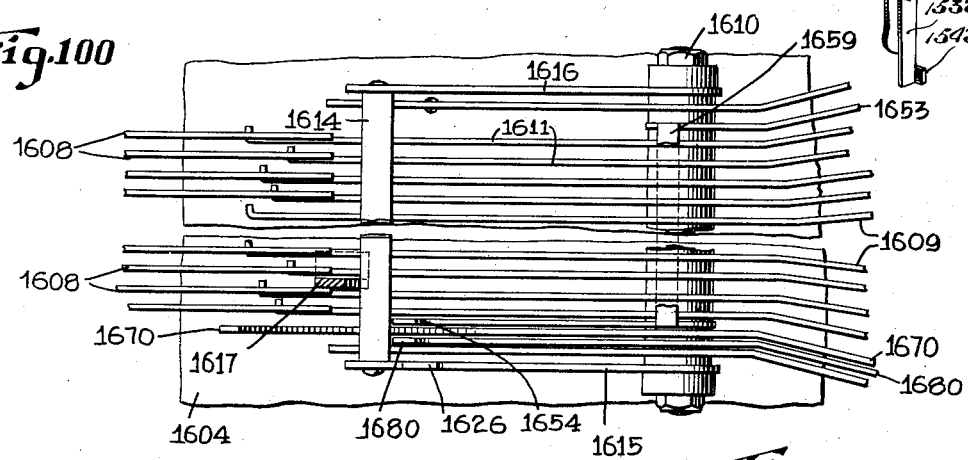
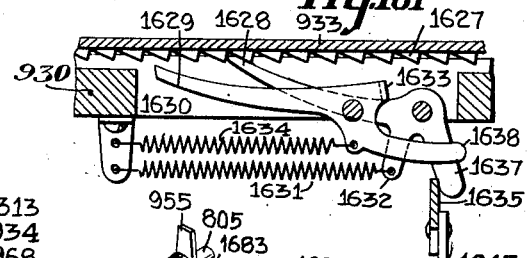
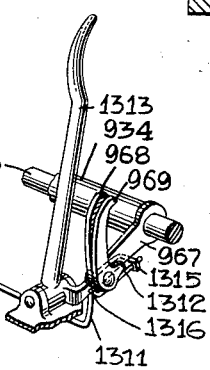
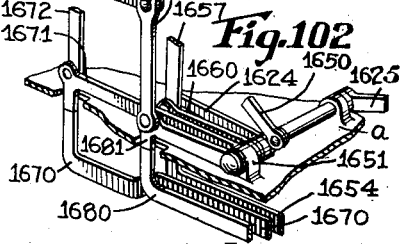
INVENTOR
William S. Gubelmann
A. A. Licke
E. C. Sanborn
ATTORNEYS Patented Aug. 29, 1933

1,924,653

UNITED STATES PATENT OFFICE 1,924,653

CALCULATING MACHINE

William S. Gubelmann, Buffalo, N. Y.

Original application September 19, 1912, Serial No. 721,141. Divided and this application June 3, 1926. Serial No. 113,438

239 Claims. (Cl. 235—60)

My invention relates to improvements in what are commonly known as adding machines and more particularly those features having to do with the printing and listing of numbers and other characters in connection with various kinds of bookkeeping systems and in connection with calculating and registering operations generally.

This application is a division of my copending application, Serial No. 721,141, filed September 19, 1912, now Patent 1,817,451, issued August 4, 1931. Said patent discloses a complete adding machine having a plurality of totalizers capable of both additive and subtractive operation and including the printing and related features hereinafter described as well as numerous other improved constructions of utility in calculating mechanisms.

One of the primary objects of the invention herein disclosed is to provide a combined typewriting and computing machine whereby printing may be performed upon the same record sheet by either of two printing mechanisms, one of which is in the nature of a typewriting machine which will print letters or other characters seriatim, upon the operation of suitable keys; while the other is adapted, upon the operation of a general operating mechanism, to simultaneously print from a series of type elements, each bearing a plurality of type representing numbers or other characters. In this connection, it is an object of the invention to provide means for interlocking the two printing mechanisms so that when one is being operated the other is prevented from operation and vice versa.

Another object of the invention appears through the provision of means for preventing or safeguarding in various ways against the printing of characters by one printing mechanism at the same point on a record sheet that has been printed upon by the other mechanism.

Many novel features of the invention appear in the paper feeding and carriage shifting mechanisms and the means whereby the operation of these mechanisms may be controlled, either manually or automatically, from various sources as to extent, direction and manner of operation.

Another novel feature of the invention is the provision of means whereby the carriage in its movement across the machine may control the operation of the printing mechanism in various ways, and whereby the position of the carriage may determine the operation of the paper feeding means.

A specific feature of the paper handling mechanism is the provision of means for exposing to view the matter which has been printed during each operation by either of the printing mechanisms, the typewriting elements performing their functions with the record in visible position, while, normally, the platen is moved from a visible to an item printing position, to receive impressions from the adding machine printing elements, and back to visible position on each operation of the general operator. Means are provided, however, for disabling the platen swinging mechanism at will.

The provision of improved means for causing the printing elements of the computing machine to print a horizontal ruling line across the corresponding section of the record sheet is in accordance with another object of the present invention.

A further important feature of the invention is the inclusion of a series of special characters on certain of the type segments, in addition to the series of numbers carried thereby, in order that these segments may be employed either for the printing of special words or abbreviations in conjunction with amounts printed by other segments, or may be used to print the upper orders of larger numbers, which it is desired to have printed. Incidental to this construction, novel means are provided for controlling these special segments at will, or automatically through the movements of the carriage.

Still another object of the invention is to provide an improved counting and numbering mechanism, whereby the number of items printed by the type segments may be counted and consecutively printed along with the items or, whereby the items may be merely counted and the total subsequently printed. This mechanism is also provided with means for variously controlling it, to disable it under certain conditions and to cause it to perform other functions as will more fully appear from the detailed description.

Among the numerous other novel features of the present invention may be mentioned the provision of means for automatically filling in ciphers to the right of a significant number and means for either automatically or at will suspending the cipher printing control at one or more places; also, the provision of means for suspending the action of the printing mechanism in full or in part by automatic as well as manual means, and the construction and operation, in general, of the means for taking an impression from the type carriers of the computing section of the machine.

Other objects and advantages of the invention, in addition as well as incidental to those already mentioned, will more clearly appear from the detailed description which follows and by reference to the appended claims.

In the accompanying drawings:

Fig. 2 is a rear elevation of the same.

Fig. 3 is a left side elevation of the same with a section of the enclosing casing removed, certain portions of the computing mechanism being omitted.

Fig. 4 is a right side elevation of the same with a section of the casing removed.

Fig. 5 is a vertical longitudinal section through the central part of the same showing the parts in their normal position, certain portions of the computing mechanism being omitted.

Fig. 6 is a view similar to Fig. 5 but showing the position of the parts while the machine is being operated.

Fig. 7 is a vertical transverse section of the same taken between the number printing mechanism and the carriage mechanism, certain portions of the computing mechanism being omitted.

Fig. 8 is a sectional top plan view of the same with the number key board omitted, certain calculating features being omitted also.

Fig. 9 is a horizontal section taken in the line 9—9 Fig. 5, certain parts being omitted.

Fig. 10 is a fragmentary longitudinal sectional elevation showing some of the keys of the left hand bank and the adjacent parts.

Fig. 10A is a detail of a section of the keyboard showing a column repeat key.

Fig. 11 is a vertical section of the main operating shaft and connecting parts taken lengthwise through the same.

Fig. 12 is a fragmentary longitudinal sectional elevation showing principally the operating lever mechanism and its connections.

Fig. 13 is a perspective view of the detent pawl of the operating mechanism.

Fig. 14 is a detached sectional elevation of the coupling pawl of the operating lever.

Fig. 15 is a fragmentary perspective view of the means for tripping the operating mechanism.

Fig. 16 is a fragmentary longitudinal sectional elevation showing principally the operating keys and their connections.

Fig. 17 is a fragmentary horizontal section in line 17—17, Figure 16.

Fig. 18 is a fragmentary vertical section in line 18—18, Figure 16.

Fig. 19 is a detached side elevation showing the coupling hook of the alternating mechanism.

Figs. 20, 21, 22 and 23 are fragmentary vertical longitudinal sections showing different positions of the key board dividing mechanism.

Fig. 24 is a horizontal section taken in line 24—24, Figure 21.

Fig. 24a is a perspective view of one of the key board dividing bars.

Figs. 25, 26 and 27 are perspective views of parts of the key board dividing mechanism.

Fig. 28 is a vertical section of one of the printing trip latches, including parts of the key board dividing mechanism shown in Figure 27.

Fig. 29 is a fragmentary vertical longitudinal section of the ruling mechanism and connections.

Fig. 30 is a face view of the sign printing segment connected with the identifying shift keys.

Figs. 31 and 32 are vertical longitudinal sectional elevations of the platen and paper feeding operating mechanism.

Fig. 33 is a perspective view of parts of an automatic paper feed disabling device.

Figs. 34, 35 and 36 are sectional views showing different positions of the paper return mechanism.

Fig. 37 is a horizontal section of the same.

Figs. 38, 39 and 40 are perspective views of parts of the paper return mechanism.

Fig. 41 is a perspective view of part of the carriage, paper feed, and the paper return mechanism.

Fig. 42 is a perspective view of the means for retaining the platen permanently in the printing position.

Figs. 43, 44 and 45 are fragmentary vertical longitudinal sections of the paper return mechanism showing the parts in different positions.

Figs. 46, 47 and 48 are fragmentary vertical longitudinal sections of parts of the means whereby the paper carriage is caused to move one or more columns at a time.

Figs. 49 and 50 are sectional elevations of the paper return and column feed mechanism in different positions.

Fig. 51 is a sectional side elevation of the paper return and carriage mechanism.

Fig. 52 is a side elevation of the column shifting key and connecting mechanism.

Fig. 53 is a sectional perspective view of a portion of the carriage showing the detachable stops.

Fig. 54 is a similar view showing a modification of the detachable carriage stops.

Fig. 55 is an elevation partly in section of the adjustable carriage stop device.

Fig. 56 is a vertical section in line 56—56, Figure 55.

Fig. 57 is a fragmentary side elevation of the means for shifting the carriage so as to present two columns of the platen alternately to the printing position. This mechanism in relation to other parts of the machine is shown in Fig. 4.

Fig. 58 is a vertical section on line 58—58, Figure 57.

Fig. 59 is a fragmentary vertical transverse section looking rearward and showing part of the carriage alternating mechanism.

Figs. 60 and 61 are fragmentary rear views of the carriage escapement pawls in different positions.

Fig. 62 is an elevation of the spring drum for propelling the carriage.

Fig. 63 is a fragmentary longitudinal sectional elevation showing principally the means for dividing the key board and controlling the printing mechanism.

Fig. 64 is a fragmentary perspective view of the mechanism for rendering part of the printing devices operative or inoperative.

Fig. 65 is a similar view of another part of the means for rendering part of the printing devices operative and inoperative.

Fig. 66 is a fragmentary vertical longitudinal section of the carriage and part of the controlling device co-operating therewith.

Fig. 67 is a perspective view of the set of tappet levers and associated parts whereby the movement of the paper carriage is caused to operate certain parts.

Fig. 68 is a fragmentary perspective view of part of the automatic column and paper feed mechanism.

Fig. 69 is a perspective view of one of the adjustable carriage stops and tappet holders.

Fig. 70 is a perspective view of one of the carriage tappets.

Fig. 71 is a perspective view of the locking bar for fastening the stops on the carriage.

Fig. 72 is a fragmentary perspective view showing the locking bar in position on the carriage.

Fig. 73 is a perspective view showing principally the operating keys and the mechanism whereby the same control the movement of the carriage.

Fig. 74 is a perspective view of the combined adding and typewriter scale or indicator.

Fig. 75 is a fragmentary horizontal section in line 75—75 of Figure 5.

Fig. 76 is a fragmentary vertical section in line 76—76 of Figure 6.

Fig. 77 is a perspective view of part of the carriage and platen controlling mechanism.

Fig. 78 is a perspective view of the paper return and carriage feed controlling mechanism.

Fig. 79 is a horizontal sectional view of the connections between the tappet levers and parts of the machine.

Figs. 80 and 81 are fragmentary sectional elevations of different positions of the word printing devices.

Fig. 82 is an end view of the word printing type segment.

Fig. 83 is a fragmentary top plan view of the key board showing several keys provided with numbers and letters.

Fig. 84 is a fragmentary view of a key and means for locking the same in its depressed position.

Fig. 85 is a perspective view of the non-print key and its connecting mechanism.

Fig. 86 is an enlarged fragmentary vertical section showing a type on the type carrier and the guide with which it cooperates.

Fig. 87 is a horizontal section of the same.

Fig. 88 is a face view of said type guide.

Fig. 89 is a fragmentary sectional longitudinal elevation of the counting and numbering devices.

Fig. 90 is a vertical transverse section in line 90—90, Figure 89.

Fig. 91 is a horizontal section along the line 91—91, Figure 89.

Fig. 91A is a horizontal section along the line 91A—91A, Figure 89.

Figs. 92 and 93 are vertical longitudinal sections of the counting device taken in the correspondingly numbered lines in Figure 94.

Fig. 94 is a horizontal section of said numbering and counting device.

Fig. 95 is a bottom plan view thereof.

Fig. 96 is a vertical longitudinal sectional elevation of the combined adding and typewritting mechanism.

Fig. 97 is a fragmentary perspective view of the detainer mechanism.

Fig. 98 is a similar view of part of the carriage feed controlling mechanism.

Fig. 99 is a top plan view of the typewriter keyboard.

Fig. 100 is a fragmentary top plan view of the typewriter key levers and adjacent parts.

Fig. 101 is a fragmentary vertical transverse section, on an enlarged scale, of the letter space carriage escapement pawls or pallets.

Fig. 102 is a perspective view of part of the mechanism connecting the typewriter and adding controlling devices.

Fig. 103 is a fragmentary perspective view of the paper feed pawls and tappet releasing mechanism.

Fig. 104 is a perspective view of part of the counting and numbering mechanism.

Figure 1:
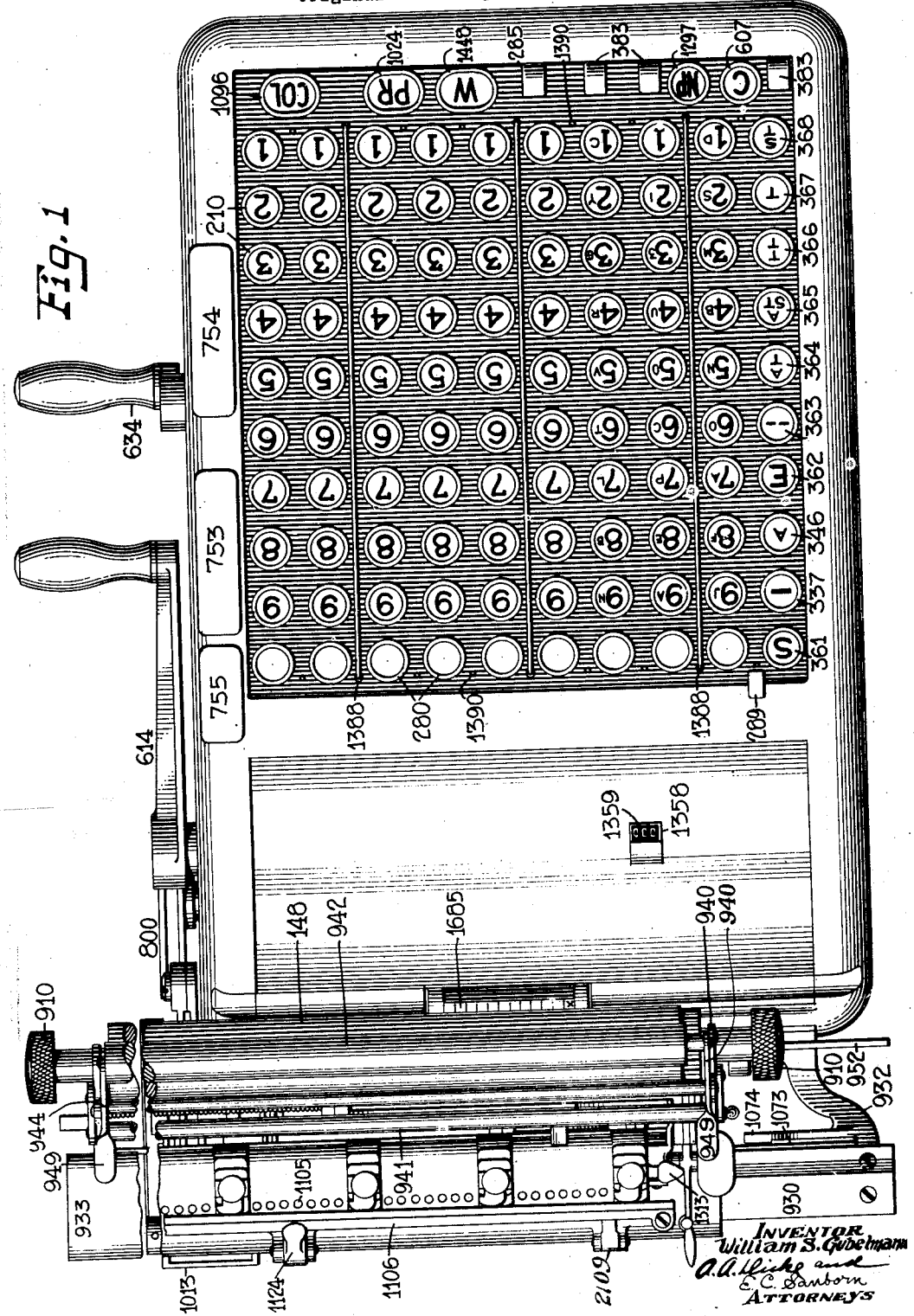
Fig. 1 is a top plan view of the machine with the typewriting mechanism omitted.

In the detailed description which follows, occasional reference may be made to certain calculating features and operations of the machine which are not fully disclosed herein and in such instances a fuller understanding may be had by referring to the specification and drawings of the parent Patent No. 1,817,451.

*Frame construction*

$a$ is the base of the machine, $b$ and $c$ are the two main side frames secured to the base $a$, Figs. 3, 4 and 9, $d$ and $e$ are intermediate frames also secured on the base $a$ and divide the machine into three longitudinal sections as shown in Figures 3, 6, 7, 8, and 9, the right hand section containing mainly the driving mechanism, the left hand section the mechanism for the total and controlling keys, and the middle section the accumulating and number printing devices. Cross ties serve to hold these frames in alignment; these frames support the greater part of the mechanism of the machine.

The end frames $b$ and $c$ also serve to support the keyboard and its mechanism which is secured above and to the upper ends of said frames.

$f$ is the rear frame secured to the base $a$ and also to the main side frames $b$ and $c$. Said rear frame $f$ serves mainly to support the printing carriage and its mechanism, as shown in Figs. 2, 3, 4, 5, 6, and 8.

A cover $g$ with openings fitted with glass is secured to the base $a$ and serves to protect the mechanism from dust and moisture.

*Actuating gear segments*

As most clearly shown in Figs. 5 and 6, a series of actuating levers or members 25 are mounted on a shaft 26 running transversely through the machine. These levers are provided at their lower forward ends with gear teeth which are utilized in connection with the calculating functions of the machine, and therefore, need not be further described herein.

*Differential stop bars and operating frame movements*

The distance which it is possible for the actuating gear segments to move forwardly is controlled by a plurality of differential stop bars 35 Figs. 5 and 6, which are arranged vertically in front of the gear segments and are pivoted at their upper ends on a horizontal transverse rod 36. Each of these differential stop bars is provided on its lower front side with a series of ten stop shoulders 37 which are arranged in successive steps and run from 0 to 9, the shoulder corresponding to zero position being arranged at the outer end of the stop bars and the remaining shoulders corresponding to 1 to 9 being arranged progressively nearer to the pivot of the stop bar.

When the machine is in its normal position the actuating gear segments are in their retracted position, the stop bars are in their lowest position and present their zero shoulders to the front ends of the gear segments for locking them against forward movement, as shown in Fig. 5. For the purpose of setting up any particular number in the machine each stop bar corresponding to a figure of the number is prepared to release the companion gear rack and present the proper stop shoulder to the same for arresting the gear rack when it has moved forwardly the required distance. The number of pairs of such gear racks and stop bars may be varied and depends upon the intended capacity of the machine.

After the stop bars have been thus set the several liberated actuating levers move forwardly until each engages at its front end with the shoulder 37 of the respective stop bar 35 in its path, as shown in Fig. 6. When the desired printing operation has subsequently taken place, as will be hereinafter described, the actuating levers are returned toward their normal positions and at the same time the stop bars are moved toward their lowermost positions, so that when the levers have been restored to normal their foremost ends will again contact the ends of the stop bars and they will be held against forward movement until the stop bars are again shifted, in accordance with a new setting.

Back stop arms for actuating members

The rearward movement of the actuating members 25 is arrested by the engagement of lugs 38, carried by the vertical arms of said members, with a series of stop arms 39 pivoted upon a rock shaft 40, as best seen in Figs. 5 and 6. By means to be hereinafter more fully described, in connection with the operation of the horizontal ruling mechanism, the stop arms 39 may be depressed, when desired, so that the levers 25 will be permitted to move back an additional step until the rear edge of its vertical arm abuts against a horizontal stop rod 42 arranged above said stop arms.

Main operating frame mechanism

108, Figs. 5, 6, 9, 10 and 11, represents a horizontal main driving shaft which is arranged transversely in the lower rear part of the machine and which makes one complete rotation in a counter clockwise direction, Figs. 5 and 6, for each operation of the machine. This shaft is preferably constructed in two sections, as shown in Fig. 11, which are provided at their opposing inner ends with disks 109 and 110 which are connected by a crank or wrist pin 111. For convenience of description the distance which the crank moves vertically will be divided into eleven spaces or steps.

112, Figs. 5, 6, and 8, represents a universal stop return rod or bar arranged transversely above the differential stop arms or levers 35, and hung at opposite ends by means of rock arms 113 and 114 from the pivot rod 36. 115 and 116 represent a pair of forwardly extending rock arms pivoted on the rock shaft 26 and each connected by links 117 and 118 with said universal return rod 112. Extending rearwardly from one of the rock arms 115 is an actuating rock arm 119 which latter is connected by a connecting rod or link 120 with the crank pin 111, as shown in Figs. 5, 6, 9, 10 and 11.

121 represents a universal segment return bar or rod which is arranged transversely in front of the segment arms, and which is connected by depending rock arms 122 and 123 respectively with the upper rock arms 115 and 116. A tie rod 124 is also secured at its opposite ends to the depending rock arms 122 and 123. The rods or bars 112 and 121 together with the arms 122 and 123 and links may, for convenience of description, be regarded as the operating frame.

Arranged in front of the segment arms are upright presser fingers 125, Figs. 5 and 6, each of which has a hook shaped upper end which hangs on a transverse supporting bar or rod 124 and a lower bifurcated end forming front and rear stops 126 and 127 which straddles the universal segment return rod 121. The presser fingers are separated from each other by washers 128. The presser fingers are turned and yieldingly held with their front stops 127 in engagement with the front side of the segment return rod 121 by springs 129, each of which connects the hook of the presser finger in front of its upper supporting rod with a washer 130 arranged on the segment return rod between two adjacent presser fingers.

In the position of the parts shown in Fig. 5 the machine is at rest, at which time the crank pin 111 is positioned downwardly on the rear side of the main shaft one and one-half spaces or steps from the uppermost part of the stroke of the crank, the universal stop return bar 112 is raised one and one-half spaces above its lowermost position above the differential stop arms 35, and the segment return bar 121 is also moved one and one-half spaces forwardly from its rearmost position. Upon depressing a key controlling one of the differential stop arms 35 and then operating the machine, said stop arm will be raised to release the segment and permit the latter to move forwardly for engaging the stop shoulder 37 on the displaced stop arm corresponding to the key depressed. The forward movement of the segment is produced by gravity, due to the weight of the parts connected with the segment arm on the opposite side of its pivot, but if desired this movement of the segment may be aided or effected solely by a spring 25$^a$, as shown in Fig. 96.

As the crank pin 111 moves nine and one-half spaces from the normal position, as shown in Fig. 5, to its lowest position, shown in Fig. 6, the universal stop return bar 112 is raised to its highest position in advance of the stop arms and the segment return bar 121 moves forwardly into its foremost position in advance of the segment arms. As the crank pin 111 moves eleven spaces from its lowest to its highest position, the operating frame is moved a full stroke backwardly, which causes its segment return bar 121 to move the presser fingers 125 against the segment arms 25 and move the segments backwardly into their rearmost position, and the stop return bar 112 to engage the differential stop bars 35 and depress the same into their lowermost position. If the backward movement of a segment arm is arrested by its movable back stop arm 39 the presser finger bearing against the same will also be arrested, in which event the segment return bar 121 will complete the last portion of its backward movement independently of the presser finger 125 and strain the spring 129. The extent of this idle backward movement of the segment return bar is one and one-half steps. After the crank pin reaches its highest position it continues its movement one and one-half steps or spaces downwardly to its normal position and is there arrested, as shown in Fig. 5. When the crank pin 111 reaches one and one-half spaces below and in rear of its highest position, the segment return bar 121 has again moved forwardly into engagement with the front stops of the presser fingers 125, and the stop return bar 112 is again raised one and one-half spaces above the differential stop arms 35, as shown in Fig. 5.

By actuating the operating frame from the crank pin 111, in the manner described, a quick forward and backward movement of the gear segments is produced but the front and rear ends of these movements, as the crank passes over the dead centers, are gradually slowed down to a dead

Printing mechanism 142 represents a plurality of vertically swinging printing arms which are arranged substantially horizontally in the rear of the shaft 26 upon which they are pivoted and each of which is connected at its front end with the upper end of the arm 25 carrying the actuating gear segments 23 and 24, as shown in Figs. 5 and 6. Each printing arm and the corresponding gear segments and arms are preferably formed integrally, as shown. Lengthwise below each printing arm 142 is arranged a type carrier 143 which is provided at its rear end with an upwardly projecting type head 144 which carries a segmental row of type 145. The type carrier 143 is suspended near its rear end from the rear end of the printing arm by a pair of depending links 146 arranged on opposite sides of the arm and carrier. The front end of each type carrier is movably supported by means of the lower arms 147 of a pair of upright printing levers which are arranged on opposite sides of the corresponding printing arm and type carrier, as shown in Figs. 5, 6, 20 and 76, and pivoted on the rod or shaft 26. As an accumulator gear segment moves forward into one position or another, according to whichever of its setting keys has been depressed, the type head descends and presents to the printing position that one of its type corresponding to the depressed setting key. After the type head comes to rest with the desired type at the printing position the type carrier and head are moved backwardly with a quick stroke, for producing an impression of the respective type on the recording sheet supported on a platen 148 in rear of the type, and then are quickly returned to their forward position to prevent smutting or blurring of the recording sheet. In order to limit the backward stroke of the type and prevent injury to the parts if operated when the platen is not in the printing position, a stop device is provided consisting of front stop lugs or shoulders 149 arranged on the printing arms 147 and adapted to engage a stationary transverse stop bar 151, shown in Figs. 5, 6, and 20. The return or forward movement of the type head and carrier is limited by rear stops lugs or shoulders 150 arranged on the printing arm 147 and adapted to engage with the rear side of the stop bar 151. Each type head and carrier are yieldingly held in the foremost position by gravity and a spring 152.

The mechanism for producing a quick backward and forward stroke of the type head is constructed as follows:—

153, Figs. 5, 6, 20 and 29, and 89, represents a plurality of cam arms one of which is arranged lengthwise above each printing arm and each of which is confined at its front end between the extremities of the upper arms 154 of the printing levers. Each cam arm 153 is provided at its front end with a forwardly throwing rear cam 155 (Fig. 20) and a rearwardly throwing front cam 156, which are adapted to engage successively with a roller abutment 157 mounted between the upper arms 154 of the printing levers. Each cam arm 153 when free is drawn downwardly by the spring which, for convenience and simplicity, is the same spring 152 which draws the corresponding type head and carrier forwardly. The rear ends of the cam arms 153 are pivoted to a transverse pivot rod 158 which is secured at opposite ends in a pair of vertically rocking heads 159. The latter are pivoted below the pivot rod 158 on the stationary supporting rod 160 which is mounted on the frames d and e. Below the cam arms 153 and in front of the supporting rod the heads 159 are connected by a return bar 161.

162 represents a vertical link which connects the front end of one of the rocking heads with the adjacent rearwardly projecting rock arm 119 of the main operating frame, as shown in Figs. 5, 6 and 20.

163 represents a plurality of upright printing trip latches which are arranged in a transverse row and pivoted at their lower ends on a stationary transverse rod 164, while their upper ends are provided with upwardly facing shoulders 165, each of which is yieldingly held in engagement with a shoulder or lug 166 on the front part of one of the printing cam arms by a spring 167, which connects with a lug 168 projecting rearwardly from the pivoted end of the respective latch, as shown in Figs. 5, 6, 20, 29 and 89.

169 represents a plurality of releasing dogs one arranged lengthwise above each printing arm and resting thereon with its downwardly turned rear end, while its front end is pivoted to the upper end of the respective printing latch 163. Springs 167 are connected to the releasing dogs and serve to draw them downwardly. Each releasing dog is provided near its rear end on its under side with a forwardly facing shoulder 170, which is adapted to engage with a transverse releasing bar 171, extending between the rocking heads 159 below the supporting rod 160, as shown in Figs. 5, 6, 20, 29 and 89.

Preparatory to operating the machine the several printing arms 142 are in their uppermost position, the type heads 144 and carriers 143 are forward, the cam arms 153 are held in an elevated position by the printing latches 163, and the releasing dogs 169 are disengaged from the releasing bar 171, all as shown in Fig. 5. Keys representing any desired number having been set, the operations of the trains of mechanisms associated with each key bank in which a key is set are as follows: Upon moving the operating frame forwardly each actuating segment 25 advances in accordance with the setting of its stop device 35 as determined by the value of the set key, and each type head descends and brings the corresponding type to the printing position. As the printing arm 142 descends its companion releasing dog 169 is lowered, bringing its shoulder 170 into the path of the releasing bar 171. While the operating frame is effecting its forward movement the rocking heads 159 connected therewith are turned forwardly, causing the cam arms 153 to move forwardly and the releasing bar 171 to move rearwardly, owing to the connection of these parts with the heads 159 on opposite sides of the supporting pivot rod 160. Each printing latch 163 is held in engagement with its cam arm 153 until the operating frame effects the last part of its forward movement, at which time the under shoulder 170 of each dog 169 is engaged and moved to the rear by the rearwardly moving releasing bar 171. This movement of dogs 169, together with the continued forward movement of the cam arm 153, withdraws the shoulder 165 of each printing trip latch 163 from beneath the lug 166 of the associated cam arm 153, thereby permitting the cam arms to be drawn suddenly downwardly by the spring 152. During the first part of this downward movement of each cam arm its rear cam 155 engages roller 157 of the printing lever 154 and forces the type carrier 143 and head 144 rearwardly, as shown in Fig. 6 thereby producing an impression of the type at the printing position on the record sheet. Immediately after the rear cam 155 of the cam arm 153 clears the roller 157 the front cam 156 thereof engages this roller, causing the printing lever to be turned in the opposite direction and the type head to be moved forwardly away from the record sheet and held in this position. During the backward movement of the operating frame the rod 158 moves backwardly, carrying with it the cam arm 153, and the cam face 156 rides on the roller 157 and is thereby gradually raised, the type bar 143 and the printing lever 147 being stopped in normal position by the engagement of shoulder 150 with stop bar 151. Near the end of the return movement of the operating frame, the return bar 161 raises each cam arm 153 sufficiently high to permit its respective printing latch 163 to swing forwardly and engage its shoulder under that of the cam arm for holding the same up preparatory to effecting the next operation. When no setting key of any key bank is depressed, the associated gear segment and printing arm do not move forward, and the associated releasing dog 169 is held in its normally elevated position by the printing arm 142; whereby the releasing bar 171 upon moving rearwardly during the forward movement of the operating frame will not engage but will pass by the shoulder 170 of the dog 169 and the latch 163 will not be withdrawn from underneath the cam arm 153, and the associated printing device is not operated.

Detachable type

The type carriers or heads 144, Figs. 5, 6, 75, 86 and 87 are provided with a series of seats or serrations 172 in which are arranged the shanks 173 of the type 174. The type are provided with extensions 175 which project beyond the shanks on opposite sides of the carriers 144 and confine the type shank in the seats or serrations 172 in line with the carriers.

The type are also provided on opposite sides with flexible fingers 176 which latter straddle the type carrier. Each finger is provided at its end with a hook 177 and is so constructed that the hooks of a pair of fingers face each other and engage openings on shoulders 178 in the type carrier.

The flexible fingers 176 and the extensions 175 are preferably made in one plate riveted to the type shank 173 but the whole could be made of one piece. By slightly spreading the fingers the type can be inserted into the seat 172 of the carrier, and when the shank 173 reaches the bottom of the seat the hooks 177 on the flexible fingers 176 are in line with and spring into the openings or shoulders 178 in the type carrier and lock the type in position. By spreading the fingers apart they can be readily removed and new type inserted in their stead. If preferred, only one of the fingers need be provided with a hook 177.

Printing guide plate

For the purpose of compelling the printing to be done in perfect alignment, a guide is secured between the platen and type segments in position to be engaged by the type of the latter during the printing operation. This guide, as shown in Figs. 5, 6, 75, 86, and 88, consists of a plate 179 provided with a horizontal slot 180 forming upper and lower bars 181 and 182 which are beveled on their opposing sides so as to converge rearwardly. The slot is of the proper width to allow the type to pass through the same without vertical play.

As the type carriers move bodily rearward toward the platen their respective type at the printing position will pass through the slot 180 of the guide and engage the platen. If any of the type are out of alignment and engage with the beveled edge of either bar of the guide, such type will be directed by the respective beveled face to the printing line and caused to print on the record strip in alignment with the other type.

Automatic ribbon feed reverse

Means for automatically feeding the inking ribbon forward step by step and reversing the same when exhausted in the other direction are constructed as follows:

183, Figs. 3, 4, 5, 6, 7 and 8, represents the inking ribbon, which is arranged between the platen and the type of the several printing segments.

184 and 185 represent the two side pieces arranged on opposite sides of the printing devices, and 186, 187 and 188 are a plurality of transverse guide rods connecting the side pieces in rear of the type carriers and forming together a supporting or guide frame. On the upper and lower parts of the side pieces of this frame are mounted upper and lower transverse spindles or rods 189 and 190 which carry upper and lower spools 191 and 192 to which the upper and lower ends of the ribbon are secured while the intermediate part of the ribbon passes over the guide rods 186, 187 and 188. On corresponding ends the spools are provided with ratchet wheels 193 and 194, Fig. 3, the teeth of these wheels being oppositely inclined. Between the spools is arranged a ratchet bar 195 having its ends constructed to form pawls 196 and 197 and provided centrally with a V shaped cam slot 198. 199 represents a rock lever pivoted on the frame and provided on its rear arm with a pin 200 which engages with said V shaped cam slot 198. The ratchet bar is yieldingly held with either one end or the other of its V shaped slot in engagement with the pin 200 by means of a spring 201 connecting the central part of the ratchet bar with the rock lever. The front arm of the rock lever 199 is provided with a pin 202 which engages with a cam slot 203, Fig. 29, in the side piece 122 of the operating frame.

When the ratchet bar engages one end of its cam slot with the pin of rock lever the spring 201 is on one side of the center, and draws the pawl on the corresponding side of the rock lever into engagement with its ratchet wheel, whereby the respective spool is turned each time the machine is operated and the ribbon is progressively wound over the same. When the ribbon has been fully unwound from the other spool the rotation of the spool upon which the ribbon is being wound is arrested, the last mentioned spool thus acts as a stationary abutment which prevents the pawl engaging with its ratchet wheel from being moved forward by the rock arm. When this occurs, the tension of the spring 201 is overcome and the pressure of the rock lever causes its pin 200 to pass from one end of the V shaped cam over the high part to the other end thereof, thereby shifting the point of contact between the ratchet bar 195 and the spring 200 to the opposite side of the rock lever 199. When this occurs the previously active pawl end of the ratchet bar is disengaged from its ratchet wheel and the previously inactive pawl end of the ratchet bar is engaged with its ratchet wheel, thereby causing the movement of the ribbon to be reversed, and the ribbon to be wound up on the empty spool and unwound from the full spool. This operation is repeated whenever the ribbon is fully unwound from either spool.

Type carrier guide bars

The type carriers 144 are guided between a series of comb like bars 204 arranged vertically on upper and lower transverse rods 205 and 206, mounted on the side pieces 184 and 185 of the guide frame. These bars are spaced apart by washers 207 mounted on the rods 205 and 206 between the guide rods opposite to each type carrier, as shown in Figs. 3, 4, 5, 6 and 75.

Automatic zero printing

The means for automatically printing one or more zeros to the right of any number printed, where no key has been depressed for a lower order, are as follows:—

Each trip latch 163 is provided with a shoulder 208 on its left side and a latch or extending finger 209 on its right side. The finger 209 of each trip latch to the left is constructed to engage the shoulder 208 of the trip latch to its right, as shown in Figs. 5, 6, 20 and 27. When any trip latch 163 of a higher order (i. e. one to the left) is withdrawn from its cam arm 153 its finger 209 will engage the shoulder 208 of the trip latch to its right, displacing this latch. This latch similarly displaces the one to the right and so on down to the trip latch to the extreme right or lowest order. The trip latches of lower order are thus withdrawn from their respective cam arms 153 substantially simultaneously with any latch of higher order. Since the printing arms 142 and type carriers 143 of such lower orders have not been moved they present zeros at the printing point, and accordingly zeros will be printed to the right of a digit in all orders in which no digit key has been set.

Number key setting mechanism

Number setting keys are provided for the purpose of controlling the positioning of the number printing type segments during listing operations. The details of construction of these number keys, and many of the elements directly cooperating therewith, will not be described herein but reference may be had to the parent application for a full disclosure thereof.

For the purposes of this application, it is sufficient to note that the number keys 210 are arranged in columns of nine keys bearing designations from 1 to 9, as shown in Fig. 1, there being nine columns of such keys disclosed in this application. As is commonly the case in machines of this general type, each column of keys controls a corresponding type segment, suitable means being provided whereby the selected keys may be maintained in depressed position and released at the proper time, to permit them to exert their control over the related type segments. Each key is provided with a slot through which a differential stop bar 218 is adapted to slide until one of the lugs 222 on said bar engages the upper edge of the slot in the particular key that is depressed, (see Figs. 5 and 6). Any key, when depressed, is retained in its lowered position, by means of a hook 226 on a locking bar 219 (Figs. 5 and 6), as more fully disclosed in the parent application, until it is released either manually or by an operation of the machine, through means which will now be briefly mentioned.

Toward the end of the forward swing of the arm 123 of the main operating frame its forward edge engages a shoulder or lug 249 carried by an arm 248 which, at its lower end, carries a pin 909 adapted to cooperate with a shoulder at the lower end of a link 250. Continued forward movement of the arm 123 serves to rock the arm 248 and impart a longitudinal movement to the link 250 which in turn rocks upwardly the rock arm 251 to which it is connected at its upper end. Rocking of the arm 251 results in the rocking of a bail 245 which extends across and in rear of a series of fingers 239, one of which is associated with each of the locking bars 219 for the amount keys and, consequently, during the swing of the operating frame the hooks 226 are drawn downwardly to release the keys. A spring 252 serves to restore the bail 245 and connected parts to normal as the main operating frame recedes.

The slides 218 are connected at their lower ends to the upper arms 221 of the differential stop levers 35, so that the latter will thereby be controlled to assume positions corresponding to the keys depressed in the various columns. When the machine is operated and the bar 112 is drawn rearwardly from its position, shown in Fig. 5, the springs 281, connected with the stop levers 35, will pull the latter upwardly and move the slides 218 downwardly until one of the lugs 222 on each engages a depressed key.

If no key has been depressed in a particular column, which is the case when a zero is to be printed, the slide 218 is prevented from moving downwardly at all, thereby retaining the stop lever 35 in its normal inoperative position. This is accomplished by a member 261 which normally cooperates with a lug on the slide 218, as shown in Fig. 5. The member 261 is raised to ineffective position with respect to said slide, on the depression of any key in its particular column, by the action of the key on the cam projection 253 of a releasing slide 220 having a lifting cam projection 255 at its rear end (Fig. 6) as will more clearly appear from the disclosure of the parent application.

A second series of detent pawls 264 is arranged in rear of the detent members 261 and each is adapted to cooperate with the corresponding slide 218 to prevent it and the associated stop lever 35 from movement. These detent pawls are raised, by suitable means more fully disclosed in the parent application, having connections to the main operating mechanism of the machine so that the stop bars and levers will be released at the beginning of an operation.

Column lock or repeat

Means are provided whereby any of the keys of one or more columns, including the column of special keys, when depressed, may be made to remain depressed during any number of operations while the keys of the other columns are automatically released at the end of each operation. As many columns of keys as desired may be equipped with this device which is preferably constructed as follows, reference being made particularly to Figs. 1, 3, 10 and 10A. The restoring lug 239 on the lock bars 219 is formed on the end of an arm 382; this arm is pivoted at 238 on the front end of said lock bar; a key lever 383 is pivoted at its lower end on said arm 382 between its lug and its pivot and is provided at its upper end, which passes through an elongated opening in the upper guide plate of the keyboard, with a finger piece. At its lower end key 383 carries a rearwardly extending finger to which is attached a spring 384, the other end of which is attached to the upper guide plate 212; a pin 385 passing through and secured to said key lever 383 limits its upward movement through said guide plate by said spring. In its normal position the key lever 383 swings on its pin 385 as a fulcrum, as the lock bars 219 are moved back and forth and the restoring lug 239 is in its normal or elevated position ready to be engaged by the universal restoring bar 245 to withdraw the hooks 226 of the lock bars 219 from the keys, and release them as heretofore described. When it is desired to prevent this restoration of the keys in any column equipped with this column repeating device, the key 383 is depressed and allowed to move forward to engage its hook 386 under the plate 212, thereby depressing the lug 239 below the path of the restoring bar 245, and preventing the restoration of the keys of that column by the restoring bar so long as the key 383 is allowed to remain in the locked position, as shown in Fig. 10A.

*The identifying shifting keys and late restoring device*

361, 337, 346, 362, 363, 364, 365, 366, 367 and 368, Figs. 1, 3, 10, 59 and 67 represent a number of identifying keys, generally similar to the number keys and arranged in a longitudinal row, parallel with and to the left of the number keys. This location of the shifting keys facilitates their manipulation with the left hand while the right hand is engaged in setting the number keys and manipulating the operating key or lever. For the purpose of facilitating the manufacture of the machine, these keys are placed in close proximity to the mechanism to which they are connected.

The identifying shift keys are constructed to automatically print a sign or word to the right of and adjacent to the number printed, whenever the mechanism is under the control of one of these keys, to identify the key used and the nature of the operation; and to perform other functions, in connection with the computing features, which it will not be necessary to describe herein.

Means are provided for retaining the identifying keys, which have been depressed in their lowered positions, and for releasing the retaining means, during the operation of the machine, just as in the case of the number keys; separate releasing means being provided, however, for the shifting keys, to permit of releasing them at a different time from the number keys. For details of construction of the retaining and releasing means, reference may be had to the disclosure of the parent patent. By reference to Fig. 10 it may be noted, generally, that the locking bar 372, for the bank of shifting keys, is substantially the same as one of the bars 219 associated with the amount keys. For the purpose of releasing the shifting keys, however, a separate bail 373 is arranged to cooperate with a finger 239 carried by the locking bar 372. The bail 373 is rocked on the return movement of the main operating frame through connections comprising a hook 379, which is drawn rearwardly toward the end of an operation by means of a pin 380 mounted on the arm 122 of the operating frame, the forward end of the hook being connected to an arm 378 by means of which the shaft 377, arm 376 and bail 373 are rocked.

*Automatic character printing for identifying shift keys*

For the purpose of automatically printing an identifying character in conjunction with numbers printed when the machine is operating under the control of one of the identifying shift keys 361, 337, 346, 362, 363, 364, 365, 366, 367 and 368, the latter are made to co-operate with the printing device or segment 144 to the extreme right of those of the number setting keys.

The stop bar 369 of the identifying shift key is operatively connected to its co-operating differential stop lever by the upright lever 387 also mounted on the shaft 36 and the U shaped yoke 388, as shown in Fig. 10.

The differential stop lever 389 of the shift keys is pivoted on the rod 36 to the right of the differential stop levers 35 of the number setting keys, and in line with the shift key printing device.

The forwardly extending segmental portion 390 of the downwardly extending arm 25 of the identifying shift key printing device is in this case not supplied with gear teeth, as it does not operate any of the accumulating gears, but in all other respects it is constructed similar to the number key printing devices, excepting that the type 145 are identifying characters in place of numbers, whereby a different identifying word or character may be printed for each key of the row when any one of the said keys is in control of the mechanism.

*Ruling key locks number keys*

The column of shifting keys comprises a ruling key 363, controlling devices for effecting the printing of a horizontal line of ruling from ruling type 498 (Figs. 5 and 6) on the type heads 144. Since the type carriers 143 cannot be simultaneously controlled by the numeral keys and by the ruling key, means are provided whereby the number keys are locked against depression when the rule key 363 is depressed and whereby the rule key is locked against depression if any number key is depressed.

For this purpose the column of identifying keys is divided into two groups so that the keys of one group, including the rule key, will be operatively connected with a device for locking the number setting keys to provide the interlock referred to, whereas, the keys of the other group, including a special character printing key 361, will not be operatively connected with the locking device.

To permit of this difference in action between the two groups of identifying shift keys relatively to the number keys, the releasing bar for the identifying shift keys is made of two sections, 370 and 371. The rear section 370 of this releasing bar is related to the identifying shift keys, including key 361, while the front section 371 is related to a number of shift keys, including the rule key 363. Through connections more clearly shown in the parent patent, hereinbefore mentioned, the downward movement of the front section 371, upon depression of the rule key, will rock the bell crank 408 (Fig. 10) and cause the rearwardly extending arm of the latter to shift a cross-bar 410 (Figs. 5 and 6) transversely of the keyboard. As a result of this movement, a series of notches in the bar 410, which are normally in line with lugs 414 on the amount key bank releasing bars 220, are shifted out of line therewith and the solid portions of the bar are presented to the lugs 414 to prevent any forward movement of the bars 220. It will be apparent that by the same mechanism, if an amount key is depressed, its releasing bar will be shifted forwardly so that its lug 414 will enter one of the notches in the bar 410 and prevent the transverse shifting of the latter by depression of the rule key 363. Obviously, depression of the rule key will be thus prevented so long as an amount key is in depressed position. On the other hand, depression of any of the shift keys, associated with the rear section 370 of the release bar, will not affect the bell crank 408 or bar 410 and will merely shift the section 370 so as to carry the hook 465 away from the hook 466.

*Printing centralizing or aligning bar*

When numbers are being printed under control of the number keys the printing type 174 are arrested in their printing position by the contact of the toes 467 of the segments 25 with the differential stop bars 35.

In order to positively align the type segments at the printing line and compensate for any slight inaccuracies in workmanship, an aligning device is provided to cooperate with the teeth 23 of the actuating segments, and this device is constructed as follows:

468 represents a horizontal universal aligning bar or rod arranged transversely below the lower gear racks of the several actuating segments and connected at opposite ends with the front ends of rock arms 469 which are pivoted at their rear ends on the rod 44, as shown in Figs. 5 and 6.

The universal aligning rod is also connected by an upright link 469a with the key releasing arm 248. While the operating frame and actuating gear segments are in their normal retracted or rearward positions, the universal aligning rod is depressed, so that it stands below the path of the lower gear racks but, upon operating the machine, the actuating segments move freely forward until arrested by the differential stops, in accordance with the number keys which have been depressed, without interference from the aligning rod; and, during the last part of the forward movement of the operating frame, its right arm 123 engages the rock arm 248, as hereinbefore described; preparatory to operating the printing mechanism, whereby the universal aligning rod 468 is raised into the space between two adjacent teeth of each lower gear rack of the several actuating segments and held there while the printing is being effected. If any of the actuating segments is out of alignment the same will be forced into alignment by the aligning rod engaging between the respective pair of lower gear teeth 24, thereby bringing all the type at the printing position into more nearly perfect alignment.

During the first part of the subsequent return or downward movement of the operating frame, the rock arm 248 is permitted to descend and disengage the aligning rod 468 from the actuating gear segments before the same begin their backward or return movement.

*Ruling key*

Means are provided for automatically printing a horizontal line as, for instance, between the bottom of a column and its total and means are also provided for preventing the ruling key from being depressed when a number key is depressed and vice versa, as hereinbefore explained.

363 (Fig. 29) represents the ruling key, which is connected with a coupling hook 482 by a link 483, one end of which is pivoted to the coupling hook 482 and its other end to the lower end of a downwardly extending arm 484. The upper end of arm 484 is secured to one end of the rock shaft 485, to the opposite end of which is secured a rock arm 486 engaging with the lower end of the stem of the ruling key 363, said shaft and arms together forming an elbow lever (see Fig. 29).

The coupling hook 482 is provided with a shoulder 487 adapted to engage a pin 488 on the rearwardly extending arm 119 of the operating frame; the lower end of the coupling hook 482 is connected to a forwardly extending arm 489 of a U shaped swinging frame which comprises side arms 490 and 491, connected by a universal cross bar or rod 492 and which is pivoted on the shaft 40. The cross rod 492 is arranged in rear of the arms 64 of the carrying or movable stops 39.

When the cross rod 492 is swung forwardly the movable stops 39 are moved from under the stops 38 of the arms 25, which arms, it will be recalled, are rigid or integral with the printing arms 142, supporting the type carrier 143. Presser springs or elastic fingers 493 are arranged on a rock shaft or bar 494 pivoted in the frames d and e.

This shaft 494 is operatively connected to an arm 495 of the U shaped frame 490, 491 and 492 by a link 496, connected to an arm 497 fixed to said shaft 494.

When the ruling key 363 is depressed the coupling link 482 is moved backwardly, engaging its shoulder 487 with the pin 488 on the operating frame 119. When the machine is operated the pin on the operating frame moves downwardly causing the coupling link to swing the U shaped frame 490, 491 and 492, whereby the stops 39 are moved from under the stops 38 on the arm 25, and simultaneously the shaft 494 is rocked and the spring fingers 493 are moved into engagement with the stops 38 on the arms 25, forcing them and the arms backwardly until arrested by the stop bar 42.

This backward movement of the arms 25 causes their companion printing arms 142 to rise, and with them the type carriers 143 and type heads 144, thereby bringing the ruling type 498, which are constructed to print a horizontal line, to the printing position. The printing coupling dogs 169 are provided with an upwardly projecting nose 499, adapted to engage a cross bar 500 on the swinging frame 159 when the dogs 169 are raised into their elevated position by the upward movement of the arms 142. Thus, as the operating frame 119 approaches the end of its forward movement, the frame 159 withdraws the printing stops 165 from under the printing cam hammers 153, and the latter cause the type carriers 144 to move forward and impress the type on the platen or paper as has been hereinbefore described.

Upon the return movement of the operating frame the parts resume their normal position, as shown in Fig. 5. The ruling key is returned by a spring 501, and the frame 492 and the fingers 493 are forced back to their normal position by the springs 41 on the rear arms 64 of the carrying stops 39 (Fig. 5).

The ruling key is held in its depressed position until the completion of the operation, after which it is automatically released by the locking bar 372 in the manner heretofore described.

The ruling type is arranged on each type carrier 144 in advance of the zero type or, in other words, on that side of the zero type opposite the figure one type; by this arrangement of the ruling type it is only necessary to move the type carrier backwardly or upwardly one step from its normal or zero position in order to bring the ruling type into the printing position.

Special marking key

It is sometimes desirable to distinguish certain numbers in a column which is being added, from the rest of the numbers in the same column, for instance, when adding cash receipts it is desirable to distinguish between the checks and currency.

To permit classifying certain numbers in a column special means are provided for printing an identifying sign or character adjacent to these numbers at the same time that they are being printed by the regular number printing mechanism which is associated with the accumulating mechanism. This special identifying means comprises a special key 361 positioned on the key board at the upper or rear end of the column of identifying shift keys.

Upon depressing this key its stem engages the lug 253 of the rear section 370, Fig. 10, of the corresponding releasing bar and pushes the same forwardly, thereby raising the detent dog or pawl 261 and releasing the corresponding locking and stop bars 372 and 369.

Owing to the special key being the rearmost one of its row, the stop bar 369 when released, moves into its foremost position; thereby permitting the identifying printing segment with which it is connected to turn and bring the special sign type 529, Fig. 30, to the printing position at the right of the number which has been set up by the number keys, so that this number and the special sign will be printed simultaneously during the operation of the machine.

At the same time that the stop bar moves forwardly the locking bar moves rearwardly and locks the depressed special key down, while the remaining keys of the column are locked up or against depression.

The special key is held in this depressed or operative position during the operation of the machine and at the end of this operation the special key is automatically released, ready for the next depression.

By depressing the column repeat key or lock 383 the special sign 529 may be printed at the right of the successive numbers which are being added without the labor of repeating the depression of said key for each operation.

The remaining keys of this column operate in substantially the same manner, as to the identifying sign printing, with the exception that a different sign is printed for each one.

Operating lever

The driving power for the printing mechanism and other operated portions of the machine is furnished by a spring motor which may be tensioned in a variety of different ways. For details of construction of the spring motor and the motor winding means reference should be had to the disclosure of the parent patent.

One means for releasing the spring motor for operation, when desired to cause the printing of the numbers set up on the number keys or other data, is in the form of an operating lever 614 which, at the initial part of its stroke, performs the releasing function, as will be hereinafter described.

Means are provided which prevent the operating lever 614, after effecting the initial portion of its forward movement, from moving backward until it has completed its forward stroke, and which also compel the operating lever, after effecting the initial portion of its backward movement, to complete the stroke in this direction before it is again possible to move the same forward.

These means are combined with other devices which prevent the operating lever from moving backward until the operating frame moves backwardly and with further means, whereby the backward pull of the operating lever is utilized to assist in moving the operating frame and connecting parts backwardly.

The mechanism shown in the drawings for accomplishing these purposes is constructed as follows:—

679 represents a toothed detent segment which is secured to the operating shaft 615, as shown in Figs. 4 and 12. 680 and 681 represent the two jaws of a duplex detent pawl which project in opposite directions from the pin 682 by which they are pivotally secured to the frame e adjacent to the rack of the detent segment.

Projecting laterally from the duplex detent pawl between its jaws and extending along one side of the detent segment is a shifting arm 683, which is adapted to be engaged by either an upper tappet 684 or lower tappet 685 at opposite ends of the detent segment 679. The oscillating movement of the latter is limited by a stop 686 which is adapted to be engaged by upper and lower arms of the detent segment which act as shoulders for this purpose.

In the position of the parts shown in Fig. 12 the operating lever is in its rearmost position, in which the lower arm of the segment 679 engages the stop 686 and the duplex pawl is turned by the lower tappet 685 so as to engage the front detent jaw 681 with the foremost teeth of the detent segment.

The duplex detent pawl is yieldingly held in this position by means of a tension device consisting of a pivoted tension arm 687 having a roller 688, and a spring 689 operating to shift said arm so as to engage its roller with a trip or retaining lug or nose 690 on the central part of the duplex pawl opposite the shifting arm, as shown in Figs. 12 and 13. The tension roller 688 bears against the rear side of the trip lug of the duplex detent pawl, thus holding the front beak of the same in engagement with the teeth of the detent segment.

Upon moving the operating lever forwardly, while the parts are in this position, the teeth of the detent segment will trip successively past the front beak of the duplex detent pawl but the latter prevents backward movement of the operating lever and detent segment at this time.

During the last part of the forward movement of the detent segment its upper tappet 684 strikes the shifting arm 683 of the duplex detent pawl and turns the latter so that its front beak is disengaged from the teeth of the detent segment while the rear beak of said pawl is engaged with the same.

Assuming that other conditions will not prevent it, the operating lever and detent segment may now be moved backward a complete stroke; any attempt to move the detent segment and operating lever forwardly, after the initial position of the backward stroke has been effected, being arrested by the rear beak of the duplex detent pawl.

At the end of the backward or return movement of the operating lever and detent segment the lower tappet on the latter engages the shifting arm 683 of the duplex detent pawl and turns the same so that its upper beak is disengaged from the detent segment and its lower beak is engaged therewith, preparatory to commencing the next forward stroke of the operating lever, as shown in Fig. 12.

While the machine is at rest the main shaft 108 is held against turning by a stop dog 690ª having a shoulder 691 which is yieldingly held in engagement with a shoulder 692 on the stop disk 109 of the main shaft 108 by a spring 693, as shown in Figs. 11 and 12.

During the first part of the forward stroke of the operating lever and detent segment the dog 690ª is released from the shoulder 692, permitting the main shaft 108 to turn forwardly under the action of the spring. 694 represents a releasing rod provided with a hook or shoulder 695 which is adapted to engage with a finger 696 on the stop dog 690ª and disengage the same from the stop disk 109 of the main shaft. This releasing rod is held in position by the spring 693 and is connected with the lower arm 697 of an upright intermediate rock lever. The upper arm 698 of this lever is connected by a link 699 with a depending trip arm 700 which has a roller 701 at its lower free end, this roller is adapted to engage with a cam 702 on the detent segment. In the normal or elevated position of the detent segment, the roller of the trip arm 700 engages with the lower part of the cam 702, being held yieldingly in this position by the spring 703, connected with the upper arm 704 of the intermediate rock lever 705, as best shown in Fig. 15, whereby the shoulder 695 of the releasing bar or rod 694 is moved in rear of the stop dog 690ª, as shown in Fig. 12.

During the first part of the forward movement of the operating lever and detent segment the inclined part of the cam 702, by engaging with the roller 701, turns the rock arm 700 and lever 698 in the direction for moving the releasing bar 694 forwardly, whereby the shoulder 695 of the latter engages the stop dog 690ª, and disengages the same from the shoulder 692 of the stop disk 109, thereby permitting the main shaft 108 to turn forward under the action of the driving spring contained in the drum 630.

Immediately after the main shaft 108 commences to turn forwardly and the shoulder of the stop disk 109 has passed the shoulder of the dog 690ª, a pin or cam 706 on the stop disk 109 engages with the tail or rear end of the releasing bar 694 and depresses the same sufficiently to disengage its shoulder or hook 695 from the stop dog 690ª.

The shoulder 691 of the latter is now drawn by the spring 693 against the periphery of the stop disk 109 ready to stop the same and the main shaft at the end of one rotation of these parts by engaging with the stop shoulder 692 of the stop disk.

The operating lever and detent segment, upon completing their forward movement, are prevented from moving backwardly until the operating frame also complete its forward movement. This is effected by means of an auxiliary detent pawl 707 which is arranged at the side of the front beak 681 of the duplex pawl and is yieldingly held in engagement with the same tooth of the detent segment by a trip lug or nose 708 formed on the auxiliary detent pawl 707 and engaged by the roller 688 of the tension device, as shown in Fig. 12.

709 represents a shifting bar or hook pivoted on the operating frame and engaging its mouth with a pin 710 on the auxiliary detent pawl 707.

While the operating frame is making its forward stroke the auxiliary detent pawl engages with the detent segment, as shown in Fig. 12 and, at the end of the forward stroke of the operating frame, the rear shoulder 711 of the mouth of the hook engages with the pin 710 of the auxiliary detent pawl 707 and turns the same sufficiently to disengage it from the detent segment 679, at which time its trip lug 708 has been shifted on the opposite side of the tension roller, whereby the auxiliary detent pawl is held out of engagement from the detent segment.

The movement of the auxiliary detent pawl 707 away from the detent segment is limited by a stop 712 on the frame as shown in Fig. 12.

This disengagement of the auxiliary detent pawl may occur before the detent segment has completed its forward movement, in which case the segment is still under control of the duplex detent and must complete its forward stroke before beginning the return stroke.

During the last part of the backward or return stroke of the operating frame 123 the front shoulder 713 of the shifting bar or hook 709 engages the pin 710 of the auxiliary detent pawl, and turns the latter into engagement with the detent segment, bringing its trip lug 708 in front of the tension roller so that the latter again holds the auxiliary detent pawl yieldingly in its operative position, as shown in Fig. 12.

Means are provided which permit the operating lever and detent segment to move forward independently of the operating frame but which couple said lever and segment with the operating frame during the backward movement of these parts. This is effected by means of a coupling pawl 714, pivoted on the detent segment and having a shoulder 715 which is adapted to move into and out of the path of a pin or shoulder 716 on the rear arm 132 of the operating frame 122, a presser finger 717, Fig. 14, connected by a spring 718 with the detent segment 679, a rock lever having its rear arm 719 connected with said presser finger and pivoted on the detent segment, and upper and lower stops 720 and 721 adapted to engage alternately with the front arm 722 of said rock lever and turn the same for causing the presser finger 717 to bear against the coupling pawl on one side or the other of its pivot 723.

As shown in Fig. 12, the presser finger bears against the coupling pawl above its pivot, causing the same to be shifted rearwardly with its shoulder 715 out of engagement from the shoulder or pin 716 of the operating frame 132. The coupling pawl remains in this position until the detent segment is near the end of its forward stroke, when the front arm 722 of the rock lever strikes the lower stop 721 and is turned thereby to shift the presser finger into engagement with the coupling pawl below its pivot. The instant this occurs the coupling pawl is carried with its free end against the shoulder 716 of the operating frame with the shoulder 715 of the coupling pawl 714 arranged below the shoulder 716 of the operating frame.

If now the operating lever and segment are released and are drawn upwardly by their return spring 616, the coupling pawl 714 will operatively connect said lever and segment with the operating frame, so that the pull of the spring 616 will assist the operating frame in effecting its backward movement, thereby returning its reserve energy to the main spring. The operating lever and detent segment can never move backward or return independently of the operating frame, and since the speed of said frame is controlled by the governor a quick and noisy return of the operating lever and detent segment is prevented, while at the same time the power stored in the spring 616 is utilized in assisting the return of the operating frame to its normal position.

*Operating keys*

Instead of operating the machine by means of the operating lever the same may be operated by one of three operating keys 753, 754 and 755, for purposes hereinafter to be described. As shown in Figs. 1, 12 and 16, these keys are arranged in a longitudinal row at the right hand side of the machine, the main key 753 being in the middle of the row, the auxiliary key 754 at the front end of the row, and the repeating key 755 at the rear end of the row.

The shanks 756, 757 and 758 of the operating keys, as shown in Fig. 16, are guided in the top plate 212 of the machine at the right side thereof so as to be capable of vertical movement but the same may be guided in any other suitable manner.

At its lower end the shank 756 of the main operating key 753 is conected with the rear arm 759 of a triple armed rock lever, which is pivoted on a stud 760 on the fram b.

Pivoted on this stud, adjacent to the rock arm 759 is an intermediate or lower triple armed rock lever, having a rearwardly projecting arm 761 provided with a finger 762 which normally bears loosely against the under side of the rock arm 759, and a depending arm 763 provided with a lug or shoulder 764, as shown in Figs. 12 and 16.

The lower end of the shank 757 of the auxiliary operating key 754 is connected with the upper rearwardly projecting arm 765 of an elbow lever, the lower depending arm 766 of which is connected with the rear end of a link 767. The rear end of said link is provided with a slot 768 which receives a pin 769 at the lower end of the depending arm 763 of the lower triple armed rock lever, as shown in Figs. 12 and 16.

The shank 758 of the repeating operating key 755 is connected with the rear end of the upper rearwardly projecting arm 770 of an elbow lever, the lower depending arm 771 of which is connected with the rear end of a link 772. The front end of the latter is provided with a slot 773 which, like the slot 768, receives the pin 769 on the depending arm 763 of the lower triple armed rock lever.

Upon depressing the main operating key 753 the same turns the upper triple rock lever, and the rear arm 759 of the latter by engaging the lug 762 of the rear arm 761 of the lower triple lever causes the last mentioned lever to also turn in the same direction. While thus depressing the main operating key, the auxiliary and repeating operating keys are not affected because the pin 769 of the lower triple rock lever 763 at this time simply moves idly forward in the slots 768 and 773 of the links 767 and 772. Upon depressing the auxiliary operating key 754 the rear end of the slot 768 in the link 767 engages the pin 769 and turns the lower triple lever in the same direction in which it was moved by the main operating key without, however, shifting the latter nor the repeating operating key, because the rear arm 761 of the lower triple lever simply moves downwardly away from the corresponding arm 759 of the upper triple lever, and the pin 769 moves idly forward in the slot 773 of the link 772 of the repeat key 755. Upon depressing the repeating operating key 755 the rear end of the slot 773 in the link 772, by engaging with the pin 769, turns the lower triple lever in the same direction in which it was turned by the main and auxiliary operating keys, but the latter remain at rest or unaffected, owing to the movement of the rear arm 761 of the lower triple lever away from the corresponding arm of the upper triple lever and the idle movement of the pin 769 in the slot 768 of the link 767 at this time. It will thus be noted that the lower triple lever can be moved forwardly by any one of the operating keys without affecting or disturbing either of the other operating keys. The purpose of this construction will be described hereafter.

The several operating keys are normally held in an elevated position and the parts connected therewith are retracted by means of springs 774, 775 and 776 connected, respectively, with the rock arms 759, 765 and 770, as shown in Figs. 12 and 16.

Engaging with the under side of the rear rock arm 761 of the lower triple lever is a forwardly projecting rock arm 777 which is formed integrally or connected with the rock arm 700 cooperating with the cam 702 of the detent segment 679.

Upon depressing any one of the operating keys 753, 754 or 755 this movement is transmitted successively by the arms 761, 777 and 700, link 699, rock arms 697 and 698 and releasing bar 694, to the stop dog 690ª for disengaging the latter from the shoulder 692 of the stop disk 693, thereby releasing the operating shaft 108 and permitting the machine to perform a cycle of operations by power derived from the spring motor or other source.

*Means for making the machine operative or inoperative*

Mounted in bearings on the base near the rear of the machine is a transverse shaft 890, to the opposite ends of which are secured a horizontal arm 851 and a vertical arm 852 forming an elbow lever, as shown in Fig. 12.

The horizontal arm 851 has a finger 853 on its end adapted to bear on the releasing bar 694, while the upper end of the vertical arm 852 is adapted to bear against a finger 854 on the lower end of an arm 855 depending from the trip latch 268, as shown in Fig. 12.

A spring 856, one end of which is attached to the vertical arm 852 and the other to the rear end of the frame, tends to normally hold these arms in their retracted position. About midway of the vertical arm 852 is a pin 857 engaging a slot 858 in the front end of a key 859, the other end of which is mounted in an opening in the rear frame, and has a downwardly extending finger 860 and a detent shoulder 861.

If the shift key is in its rearward, released or normal position the dog 268 and release bar 694 are not affected by the arms 852 and 851. If the key 859 is pressed inwardly or forwardly it will be held in this position by the detent shoulder 861 engaging the rear frame, and the vertical arm 852 will be forced forward, engaging the finger on the lower arm 855 of the trip dog 268 thereby making the latter inoperative, and the horizontal arm 851 will bear with its finger 853 on the release bar 694, thereby depressing the hook 695 of the latter below the stop dog and preventing the latter from being disengaged from the stop wheel, whereby the machine is rendered inoperative.

Upon releasing the shift key and permitting the same to move rearwardly into its inoperative position the upright and horizontal arms 852 and 851 are retracted, permitting the dog 268 and the hook 695 of the release bar 694 to again resume their normal position and enabling the machine to be operated.

Non-print key

A non-print key 921 is provided and operatively connected with the printing mechanism for the purpose of disabling the printing function of the machine when desired. The non-print key 921 is arranged in the rear lower part of the machine, as shown in Figs. 2 and 63, and has its shank 922 provided with a shoulder 923 which is adapted to engage with the front side of the rear part of the frame. A non-print bar 924, Figs. 5 and 6, is arranged transversely below the releasing hooks 169; rock arms 925 and 926 supporting opposite ends of the non-print bar 924 are pivoted on a bar 930 supported on the frames d and e, and a depending arm 927, Fig. 63 is connected at its upper end with the rock arm 926 and at its lower end with the front end of the shank of the non-print key 921. A spring 928 one end of which is connected to a stationary part of the machine and the other end to the depending arm 927, forces the latter and the key stem rearwardly until arrested by the pin or stop 929 on said stem contacting with the rear frame of the machine. Upon pushing the key 921 forward and downward to engage its shoulder 923 with the frame, the non-print bar 924 will be lifted and held, whereby the releasing hooks 169 are held against moving their lower shoulders 170 into the path of the printing frame bar 171 and the printing mechanism is rendered inoperative.

Paper carriage

The mechanism for supporting and feeding the paper or sheet which receives the record is constructed as follows:

930, Figs. 5 and 51, represents a horizontal track arranged transversely in the rear part of the machine and supported on arms 931 and 932 of the main frame.

On this track is mounted a transversely movable carriage 933 on which the sheet supporting platen or roller 148 is mounted in such a way as to be capable of moving with the carriage and also movable forward and backward, or at right angles to the movement of the carriage, into and out of the printing position relatively to the type carrying heads or segments 144.

The means for thus operatively connecting the platen with the carriage comprises a pair of horizontal supporting arms 934 and 935 projecting forwardly from opposite ends of the carriage, a pair of intermediate upright rock arms 936 and 937 pivoted at their lower ends on the supporting arms 934 and 935 by means of a horizontal rod or shaft 938, and two horizontal platen supporting rock arms 939 and 940 pivoted at their rear ends on the upper ends of the intermediate rock arms 936 and 937 by a rod 941, and pivotally supporting the shaft of the platen at their front ends, as shown in Figs. 1, 2, 3, 5, 6, 8, 51, 53 and 96.

The record sheet is held against the platen by means of guide rollers 942 and 943 bearing against the front part of the platen on opposite sides of the printing line or space; each of these rollers is supported at opposite ends on the front arms of the presser levers 944, 945, 946 and 947, which levers are pivoted on the adjacent platen arms and turned in the direction for yieldingly holding the guide rollers against the platen by means of springs 948 bearing against the rear arms of the presser levers. When it is desired to place a sheet in position for printing, the rear finger pieces 949 of the presser levers are pressed together, thereby separating the guide rollers from the platen and permitting a sheet of paper to be placed between. Upon subsequently releasing the presser levers the guide rollers will press the sheet against the platen and hold it in place while the record is being printed thereon.

The downward movement of the platen 148 relatively to the intermediate rock arms 936 and 937 may be limited by a stop device of any suitable construction, for instance, by a stop lug arranged on one of the platen arms and engaging with the adjacent intermediate rock arm.

Normally the intermediate rock arms 936 and 937 are moved backwardly by a spring 950, and the platen is held away from the printing position, as shown in Fig. 5, whereby the printed portion of the record sheet is visible to the operator over the top of the machine.

951, Figs. 2, 3, 5, 6, 31, 32, 66 and 96, represents a depending rock arm forming part of the mechanism whereby the platen is moved or swung into and out of printing position. The lower end of this platen swinging rock arm or lever stands opposite of one part or another of a backwardly and forwardly vibrating shifting bar 952 which is arranged transversely in the machine below the platen. This bar is connected with the rear end of two horizontal rock levers or arms 953 and 954, the front ends of which are pivoted on the upper ends of upright rock arms 955 and 956, secured to the rock shaft 805. Projecting forwardly from shaft 805 is a cam arm 957 having a roller 958 which engages with a rotatable cam 959 on the main shaft 108 as best shown in Figs. 31 and 32.

Whenever the cam 959, during its rotation, engages its high part with the roller 958, the rock shaft 805 and upright rock arms 955 and 956 are turned in the direction for moving the bar 952 backwardly, thereby causing the platen swinging arm 951 to be moved in the same direction and the platen to move forwardly into the printing position, as shown in Figs. 6 and 32.

The highest part or face 960 of the platen swinging cam is made as a dwell, so that the platen remains momentarily at rest in its foremost position and permits an impression of the type to be produced on the same at this time without liability of blurring the record sheet. As the cam 959 continues to turn and comes to rest with its lowest face in engagement with the roller 958 the platen is withdrawn into its rearward or inoperative position, as shown in Figs. 5 and 31.

Paper feeding mechanism

The mechanism whereby the paper is fed forward is constructed as follows:—

961 represents an actuating or driving gear wheel pivoted loosely on the rod or shaft 938 at the left end thereof and meshing on its upper side with the driven gear wheel 962 on the adjacent part of the platen shaft 966, while its lower side meshes with the paper return gear wheel 963 mounted on the adjacent part of the carriage, as shown in Figs. 3 and 41.

During the ordinary intermittent forward feeding movement of the platen the paper return gear wheel 963 is only capable of moving forward, or in the direction of the arrow in Fig. 41, and is held against backward movement by a detent device forming part of a paper return mechanism to be hereafter described.

964, Figs. 2 and 41, represents a rock sleeve journalled loosely on the rod or shaft 938 and provided at its right or inner end with a short depending feed arm 965, which is arranged in rear of the shifting bar 952 in position to be engaged thereby, while its left or outer end is provided with a rearwardly projecting feed arm 967. The feed arm carries one or more actuating or feed pawls 968 and 969 which engage with the teeth on the rear side of the driving or intermediate actuating gear wheel 961, two of said pawls being shown in the drawings, of different length, so as to permit obtaining fine feeding steps, although the teeth of the feed gear wheel are comparatively coarse.

These pawls may be held in place either by springs or gravity. As the shifting bar 952 moves rearwardly under the action of the cam 959 and engages the platen swinging arm 951 the bar 952 also engages the paper feed arm 965 and moves the arms simultaneously rearward.

During this movement of the paper feed arm the feed pawls engage with the driving or feed wheel 961 and rotate forwardly therewith, while the platen and its gear wheel move bodily to the printing position.

While the driving or feed gear wheel 961 is turning forwardly about its axis the paper return gear wheel 963 is rotated forwardly to the same extent, inasmuch as these gears intermesh.

During the subsequent bodily backward movement of the platen and its gear wheel the paper return gear wheel 963 is held against backward rotation by the detent device, above referred to, so that the return gear wheel 963, at this time, acts as a stationary abutment and prevents backward rotation of the intermediate feed or driving gear wheel.

This causes the platen gear wheel 962, during its bodily backward movement with the platen, to also rotate forwardly with the same and thus feed the record sheet or paper forwardly one step or space relatively to the printing mechanism.

It should be noted, however, that the effective feeding of the paper with respect to the printing line of the machine occurs on the movement of the platen forward to print receiving position; by reason of the fact that it is upon this movement that the pawls 968 and 969 engage and rotate the gear 961. The gear 961 being in mesh with gear 962, the rotation of gear 961 by the feed pawls has the effect of preventing the clockwise rotation of gear 962 about its axis, which rotation occurs upon the forward movement of the platen if the gear 961 is stationary. Thus, when gear 961 is rotated by the feed pawl while the platen is advancing to printing position, the line upon the platen which comes opposite the printing point will be a line space lower than the line upon the platen which will come opposite the printing point if the gear 961 is stationary, and the line spacing movement of the paper with respect to the printing line of the machine takes place in each operation before printing is performed.

As the paper feed arms 965 and 967 and sleeve 964 return to the normal position the feed pawls 968 and 969 trip idly backwardly over the teeth of the intermediate gear wheel preparatory to effecting the next feeding movement of the platen.

When it is desired to feed the paper forward or backward quickly to any desired position, this can be done by taking hold of knobs or buttons 910 at opposite ends of the platen shaft, raising the same sufficient to disengage the gear wheel 962 from the gear wheel 961, turning the platen to the required extent and lowering it to reengage said gear wheels. If printing in alignment with printing already done is desired, it is sufficient to approximately position the platen, as it will be accurately aligned by the engaging of the teeth of gears 961 and 962.

To permit of varying the extent of the forward feed of the paper at each operation of the machine and, also, to entirely stop the paper from being fed, an adjustable stop device is provided which varies the extent of the backward movement of the ratchet mechanism. The preferred means for this purpose consists of a vertically adjustable stop lever 971 pivoted on the carriage and having a front arm 972, which is adapted to be engaged by the feed arm 967 during the last part of its return stroke, and a rear arm 971, which is adapted to engage with one or the other of a vertical row of stop shoulders on a post 973 rising from the carriage, as shown in Figs. 2, 3, and 41. When the stop lever is adjusted so that its rear arm 971 engages the highest shoulder or stop on the post 973 the greatest forward feed of the paper is possible but upon engaging the rear arm 971 of the stop lever with a lower notch the extent of the backward movement of the feed arm and the subsequent feeding movement is reduced in the same measure until the rear arm of this lever reaches the lowermost notch, when the feeding action of the arm 967 is stopped altogether. During the last part of the backward movement of the feed arm 967 and pawls 968 and 969 the latter are disengaged from the driving gear 961 by means of tails 974 and 975 projecting forwardly from the pawls and engaging with an upwardly turned lip 976 on the front arm 972 of the stop lever. While the pawls 968 and 969 are thus disengaged from the driving gear wheel 961 the paper return mechanism, to be hereinafter described, is free to operate.

By means of the foregoing mechanism the platen is positively moved forward into the printing position every time the operating mechanism operates and the operating mechanism is prevented from moving forwardly independently of the movement of the platen into the printing position, thereby avoiding the possibility of omitting a number from the record sheet which has been added in the accumulating mechanism.

*Means for rendering the platen swinging and paper feed mechanism inoperative*

It is desirable at times to prevent the printing of numbers and in so doing to likewise prevent the swinging of the platen and the feeding of the record sheet.

For this purpose the platen swinging and feed mechanism is rendered inoperative. This may be accomplished by securing arm 956 to rock shaft 805, mounting the cam arm 957 loosely on said shaft; and providing a latch 977 which is pivoted at its front end on the arm 957 and provided at its rear end with two notches or jaws 978 and 979, either of which may be held in engagement with a pin 980 on the rock arm 956 by a spring 981 connecting a tail 982 on the latch 977 with the arm 956, as shown in Figs. 31 and 32. When the latch 977 engages its rear notch 978 with the pin 980 the front end of the cam arm 957 is held in the path of the cam 959, so that the latter rocks the shaft 805 and arms 953 and 954 during each operation of the machine and causes the platen actuating bar 952 to be moved backward and forward, whereby the platen is swung to and from the printing position and also turned for feeding the paper forwardly. Upon moving the latch rearwardly by means of the thumb piece or key 984, and engaging the front notch 979 of the same with the pin 980, the cam arm 957 is raised so that its roller clears the path of the cam 959, and the rotation of the cam will not affect the platen swinging and turning mechanism and the latter will therefore not wear unnecessarily nor consume power.

Platen swing inoperative

When it is not desired to have the platen recede from the printing device after each operation of the machine for inspection, but remain permanently in the printing position; but still allow the paper feed mechanism to remain operative, this may be effected by means of a tail 985, Figs. 3 and 42, secured to the rock shaft 938 of the carriage swinging lever 937 and provided with a shoulder 985a and a dog or pawl 986 pivoted on the paper carriage and adapted to engage with the shoulder 985a. When it is desired to render the platen swinging mechanism inoperative, the platen is moved forwardly to the printing position and the dog 986 is engaged with the shoulder 985a on the tail 985, thereby locking the platen in its printing position.

Paper returning mechanism

Means are provided whereby the mechanism may be set to indicate when the printing has reached a predetermined position in a column on the paper.

Means are also provided whereby, after such a position has been reached, the platen may be caused to automatically return the paper to the upper printing line and simultaneously shift the carriage one column to allow the printing to be done in the next column. These mechanisms are best illustrated in Figs. 3, 5, 6, and 34 to 52.

987 represents a return shaft which is connected at its left end with the return gear wheel 963, and journaled in a bearing on the forwardly extending arm 935 on the carriage as shown in Figs. 3 and 41. This shaft and wheel are compelled to move lengthwise with the paper carriage but are free to turn relatively thereto. 988 and 989 represent the two sections of a return gear pinion arranged on the same hub, which is journaled on a stationary bearing on an extension 990 of the arm 931 at the right side of the main frame, as shown in Figs. 5, 6, 41 and 51. This hub receives the right end of the return shaft 987 and the two are compelled to turn together but the return shaft is capable of sliding axially in said hub by making the co-operating bore of the hub, and the periphery of the return shaft flat sided, or by connecting these parts by a spline.

Meshing with the under side of the outer section of the return pinion is an index gear wheel 991 which is pivoted by a short transverse shaft 992 on a vertically movable supporting rock arm 993 (Figs. 34 and 35).

The front end of rock arm 993 is pivoted at 995 on an arm 994, secured to the arm 931 of the main frame (Fig. 51), and its rear end is normally held in an elevated position for holding the index wheel in mesh with the return pinion section 988, by means of a shoulder 996 on the lower arm 997 of a retaining elbow lever pivoted loosely on a horizontal escapement shaft 998 journaled transversely in fixed bearings on the upper rear part of arms 931 and 932 of the main frame.

Adjacent to one side of the index wheel 991 is arranged a spiral return spring 999 which is connected at one end with the hub of the index wheel 991 and at its opposite end with a pin 1000 on the supporting arm 993, as shown in Figs. 34, 35, 36 and 37.

The relation of the return pinion 988 and index wheel 991 to the platen 148 is such that when the latter is turned forward one space or tooth the return pinion and index wheel are also turned forward in the same measure and the spring 999 is wound up to the same extent.

On its opposite side the index wheel is provided with a circumferentially adjustable tappet or cam 1001, as shown in Figs. 43 and 8, which forms part of the means for indicating to the operator the position of the sheet on the platen and the fact that the record has extended downwardly to a predetermined line on the record sheet.

The adjustment of this tappet 1001 may be variously effected, that shown in the drawings consisting of a spring ring 1002 arranged alongside of the index wheel and carrying the tappet 1001 on its periphery, a spring arm 1003 projecting inwardly from the bore of this ring diametrically opposite the tappet and mounted to turn on the index shaft 992, and a setting tooth 1004, Fig. 37, arranged on the spring ring and adapted to engage in the space between different teeth of the index wheel 991 at the side thereof.

Within the spring ring 1002 the index wheel is provided with an annular row of graduations 1005 which are traversed by a pointer 1006 on the spring ring.

By means of a finger piece or handle 1007 on the spring ring the latter may be deflected laterally sufficiently to disengage the setting tooth 1004 from the teeth of the index wheel 991 and, after turning the ring until the tappet and pointer are in the desired position relatively to the scale on the index wheel the finger piece is released, thereby reengaging the setting tooth 1004 with the teeth of the index wheel 991 and compelling the same to turn together.

At the end of its forward movement with the index wheel the tappet 1001 engages a latch 1008 (Fig. 40) on the lower end of a trip arm 1009. This latch 1008 is pivoted on the trip arm 1009 and is provided with a shoulder 1010 engaging with said arm for holding the latch rigid with the trip arm when engaged by the tappet 1001 during the forward movement of the latter, but permitting the latch to yield against the resistance of a spring 1011 when engaged by the tappet during the backward movement of the index wheel.

The trip arm 1009 together with a companion trip arm 1012 with which it is connected by a bridge 1013, as shown in Figs. 40 and 78, are hung loosely at their upper ends on the transverse escapement shaft 998 so as to turn together.

The companion trip arm 1012 is connected at its lower end with the front end of a longitudinal trip bar 1014, as shown in Fig. 43.

The front end of this bar is connected with the upper rear arm 1015 of a vertically swinging elbow shaped trip latch, the lower front arm 1016 of which is provided at its front end with two shoulders 1017 and 1018 arranged different distances from a pivot rod or shaft 1019 supported in the main frame upon which shaft the trip latch is loosely mounted (Figs. 4, 43 and 44).

1020 represents the upper rear arm of an elbow shaped key lever which is pivoted on a transverse shaft or rod 1021, which is provided with a lug or shoulder 1021a for engaging with one or the other shoulders 1017 and 1018 of the latch arm 1016.

The front arm 1022 of this key lever is connected with the lower end of the key stem 1023 which is movable vertically in the top of the keyboard and carries the paper return key 1024, Fig. 1, for controlling the return of the paper from the bottom to the top and, also, the advance of the carriage from one column to the other. A spring 1025, shown in Fig. 43, operates to draw arms 1020 and 1015 of the key lever and latch together and also to raise the key 1024 when the latter is free.

1026 and 1027 represent a pair of detent pawls of different length pivoted on the arm 990 of the main frame, and engaging their front arms with the section 989 of the return pinion, as shown in Figs. 41, 43, 44 and 51.

The rear arms 1028 and 1029 of these pawls are adapted to be engaged by a releasing arm 1030 which, together with a companion releasing arm 1031 connected therewith by a bridge 1032, are hung loosely on the escapement shaft 998, as shown in Figs. 1, 8, 44 and 78.

The lower end of the companion arm 1031 is connected with the rear end of the releasing bar 1033 which latter has a shoulder 1034 at its front end adapted to engage with a shoulder 1035 on the upper arm 1020 of the key lever.

The releasing arm 1030 is provided with a laterally projecting finger which is adapted to engage with the under side of the rearwardly projecting tails 1028 and 1029 of the detent pawls.

Normally the key 1024 is in the depressed position, the detent pawls 1028 and 1029 are in engagement with the return pinion section 989, as shown in Fig. 41, the trip latch 1016 engages its front shoulder 1018 with the rear arm 1020 of the return key lever, as shown in Fig. 4, and the releasing bar 1033 is disengaged from the shoulder 1035 on the rear upper arm 1020 of the return lever.

When the sheet of paper has been fed forwardly by the platen to the predetermined line at which the tappet 1001 has been set, the latter moves the trip arms 1009 and 1012 backwardly, which movement draws the trip bar 1014 in the same direction and turns the trip latch so that its front arm 1016 disengages its front shoulder from rear arm 1020 of the return key lever, thereby permitting the key 1024 to rise.

When this occurs the rear shoulder 1021a of the key lever arm 1020 drops back to the rear shoulder 1017 of the trip latch arm 1016, and the front shoulder 1035 of the key lever arm 1020 passes in rear of the shoulder 1034 of the releasing bar 1033 so as to be engaged thereby, as shown in Fig. 43.

When the parts are in this position the operator can still print additional numbers at the foot of the column on the sheet of paper, within certain limits, but the rising of the return key 1024 acts as an indicator or warning that the record has reached the approximate place on the sheet where it is desired to end the column.

At this time, or after printing such additional numbers as may be desirable, the operator depresses the paper return key 1024. This causes the rear arm 1020 of the key lever to draw the releasing bar 1033 forwardly, which movement turns the releasing arms 1031 and 1030 forwardly and causes the finger on the latter to lift the rear tails 1028 and 1029 of the detent pawls and disengage the front ends thereof from the return pinion 989, as shown in Fig. 44. When this occurs the train of gearing between the return spring 999 and the platen is released, permitting the spring 999 to unwind and turn the platen backwardly by means of the intermediate gearing until the upper part of the paper is opposite the printing position. At the same time the carriage is advanced one column by the mechanism hereinafter described.

The feed pawls 968 and 969 are at this time, or when the machine is not being operated, disengaged from the driving gear wheel 961 by their tails 974 contacting with the upwardly turned lip 976 on the adjusting lever 972, as shown in Fig. 41, and therefore offer no resistance to the free turning of the train of gears at this time.

The detent pawls 1026 and 1027 operate as the means for holding the return wheel 963 and driving wheel 961 against backward rotation while the platen support is moving backwardly from the printing position and thus cause the platen to rotate forwardly to advance or feed the paper forwardly one space, as hereinbefore described.

When the platen has thus been turned backwardly until the upper end of the record sheet or paper is again opposite the printing position, the backward rotation of the platen is arrested and the parts are restored to their normal position, preparatory to again commencing the forward rotation of the platen and feed of the paper, by automatic means which are preferably constructed as follows:

1036 and 1037 represent two upright restoring arms which are secured at their lower ends to the short shaft 992 adjacent to the inner side of the index wheel 981 and at the inner end of this shaft, as shown in Figs. 37 and 39, so that these parts turn together.

The outer restoring arm 1036 is arranged in the path of a restoring pin 1038 on the inner side of the index wheel, while the inner restoring arm 1037 is connected with the rear end of a longitudinal restoring bar 1039.

The front end of the restoring bar 1039 is connected with the upwardly extending arm 1040 of a restoring elbow lever which is pivoted on the rod 1019, and has its front arm 1041 provided with a lug or shoulder 1042, which is adapted to engage with the under side of the releasing bar 1033 (Fig. 45).

1043 represents a horizontal trip arm which is arranged along the inner side of the index wheel and which, together with the dog or arm 997, forms a tripping elbow lever.

These arms are held rigidly against separation beyond a predetermined position relatively to each other by means of a finger 1044 on the arm 997 engaging with the back of the other arm 1043 and these arms are turned outward relatively for yieldingly engaging the finger 1044 with the arm 1043 by a spring 1045, as shown in Figs. 34, 35, 36, 38 and 78, whereby said arms are held practically to form a rigid elbow lever during part of the operation of the machine.

The horizontal arm 1043 of the trip lever is provided on its upper edge with an inclined face or cam 1046, on its lower edge with an inclined face or cam 1047, and on one side with a stop shoulder 1048.

In the normal position of the parts, or when the paper on the platen has its upper end opposite the printing position, the lower arm or dog 997 of the trip lever engages with the lower face 1049 of the supporting arm 993 and holds the index wheel 991 in mesh with the index pinion 988, the upper trip arm 1043 is depressed, the inner restoring arm 1036 engages with the stop 1048 of the upper trip arm 1043 and the stop pin 1038 of the index wheel engages with the front side of the restoring arm 1036 and upper side of the trip arm 1043, as shown in Fig. 34.

As the index wheel turns forwardly in the direction of the arrow in unison with the forward movement of the platen and paper, its pin 1038 is moved forwardly.

A compression spring 1051, Fig. 45, causes the inner restoring arm 1036 to follow the pin 1038 in its forward movement until this arm reaches the position shown in Fig. 35, at which time the further movement of the inner restoring arm and connecting parts is arrested by means of a stop 1052 with which the front arm 1041 of the elbow trip lever engages in its downward movement.

When the index wheel is released for turning the platen backwardly by depressing the paper return key and thereby releasing the pawls 1026 and 1027, to allow the mechanism to return the paper to the printing line at the top of a column, the pin 1038 on the index wheel, during the last part of its return movement strikes the inner restoring arm 1036 and carries the same backwardly until the arm reaches the stop 1048 on the upper trip arm 1043, as shown in Fig. 34, thereby arresting the backward movement of the restoring mechanism and the index wheel corresponding with the top line of the paper opposite the printing position.

During this backward movement of the inner restoring arm 1036 the lower arm 1041 of the front restoring lever engages the under side of the releasing bar 1033 and disengages the same from the upper arm 1020 of the elbow key lever of the paper return key 1024, as shown in Fig. 45; the instant this occurs the spring 1057, shown in Figs. 44 and 51, draws the releasing finger 1030 downwardly and the releasing bar 1033 rearwardly so that it is disengaged from and rests on the front shoulder 1035 of the upper key lever arm 1020, as shown in Fig. 45.

As the releasing finger 1030 descends, the detent pawls 1026 and 1027 are turned by the springs 1058, with the section 989 of the index pinion, thereby again placing the detent device of the paper feed mechanism in action, and permitting of resuming printing on the record sheet and forward feeding of the same as before described.

The paper return key 1024 is held in its normal or depressed position until again released, as before described.

In order to prevent the backward rotation of the platen and the parts connected therewith from being arrested suddenly, upon reaching the end of this movement, a checking or cushioning device is provided. This device may be variously constructed. The form shown in Fig. 45 consists of a dash pot or air cylinder 1053, hung loosely on the pivot 1054 (supported in the main frame) and a piston or plunger 1055 working in said cylinder and connected by a rod with the restoring bar 1039.

When it is desired to print columns on the sheet of paper, with items in excess of the capacity of the index wheel, the latter is lowered out of engagement from the section 988 of the index or return pinion by pushing the finger piece 1056 on the lower arm or dog 997 forwardly, so that the arm 993 supporting the index wheel 991 can drop, as shown in Fig. 36.

When the parts are in this position the automatic paper return mechanism is inoperative and columns of any length can be printed.

Moreover, the disengagement of the dog 997 from the supporting arm 993 is effected automatically when the index wheel has made a complete turn, even though the operator has neglected to lower the supporting bar or arm 993, inasmuch as the pin 1038 of the index wheel, at the end of a complete forward rotation, engages the inclined under side 1047 of the arm 1043 and raises the same, thereby moving its companion arm or dog 997 forwardly out of engagement with the supporting arm 993 and permitting the latter to drop with the index wheel, as shown in Fig. 36.

When thus released the index wheel is turned backwardly by spring 999; during the last part of this backward movement its pin 1038 first strikes the inner releasing arm 1036 and then engages with the upper incline 1046 on the upper trip arm 1043, so as to draw the latter downwardly and bring the stop 1048 thereof into the path of the inner releasing arm 1036 for arresting the latter in the proper position, as shown in Fig. 36.

This downward movement of the upper trip arm 1043 is possible, notwithstanding that its companion lower arm 997 engages at this time with the shoulder 1050 on the supporting arm 993, owing to the yielding connection between the arms, as described.

This yielding connection also permits of pressing the dog or lower arm 997 forwardly, for dropping the supporting arm 993, independently of its companion upper arm 1043, when the latter is engaged underneath the pin 1038 of the index wheel, as shown in Fig. 34, which would be the position of the parts when the index wheel has been turned into its rearward position together with the platen.

By constructing the latch 1008 to yield when pressed in a backward direction it is possible for the tappet 1001 of the index wheel, in the event of having passed forwardly beyond the latch, to displace and pass the latch on its return without injuring any of the parts.

*Means for making the operating keys and lever inoperative when the bottom of a column or other predetermined position is reached and means for making said means operative or inoperative*

Depending from the return key elbow lever 1022 and 1020 is an arm 1059 to which is pivoted the front end of a bar or link 1060, its other or rear end being provided with a slot 1061, which is engaged by a pin 1062 on the front arm 1063 of an elbow lever pivoted on the rear frame of the machine, as shown in Fig. 12.

The elbow lever has pivoted to its downwardly extending rear arm 1064 a key 1065 which passes through the rear frame and is provided with a catch shoulder 1066.

The rear end of the link 1060 is provided with an upwardly and sidewardly projecting finger 1067 adapted to be brought in position to engage a rearwardly extending finger 1068 on the upright arm 852.

When the key 1065 is pushed forwardly and depressed its shoulder 1066 will engage the rear frame and hold the key until it is again released, and the elbow lever will be swung so its front arm 1063 and the rear end of the link 1060 will be raised, bringing the finger 1067 in line with the finger 1068 on the upright arm 852.

If now the paper return key 1024 is raised, as when the bottom of the paper or column is reached, its depending arm 1059 will move forward and with it the link 1060 and its finger 1067, which latter will engage the finger 1068 on the upright arm 852, causing the latter to swing forwardly and engage the finger 854 on the lower arm 855 of the pawl 268, thereby making the pawl inoperative.

At the same time the horizontal trip arm 851 moves downwardly, causing the same to depress the releasing rod 694, so that when the latter is pulled forwardly by the operating lever or other means it will not disengage the dog 690a from the stop wheel and the machine cannot be operated.

Although this mechanism is capable of rendering the operating mechanism inoperative, the setting mechanism is still in condition to be set for a subsequent operation.

*Mechanism for feeding the carriage horizontally*

The carriage is moved forwardly by a propelling device which may be of any suitable or approved construction, that shown in the drawings consisting of a feeding band or belt 1072 connected at one end with the carriage, while its opposite end is connected with a spring actuated drum 1073, mounted on the arm 1074 and having the well known construction of a ratchet wheel 1075 and double pawl 1076 escapement device, as well as the handle 1077 for turning the ratchet 1075 for increasing the tension of the spring, as shown in Figs. 1, 2 and 62.

Mounted on the front side of the paper carriage is a horizontal transverse row of stops or shoulders 1078, each of which is adapted to be engaged successively by a pair of main and auxiliary escapement pawls 1079 and 1080, arranged lengthwise side by side below the path of the stops, as shown in Figs. 2, 5, 6, 53, 59, 60, 61 and 73.

These pawls are pivoted to swing vertically on the upper end of an arm 1081 which, for the purpose about to be described, is held stationary and forms a fixed support for said escapement pawls.

The pivots 1082 and 1083 of these pawls are at the right end thereof and arranged out of line, and their hooks at the left end thereof are turned upwardly and also arranged out of line with each other, as shown in Figs. 59, 60 and 61.

The main escapement pawl 1079, which has its pivot at the right, is provided with a tail 1084 which engages over the upper side of the auxiliary escapement pawl.

Normally the main pawl engages its hook with one of the stops 1078 of the carriage and the hook of the auxiliary pawl 1080 is depressed below the path of the said stops, these pawls being yieldingly held in this position by a spring 1085 connecting the supporting arm 1081 with the tail of the main pawl.

The downward movement of the auxiliary pawl is limited by a stop 1086 on the supporting arm 1081.

Upon raising the auxiliary pawl 1080 into the path of the stops 1078 the main pawl is moved downwardly out of engagement with the stop with which it has been engaged, thereby releasing the carriage and permitting the spring drum 1073 to propel the carriage forward until the next following stop 1078 engages the hook of the auxiliary pawl and the carriage is arrested by the same, as shown in Fig. 61.

Upon releasing the auxiliary pawl 1080 the spring 1085, by drawing down the tail 1084, moves the auxiliary pawl downwardly out of the path of the stop 1078 with which it is engaged, and raises the main pawl so that its hook stands in the path of said stop, whereby the carriage is free to move forward until the stop which has just been released by the auxiliary pawl engages with the main pawl, as shown in Fig. 60.

It will be observed that by this means the carriage is advanced by two steps the distance between one stop and the next following stop. This movement of the carriage is effected upon the completion of printing a column of numbers on the sheet of paper preparatory to beginning the printing of the next following column of the numbers on the sheet. It is preferably effected automatically and simultaneously with the operation of the mechanism which turns the platen backwardly, so that the sheet is moved both laterally and backwardly in a position with relation to the printing mechanism for receiving the impression at the top of the next column.

The means for this purpose comprises a lifting bar 1087 arranged transversely below a pin 1088 on the auxiliary pawl, parallel with the rock shaft 998 and secured to the latter by arms 1089 and 1090, as shown in Figs. 8, 49, 66 and 2.

Shaft 998 is turned forwardly or in the direction for lifting the bar 1087, by means of a latch 1091, pivoted on the depending rock arm 1031 and yieldingly held in engagement with a trip arm 1092 on the rock shaft 998 by means of a spring 1093, as shown in Figs. 49 and 50.

When the rock arm 1031 is moved forwardly by the bar 1033 upon depressing the paper return or carriage key 1024, as shown in Fig. 44, the latch 1091 is also moved forwardly and, engaging with the trip arm 1092, turns the rock shaft 998 so that the lifting bar 1087 raises the auxiliary pawl into the path of the next carriage stop, as shown in Fig. 61.

During the last part of this upward movement of the lifting bar, the latch 1091 is automatically disengaged from the trip arm 1092 by a tail 1094 on the latch 1091 which tail engages with an abutment or pin 1095 on the main frame. In Fig. 50 the tail 1094 is shown in the act of disengaging the latch 1091 from the trip arm 1092. When the trip arm is thus released from the latch it is drawn backwardly by the spring 1093, thereby lowering the lifting bar 1087.

Automatic horizontal feed for carriage

The preceding section describes the feeding or column space movement of the carriage as an incident to paper return. Other means are provided for automatically feeding the carriage transversely of the printing devices, and are constructed as follows:—

1274, Fig. 66, represents a rock arm depending from a rock shaft 998 which carries the bar 1087, whereby the carriage escapement pallets 1079 and 1080, Fig. 59, are operated. 1275 represents a longitudinal trip bar pivoted at its rear end to the lower end of the arm 1274, and provided at its front end with an upwardly curved cam face 1276 and on its under side in rear of said cam with a notch 1277 which is adapted to engage with a pin 1278 on the adjacent upright rock arm 956 heretofore described in conjunction with movements of the platen. The trip bar 1275 is normally held rearwardly, its front end depressed, and the pallet operating bar 1087 is held depressed into its inoperative position, by a spring 1279 connecting this bar with the adjacent part of the frame, as shown in Fig. 66. The cam face of the shifting bar is arranged over a supporting rod 1280.

1281, Fig. 68, represents an elbow lever pivoted to the shaft 1280. The downwardly extending arm of said elbow lever is connected with the cam lever 1261 by the link 1282; the cam lever 1261 is provided with a short slot for adjusting the movement and position of the link 1282 with relation to said cam lever. When the cam lever 1261 is lowered in the position shown in Fig. 123 the rear finger of the lever 1281 is moved far enough below the trip arm 1275 to allow its notch 1277 to engage the pin 1278 when the arm 956 has moved rearwardly.

In this position of the parts the rock arm 956 moves rearwardly independently of the trip bar 1275 but, at the end of this rearward movement, the trip bar drops its notch 1277 into engagement with the pin 1278 of the rock lever 956, so that these parts are coupled and the trip bar is compelled to move with the rock arm 956 during the subsequent forward movement thereof, whereby the pallet bar 1087 is caused to shift the escapement pallet dogs or pawls 1079 and 1080 and permit the carriage to advance one step under the propelling effect of the carriage spring. During the last part of the forward movement of the rock arm 956 and trip bar 1275 the cam face 1276 of the latter rides upon the rod 1280 and raises the trip bar, so that its notch 1277 is disengaged from the pin 1278 of the arm 956, thereby permitting the spring 1279 to quickly move the actuating bar rearwardly and lower the pallet bar 1087, thereby reversing the pawls 1079 and 1080 and completing the column space movement of the carriage in the manner already described.

It will thus be noted that by this means the carriage is moved transversely step by step during each operation of the machine. When this is done platen feed is not desired, and is rendered inoperative in a manner elsewhere described.

By raising the cam arm 1261 the rod 1282 raises the rear arm of lever 1281, so that its finger elevates the trip arm 1275 to a position in which its notch 1277 will not engage the pin 1278, thereby rendering the carriage cross column feed inoperative.

Column feed key

In order to permit of manually feeding the carriage forwardly without at the same time returning the sheet to the top of the column, an auxiliary or independent column key 1096, Fig. 1, is provided, the same being guided to move vertically in the front end of the key board and operatively connected with the carriage trip shaft 998 by an elbow lever, loosely mounted on the shaft 1021. Said elbow lever comprises a forwardly projecting arm 1097, which connects with the lower end of the key 1096. A link 1098 is connected at its front end with the upright arm 1099 of said elbow lever and at its rear end with a depending arm 1100 received on the carriage trip shaft 998, as shown in Figs. 52, 8 and 2.

Upon depressing the column key 1096 the trip shaft 998 is rocked, and the escapement pawls 1079 and 1080 are operated for advancing the carriage from one column to another without disturbing the rotary position of the platen and the height of the paper on the same.

The arm 1100 and the link 1098 are connected by a pin 1101 and slot 1102, as shown in Fig. 52, so that when the trip shaft 998 is operated by the combined platen and carriage controlling or paper return key 1024 then the auxiliary, exclusively carriage controlling or column key 1096, will not be disturbed.

Adjustable, detachable carriage column feed stop

The stops 1078, Figs. 2 and 60 may be permanently fixed on the carriage, if desired, but it is preferable to secure them adjustably and detachably thereon so as to permit of varying the distance between the printed columns on the sheet of paper.

The preferred means for thus adjustably and detachably securing the stops to the carriage consists in arranging each of these stops on the lower end of a hook 1103, Fig. 69, which engages with the front edge of the carriage, a pin 1104 arranged on the upper part of each hook and adapted to engage with one of a longitudinal row of holes 1105, Fig. 53, or openings in the carriage, a locking plate 1106, Figs. 71 and 72 slidably connected with the rear upper part of the carriage by co-operating slots 1107 and screws or headed pins 1108 arranged on the carriage and locking plate and permitting the latter to be engaged with or disengaged from the upper rear edge of the stop supporting hook 1103, and spring catches 1109 mounted on the rear part of the carriage and operating to hold the locking plate in position.

Upon releasing the catches and drawing the locking plate rearwardly the stop hooks may be removed from the carriage and shifted to another position on the carriage, the holes in the latter are spaced the same as the printing devices.

Detachable carriage column feed stop plates

When it is required to adjust the stops 1078 lengthwise of the carriage the several stops may be formed on a single plate 1110, as shown in Fig. 54, which plate may be detachably secured to the carriage in the same manner as the individual stops.

A plurality of stop plates may be provided having differently spaced stops so as to permit of selecting the plate having the stops spaced to suit the requirement of the particular work.

Detachable differential carriage column feed stop bar

Instead of having separate differently spaced stop plates the same result may be obtained by forming a plurality of longitudinal rows of stops 1078 on a horizontal bar 1111, the stops in each row being spaced differently from the others and the stop bar being journaled at opposite ends in bearings 1112 on fastening hooks 1113 which engage with the front edge of the carriage and are formed on the plate 1114, said plate being provided with pins 1104 engaging with the holes 1105 in the carriage, and its rear edge being held in place by the locking plate and catches, as shown in Fig. 72.

By turning the stop bar 1111 any one of its rows of stops can be brought into operative relation to the escapement pawls.

Adjustable carriage column stop device

For the purpose of enabling numbers to be printed in columns in the proper position, on sheets which have special or irregular ruling, the automatic carriage column feed mechanism may be thrown out of commission and a hand adjusted stop mechanism put in operation, which is constructed as follows:—

1115, Figs. 5, 6, and 55, represents a horizontal stop bar arranged lengthwise underneath the carriage track 930 and provided on different sides with longitudinal rows of notches or seats 1116, each row forming a set and being spaced differently from the notches in the other sets. 1117 and 1118 represent two thumb pieces or handles which are capable of rotation in bearings in the main frame but held against axial movement. One end of the stop bar is connected with one of the thumb pieces so as to be compelled to turn therewith but be free to move lengthwise. This connection consists in providing the thumb piece with a flat sided socket 1119 which receives the adjacent flat sided end 1120 of the stop bar 1115. The opposite end of the stop bar has an external screw thread 1121 which engages with an internal screw thread in the socket 1122 of the thumb piece 1118. A spring 1123 arranged in the socket 1122 and bearing at opposite ends against the bottom of the socket and the adjacent end of the stop bar 1115 operates to produce friction between these parts, which causes the thumb piece 1118 and stop bar 1115 to turn together when both are unrestrained.

On the rear side of the central part of the carriage is pivoted a catch having an upper finger piece 1124 and a lower dog 1125, which is adapted to be held yieldingly in engagement with one of the notches 1116 by a spring 1126 interposed between the carriage and the finger piece.

In the use of this carriage feed mechanism the catch dog 1125 is disengaged from the stop bar, the latter is turned to bring the desired set of stop notches in operative relation to said catch and then the carriage is shifted approximately into the desired position and the catch dog 1125 is engaged with the nearest stop notch 1116. Upon now turning the thumb piece 1118 and holding the other thumb piece 1117 against turning, the stop bar 1115 and the carriage coupled therewith, by means of the catch, may be shifted lengthwise of the carriage in either direction for bringing the paper on the carriage platen in the desired position relatively to the printing device.

When it is desired to make this stop device inoperative the stop bar 1115 is turned until its flat side 1127 is presented to the lower dog 1125, although any other manner of making the device inoperative may be employed, as, for instance, means may be provided to lock the dog 1125 in a retracted position.

Two column carriage shifting mechanism

Mechanism is provided whereby the carriage may be shifted back and forth so as to permit of printing two columns of figures side by side as the sheet of paper is turned forwardly by the platen, thereby permitting of doing such work as printing the "debits" and "credits" of an account in the order in which they occur and for many other purposes.

The means whereby this is accomplished are constructed as follows:—

1128 represents a rock shaft journaled lengthwise in the rear lower part of the machine and carrying the supporting arm 1081 at its rear ends, as best shown in Figs. 2, 5 and 6. When only one column at a time is printed on the sheet this rock shaft and the supporting arm are held rigid by a dog 1129, pivoted on the main frame and engaging with a pin 1130 on an upright rock arm 1131 secured at its lower end to the rock shaft 1128, as shown in Fig. 59. When numbers are to be printed in two columns on the sheet in proper sequence the dog 1129 is disengaged from the pin on said arm, thereby liberating the rock shaft 1128 and arm 1081.

The dog 1129 is turned into its operative or inoperative position by means of a thumb piece or handle 1132, shown in Figs. 2, 5 and 8, and the same is yieldingly held in either of these positions by means of a detent pawl 1133, pivoted on the frame and having two notches 1134 and 1135, with one or the other of which a pin 1136 on the dog 1129 engages when moved into its operative or inoperative positions.

A spring 1137 serves to hold both the dog and the pawl in their set positions, as shown in Fig. 59.

1138 and 1139 represent a pair of upper and a pair of lower column shifting arms which project upwardly and downwardly, respectively, from the front end of the carriage shifting rock shaft 1128, as shown in Figs. 5, 6, 7, 9 and 73.

The upper arms are connected by an upper pin 1140 and the lower arms are connected by a lower pin 1141.

1142 represents a two column shifting cam arranged on the main shaft 108 at the left end thereof, and 1143 is an upright rock arm having a roller 1144 at its upper end, whereby the same engages the two column shifting cam 1142, Fig. 9.

The arm 1143 together with a similar rear upright rock arm 1145 projects upwardly from a longitudinal rock shaft 1146 journaled in the lower left part of the frame, as shown in Figs. 9 and 73.

1147 represents a coupling bar extending transversely across the rear end of the machine and pivoted at its left end to the rear rock arm, as shown in Figs. 7, 8, 9 and 73.

The coupling bar is connected at one end with the rock arm 1145, and is provided with upwardly and downwardly extending arms 1148 and 1149 having upwardly and downwardly opening jaws 1150 and 1151 which are adapted to engage, respectively, with the upper and lower pins 1140 and 1141.

Upon raising the coupling bar when the machine is at rest, its upper jaw 1150 engages the pin 1140 of the upper arms 1138, while the lower jaw 1151 clears the pin 1141 of the lower arms, as shown in Fig. 7, and upon lowering said bar its lower jaw 1151 engages said lower pin 1141 while its upper jaw clears said upper pin.

The relative length of said jaws is such that either one engages its pin before the other one clears its respective pin, thereby retaining control of the carriage which tends constantly to move to the left under the pull of the spring drum 1073.

Normally the rock arms 1138 and 1139 and the escapement arms 1081 stand in a central position and hold the carriage and paper so that the two columns which are being printed on the paper are on opposite sides of the position occupied by the carriage when the machine is not in operation. When the coupling bar is raised and its upper jaw 1150 engages with the upper pin 1140, as shown in Fig. 7, the cam 1142 upon making one rotation with the main shaft causes the carriage to be shifted from its central position toward the right, as viewed from the front of the machine, and brings the paper in position for printing the left hand or debit column through the medium of the rock arm 1081 and escapement pawl 1079 engaging the respective stop 1078 of the carriage. Said pawl is inactive at this time, so far as any escapement effect is concerned, and the spring of the drum 1073 is partly wound up by reason of the partial unwinding of the pull strap 1072.

Following this the printing is done, after which the cam causes the carriage to be again shifted to its normal position. Upon moving the coupling bar downwardly so as to engage its lower jaw with the lower pin 1141, the rotation of the cam 1142 causes the carriage to move from its central position towards the left and bring the paper in position for printing the right or credit column of numbers thereon at the proper time, and thereafter to return the carriage to its central position.

It will thus be apparent that by the raising or lowering of the coupling bar the cam 1142 may cause the carriage to move either toward the left or toward the right of its central position, and thus cause the type to print numbers either in the left or debit or in the right or credit column on the paper.

At the end of each operation of the machine the cam 1142 presents its low face to the arm 1143, which is caused to bear against the cam by the pull of the spring drum 1073 and return the carriage to its central position.

The cam 1142 is securely mounted on the main shaft 108, and engages the roller 1144 of the arm 1143 on its side; its high and low parts 1152 and 1153, Figs. 9 and 11, are constructed to position the carriage respectively in the printing positions and the central position, and its incline is constructed to move the carriage from the central position to either side at and during the proper time. Referring to Fig. 73 it will be seen that a spring 2000, mounted upon the shaft 1146, and having one end connected to the shaft and its other end connected to the arm 1143, is provided for normally holding the roller 1144 against the periphery of the cam 1142.

*Two column shifting keys*

The main and auxiliary operating keys 753 and 754 are also operatively related to the carriage, so that the same may be shifted to cause the printing to be done in either one of two columns. This is effected by means of an elbow lever pivoted on the frame and having its lower arm 1154 provided with a fork 1155 which engages with an extension 1156 of the coupling bar 1147, while its upper arm 1157 is connected by a link 1158 with the upper end of the cam lever 872, as shown in Fig. 16. The main operating key will hereafter be also designated as the debit key because, when it is depressed, it causes the carriage to be shifted so that the number is printed in the left column. The auxiliary operating key will hereafter also be referred to as the credit key for the reason that this key, when depressed, will cause the carriage to be shifted so that the number is printed in the right column. The connections from the debit and credit keys to the cam lever 872, whereby these keys control the movement of the carriage are as follows:

As best seen in Figs. 16 and 73, the debit key 753 is connected directly with a lever 759 which is pivoted at 760 on a fixed pivot mounted on the frame. At the opposite end of the lever 759 is carried a coupling hook 866 which is adapted to be moved longitudinally by the rocking of the lever. The lower end of the coupling hook is enlarged and has an elongated hook jaw or open slot cut out from one side, and the lower edge of this hook jaw is adapted to engage a pin 867 carried by a lever 868 which is pivoted at the rear on a stud 869 carried by the frame b. The far end of the lever 868 carries a pin 870 which moves in a cam slot 871 in the rock arm or cam lever 872 which is fixed to the shaft 873. The cam slot 871 has a central camming surface which, in cooperation with the pin 870, causes the arm 872 and hence the shaft 873 to rock as the lever 868 is raised or lowered past this central portion. The extreme ends of the cam slot are concentric with the pivot 869 so that movement of the pin 870 in the end portions of the shaft, only, will not cause the arm 872 to be rocked. As will be seen, a depression of the key 753 will cause the hook 866 to be lifted and through the engagement of the lower edge of the notch with the pin 867 the lever 868 will be lifted. If the parts are in the position shown in Figs. 16 and 73 the end of the notch in the hook 866 will not engage the pin 867 until the key has been depressed some distance, and when the engagement does take place and the lever is rocked, the pin 870 will merely move in the concentric portion of the slot 871 and will not rock the arm 872. On the other hand, if the pin 870 stood below the cam surface of the slot 871, by virtue of the depression of key 754 for the previous operation, then the hook 866 would engage the pin 867 at once and lift the lever 868 so that its pin 870 would move across the cam surface as well as the concentric portion of the slot 871. As the key 753 is released and permitted to rise again the hook 866 will be lowered under the influence of spring 774 and the pin 870 will be moved to the lower end of the upper concentric portion of the slot 871.

The credit key 754 is connected to a bell crank lever 765 and the latter carries a corresponding coupling hook 874 (Fig. 73) similar to the hook 866. A wide open slot in the lower end of the hook 874 is adapted to engage the pin 867 and thereby depress the lever 868, as the credit key is depressed. If the parts are in the position shown in Figs. 16 and 73, the downward movement of the lever 868 will cause the pin 870 to first cam the rock arm 872 rearwardly, and then the pin will be moved into the lower concentric portion of the slot 871, without producing any further rocking of arm 872.

To avoid interference between the two links or coupling hooks 866 and 874, connections are provided whereby the depression of key 753 renders the hook 874 inoperative, while depression of key 754 renders the hook 866 inoperative. The first result is accomplished by means of a link 876 which connects an upwardly projecting arm 877 on the lever 759 with an upward extension 875 of the hook 874. It will be seen that on depression of the key 753 the link 876 will be drawn rearwardly, thereby rocking the hook 874 about its pivot and disengaging the jaw from the pin 867. Similarly, a link 878, connecting the lower arm 766 of the bell crank 765 with the hook 866, causes a depression of the key 754 to disengage the jaw of said hook from the pin 867.

The lever or shifting arm 868 is maintained with its pin 870 in its upper position in the cam slot 871, after a depression and release of the debit key 753, by means of a detent arm 883 pivoted on the shaft 873 and urged forwardly by a spring 885 connected to a rearwardly projecting arm 884 of the detent and to a fixed shaft 886. The upper end of the detent arm is provided with a finger 887 which engages the rear side of the cam lever 872, as shown in Figs. 16 and 73, and limits the forward movement of the detent lever relatively to the cam lever. Normally the upper edge of the detent 883 will yieldingly hold the shifting arm 868 in its upper position, as shown, but when said arm is moved to its lower position the pin 870 will remain just below the cam portion of the slot 871, due to the weight of the arm as well as the camming effect of the lower forward edge of the detent.

Figs. 7, 12 and 73 show the parts in the position which they assume after the debit or main operating key 753 has been depressed and the mechanism has operated accordingly.

If now the auxiliary operating or credit key 754 is depressed the auxiliary coupling hook 874 will be moved downwardly, thereby forcing the lever 868 downwardly, causing its pin or roller 870 to ride down in the cam 871 and move the cam lever 872 and its link 1158 backwardly and the rear arm 1154 of the elbow lever and the coupling bar 1156 downwardly, thereby causing the upper jaw 1150 of the latter to disengage from the upper pin 1140 and its lower jaw 1151 to engage the pin 1141 of the downwardly extending arms 1139. As soon as this has been accomplished the pin 870 on the arm 868 has reached the lower concentric portion of the cam 872 and the further downward movement of the auxiliary or credit operating key 754 and the pin in the cam slot 871 simply acts to lock the parts in their position.

Immediately after the coupling bar 1156 has thus been shifted, the trip pawl 694, Fig. 12, disengages the main operating shaft detent 690ª allowing the main operating shaft to make a complete revolution, thereby moving the carriage and printing the number in the credit or right hand column.

As the credit or auxiliary operating key rises its coupling hook 874 also rises, but owing to the wide space between its jaws the arm 868 will be lifted only a distance sufficient to move its pin 870 to the upper end of the lower concentric portion of the cam slot 871, the weight of the lever 868 tending to hold it down. This leaves the mechanism in position to again print in the same right hand or credit column unless the main operating or debit key is depressed.

Repeating operating key

Means are provided whereby, upon depressing the repeating operating key 755, the number set up on the number keys may be repeatedly added and printed with one setting up of said numbers.

The mechanism for this purpose is constructed as follows:

904 represents a transverse rock shaft which is journaled in the frame below the keyboard and to the right end of which the repeating operating key lever 770 is secured, as shown in Figs. 12 and 16. To the left end of this shaft (Figs. 5 and 6) is secured a depending rock arm 905 which latter is connected by a link 906 with the coupling link 250 of the number key releasing mechanism. The lower end of the coupling link 250 is provided with a shoulder or hook 907 which is normally held in engagement with the rock arm 248 by a spring 908, so that normally, or when a number set up on the keyboard is to be added and printed but once, the arm 123 of the operating frame, during the last part of its forward movement will engage the lug 249 and lift the arm 248 and the latter will in turn raise the link 250, thereby turning the rock arm 251 and 271 and shaft 241 and causing the number keys 210 to be released preparatory to being again depressed or set up for the next number. When, however, the repeating operating key is depressed, after the number has been set up, the link 906 will be moved forwardly, moving the arm 250 with its hook or shoulder 907 forwardly out of the path of the pin 909 on the rock arm 248, so that when the latter rises during the operation of the machine, the rock arm 251 and shaft 241 will not turn in the direction to release the depressed number keys, and the keys remain set. Whenever the coupling link 250 is thus moved into its inoperative position, it is held in this position during the initial part of the operation of the machine by a detent pawl or latch 910 pivoted on the frame above the rock arm 248 and adapted to engage with a pin or shoulder 911 on the coupling link 250, the spring 908 operating to move the detent pawl into its operative position.

After the machine has effected the initial portion of its operation and the pin 909 of the rock arm 248 has passed above the shoulder or hook 907 of the coupling link 250, then a lug or finger 912 on the rock arm 248 engages the detent pawl or latch 910 and lifts the same out of engagement with the pin 911 on the coupling link 250, thereby releasing the coupling link and permitting the same to automatically reengage its hook or shoulder 907 with the rock arm 248, when the latter again reaches the end of its return or downward stroke, whereby the parts are restored to a condition effective for releasing the number keys in the next succeeding operation. By repeated use of the repeat operating key 755 the same number will be printed as many times as desired.

In order to permit the repeating operating key to rise immediately after the same has been depressed a slack connection is placed in the train of mechanism connecting its lever with the coupling link 250, this slack connection preferably consisting of a pin 913 on the coupling hook 250 engaging with a slot 914 in the front end of the intermediate link 906, as shown in Figs. 5, 6, and 12.

When the repeating operating key is depressed it not only throws out the coupling link so as to retain the set number keys in their depressed position, but at the same time the detent latch or dog 690ª of the motor is released, as previously explained.

*Means for rendering operative or inoperative the control of the carriage by the main and auxiliary operating keys*

Upon pushing the throw off arm 915 (Fig. 16) forwardly by pushing the key 917 forwardly, so as to disengage the coupling pawls or hooks 866 and 874 from the rock arm 868, the operating keys are rendered incapable of shifting the carriage so as to select the column in which the number set up is to be printed, and when any one of the operating keys at this time is depressed the numbers set up successively on the key board will be printed in the same column, regardless of which operating key is depressed. The key 917 is normally urged toward the rear of the machine by a spring 919, but may be latched in its forward position by means of a shoulder 918.

*Repeat key operates carriage*

Upon depressing the repeating operating key 755 the carriage is shifted so as to print the same number in the same column corresponding with the main or auxiliary operating key previously depressed. But when it is desired to print the same number in the other column the operating key corresponding to the other column is depressed simultaneously with the repeating key 755.

*Automatic double column platen feed*

When printing numbers in double columns it is desirable to feed the paper one line after the printing of each number when they are printed consecutively in either the left or right hand column and also to feed the paper one line after a number is printed in the right hand column to be followed by the printing of a number in the left hand column, but the paper should not be fed after printing a number in the left hand column to be followed by the printing of a number in the right hand column. The means employed for accomplishing the above are constructed as follows:

The arms 953 and 954, Fig. 31, which have previously been described as supporting the platen actuating bar 952 are pivoted at their front ends to the upper ends of the rock arms 955 and 956 so that this bar can be raised or lowered relatively to the platen feeding and swinging arms 951 and 965.

The platen swinging lever 951 is somewhat longer than the platen feeding lever 965, as shown in Figs. 31 and 32. When the actuating bar 952 is raised by the arms 953 and 954 and moved rearwardly by the action of the cam 959, as previously described, the bar 952 pushes both rock arms 951 and 965 rearwardly, thereby causing the platen to be turned forwardly one or more spaces with the paper and also to swing forwardly to the printing position. When the bar 952 is depressed so that it engages only with the platen swinging arm 951 and not with the platen feed arm 965, as shown in Figs. 31 and 32, then a rearward movement of the actuating bar 952 causes only the platen to move forward to the printing position but the platen is not turned, whereby the same line on the paper is retained relatively to the printing devices. Normally, the actuating bar is held in its elevated position by a spring 1159 connected with an arm 1160 extending forwardly from the left hand rock arm 954 and forming therewith a shifting lever.

1162 represents an upright latch, pivoted at its lower end on the pin 1163 and provided at its upper end with a lower shoulder 1164 and an upper shoulder 1165, either one or the other of which is yieldingly held in engagement with a pin or shoulder 1166 on the front arm 1160 of the platen shifting lever by the spring 1159 connecting said arm with a tail 1167 on the latch 1162, as shown in Figs. 31 and 32.

Normally the platen lever is turned so that its front arm 1160 is depressed and its rear arm 954 and the platen shifting bar 952 are elevated, and the latch 1162 engages its lower shoulder 1164 with the pin 1166, as shown in Fig. 3, whereby the bar 952, upon being moved rearwardly by the cam 959 is caused to engage both levers 951 and 965; and the platen is both swung forward to the printing position and rotated forwardly one line space. Upon turning the platen shifting lever so that its rear arms and the bar 952 are depressed and the front arm is raised, the latch 1162 is permitted to engage its upper shoulder 1165 with the pin 1166 of the platen shifting lever 1160, as shown in Fig. 31, and the bar, upon moving rearwardly, will engage only the platen swinging lever 951 and the platen is swung to the printing position but not rotated. During the last part of the rearward movement of the platen shifting bar 951, together with the latch 1162, the latter engages a stationary rod or stop 1168, as shown in Fig. 32, whereby the latch is held while the platen shifting lever continues its rearward movement, thereby causing the pin 1166 to be drawn off the upper shoulder 1165 of the latch, the beginning of this movement being shown in Fig. 32.

The means whereby the platen shifting lever is thus turned, to prevent feeding of the paper, comprises the upright rock arm 1131 secured to the rock shaft 1128, as shown in Fig. 7, an intermediate rock shaft 1169 journaled on the frame and having front and rear upright rock arms 1170 and 1171, a slack connection between the rock arms 1171 and 1131 and consisting, preferably, of a link 1172 pivoted at its left end to the rock arm 1171 and having a slot 1173 at its opposite end which receives a pin 1174 on the rock arm 1131, a dog 1175 Fig. 33, pivoted on the upper end of the rock arm 1170 and having an inclined cam face 1176 adapted to engage with the under side of the front arm of the platen shifting lever 1160, and a finger 1177 which is yieldingly held in engagement with the rock arm 1170 by a spring 1178, as shown in Figs. 7, 31, 32 and 33.

Assuming that the platen had been previously moved laterally from the left toward the right, as viewed from the front of the machine, to the printing position of a left hand column and then returned to its normal or central position, the rock arms 1170, 1171 and 1131 and the link 1172 would stand in the position shown in Fig. 7 and the platen bar 952 would be in its normal or raised position, to engage both the platen swinging arm 951 and the platen feed arm or lever 965. If now the main operating key 753 be depressed the rock arm 1131 will move idly from right to left in the slot 1173 of the link 1172 so that the platen, upon being swung forwardly and toward the right to the printing position, will also be turned, whereby the paper is fed forward one line and the number set up on the keyboard will be printed underneath the previous number in the left column. If, however, a number is to be printed in the right column, after one has been printed in the left column, the auxiliary operating key is depressed, causing the rock arm 1131 to shift the link 1172 and rock arms 1171 and 1170 toward the left, whereby the dog 1175, which is rigid with arm 1170 at this time, engages its cam face 1176 with the front arm 1160 of the shifting lever, rocking the lever counterclockwise (Fig. 31) until its pin 1166 is engaged by the shoulder 1165 of the upright latch 1162 and depressing the platen bar 952 below the tail of the platen feed lever 965. Thus feeding of the paper at this time is avoided and the number is caused to be printed in the right column crosswise in line with the number previously printed in the left column.

The link 1172 and the arms 1171 and 1170, remain in this shifted position towards the left and the rock arm 1131 oscillates idly in the slot 1173 of the link 1172 so long as additional numbers are being printed in the right hand column. The rearward movement of the platen bar 952 causing the platen to swing to its printing position for this number causes the pin 1166 on its front arm 1160 to drop from the high shoulder 1165 to the low shoulder 1164 of the latch 1162, since movement of the latch is limited by the stop 1168, thereby resetting the mechanism for causing the paper to be fed forward one space for each number printed thereafter in the right column. After one or more numbers have been thus printed in the right column and a number is to be printed in the left column, the depression of the main operating key causes the rock arm 1131 to move the link 1172 and the arms 1171 and 1170 toward the right. During this movement of the front rock arm 1170 its dog 1175 is deflected upon engaging the platen shifting lever 1160 and trips idly past the same without affecting its position, whereby the platen shifting bar 952 is permitted to remain in its elevated position and both swing the platen to the printing position and also turn the same forward for feeding the paper. It will thus be noted that the paper will be fed forward one line whenever numbers are printed successively in either column and also when returning from the right to the left column, but no feed of the paper occurs when a number is printed in the right column immediately after a number has been printed in the left column.

Any suitable means may be employed for yieldingly holding the link 1172 and arms 1170 and 1171 in either extreme position, for instance, a spring 1179 secured to the frame and having two seats one or the other of which may be engaged with a pin 1180 on the front rock arm 1170, as shown in Fig. 7.

Automatic pairing of columns

The mechanism is so constructed that when single columns are being added and printed the columns will be spaced equally apart, but when double columns or debit and credit columns are being accumulated and printed the columns will be automatically paired, the space between the two columns constituting a pair will be less than the space between two columns of separate pairs. This is preferably accomplished by so determining the rocking movement of the lever 1081, Fig. 2, that the carriage is moved back and forth an extent less than the distance between two adjacent stops 1078. It follows from this that when the carriage is moved from its central position, either forward or backward a half step for bringing either column of a pair to the printing position, the distance between the two columns will be comparatively short but when the escapement pawls 1079 and 1080, Fig. 59, are operated to advance the carriage a full step the distance between two pairs of columns will be greater than the distance between the columns of a pair, thereby enabling the proper columns to be associated and avoiding confusion.

Automatic two column carriage feed and paper return

Means are provided whereby, upon depressing the paper return key, the paper is returned and the carriage is automatically fed forward one column when numbers have been printed in only one column, but when numbers have been printed in two columns the depression of the paper return key causes the paper to be returned and the carriage to be automatically fed forward two columns.

The means for this purpose are constructed as follows:—

1181, Figs. 46, 47 and 48 represents a finger or shoulder arranged on the rock shaft 998 of the paper return mechanism which has been heretofore described with reference to the single column carriage feed mechanism. 1182 represents a trip rock arm mounted loosely on the rock shaft 998 and projecting forwardly therefrom. 1183 represents a cam pivoted on the key restoring rock arm 1037 and adapted to engage with one end of a pin 1184 on the front end of the rock arm 1182. This cam is yieldingly held in its operative position by means of a spring 1185 which presses against a finger 1186 of said cam which finger engages the rear side of the arm 1037.

1187 and 1188 represent the front and rear arms of a setting rock lever which is pivoted loosely on the dial shaft 992, the front arm 1187 being arranged below the paper platen and carriage feed bar 952, while the rear arm 1188 is slidingly connected with the trip rock arm 1182.

1189 represents an upright dog or latch also mounted loosely on the dial shaft 992 and provided with upper and lower shoulders or steps 1190, 1191 which are adapted to engage with the other end of the pin 1184 on the trip rock arm 1182. A spring 1192, connecting the dog 1189 and setting lever 1188, tends constantly to move the dog 1189 forwardly and to turn the setting lever so that its front arm 1187 is raised and its rear arm 1188 is lowered together with the trip rock arm 1182.

The forward movement of the dog 1189 is limited by a stop or pin 1193 on the rock arm 1037 of the paper return mechanism.

As heretofore described, the depression of the paper return key 1024 causes the paper, when the bottom of a single column has been reached, to be returned so as to present the top of the sheet to the printing device and at the same time the carriage is advanced one column so as to permit of printing another column of numbers.

Assuming that the machine has been operated, so as to print at least one number in each of a pair of columns in the manner heretofore described, it then is necessary, when printing in this pair of columns is finished, to feed the carriage forward two steps or columns so as to skip the pair of columns just completed and permit of either printing numbers in a single column or in a pair of columns.

The operation of thus feeding the carriage two columns is as follows:—

So long as the printing of numbers proceeds in only one column the cross bar 952 remains in its elevated position, in which it engages both rock levers 951 and 965, as shown in Figs. 5 and 6, and causes the platen 966 to be swung toward and from the printing position and also turned forward one space for advancing the paper one line. At this time the trip lever is turned by the spring 1192 so that its front arm 1187 is raised, the trip arm 1182 is lowered, the dog 1189 engages its lower shoulder 1191 with the pin 1184 and the cam 1183 on the rock arm 1037 is free to move forward and backward and pass freely over the pin 1184 without affecting the parts, as shown in Fig. 46. When, however, the machine is operated to print numbers in two columns, the first time the cross bar 952 is depressed while shifting the carriage crosswise from one column to another and feeding of the paper is prevented, as hereinbefore described, and the cross bar 952 depresses the front arm 1187 of the trip lever and raises the trip arm 1182 so that the latter stands close to the under side of the finger 1181, in which position the trip arm 1182 is automatically locked by the dog 1189, which is moved forwardly by the spring 1192 and engages its upper shoulder 1190 with the pin 1184 of said trip arm 1182, as shown in Fig. 47. While the latter is thus elevated its pin 1184 stands in the path of the cam 1183 on the rock arm 1037, as shown in the last mentioned Fig. 47.

Assuming that the paper return key 1024 is now depressed the carriage feed mechanism will immediately operate to feed the carriage forward one column and return the paper to print on the first line, as has been described under the head of Paper return mechanism, but during the backward movement of the rock arm 1037, for effecting the disengagement of the hook 1034 from the shoulder 1035 of the elbow lever 1020, the cam 1183 on the said arm 1037 engages the pin 1184 of the trip arm 1182, as shown in Fig. 47, and raises said arm 1182 from the position shown in this figure to the position shown in Fig. 48. While thus rising the trip arm 1182 raises the finger 1181 and turns the shaft 998 a second time so that the pallet bar 1087 again shifts the escapement pallets, and when the cam 1183 has passed in rear of the pin 1184 of the trip arm 1182 the latter drops, together with the pallet bar 1087, and the second column space movement is completed in the manner already described. The paper has been returned, so that the top of the sheet is in the printing position.

During the rearward movement of the cam arm 1037 its pin 1193 engages with the dog 1189 and shifts the latter rearwardly, as shown in Fig. 48, so that when the trip arm 1182 drops from the cam 1183, its pin 1184 will again engage the lower shoulder 1191 of the dog 1189, thereby holding the latter in its rearward position and also holding the trip arm in its depressed position and the front arm 1187 of the trip lever in its elevated position.

The bar 952 will at this time be in its elevated position, since it is elevated at the end of every operation, and the arm 1187 will remain in its elevated inoperative position, unless again depressed by the bar 952 in the manner before described. After the rock arm 1037 has been thus moved backwardly it again moves forward slowly, owing to the restraining effect of the dash pot 1053, Fig. 45. If the cross bar 952 is depressed before the cam 1183 has cleared the pin 1184 the latter, upon being raised by the depression of the cross bar, engages the under side of the cam 1183 and deflects the same sufficiently to clear it, thereby avoiding injury to the machine.

Alternator

Means are provided for causing the carriage to automatically present the columns of a pair alternately to the printing position, so that successive settings of numbers on the keyboard will be printed alternately in the columns of a pair. An organization of this kind is useful in tabulating gross and net weights or price and discount, etc.

The means whereby this is accomplished are constructed as follows:—

1194 and 1195 represent the two sections of a rotatable alternating cam which are connected together and turn loosely on a pin 1196 on the main frame, and 1197 is a ratchet wheel connected with said alternating cams.

One side of the ratchet wheel is engaged by a spring actuated detent pawl 1198 mounted on the frame and its other side is engaged by an actuating pawl 1199, which is mounted on a vertically swinging alternating rock arm 1200, loosely mounted on the shaft 873, as shown in Figs. 4 and 57.

1201, Fig. 16, represents an upright coupling bar which is pivotally connected at its lower end to the alternating rock arm 1200 and provided at its upper end with a forwardly opening hook 1202, which is adapted to engage with a pin 1203 on a forwardly projecting rock arm 1204, formed on or connected with the arms 763 and 761, as shown in Fig. 16. The upright arm 1201 is arranged in rear of the roller 916 on the throw-off arm 915.

1205 represents a cam lever pivoted on the frame and provided with a fork on its free end, the fingers of which carry rollers 1206 and 1207, one of which engages with one cam section and the other with the other cam section diametrically opposite the first.

The upper one of the cam fingers is provided with an elbow lever the lower horizontal arm 1208 of which is connected by a spring 1209 with the alternating rock arm 1200, while its upper vertical arm 1210 is provided with a hook 1211, the mouth of which opens forwardly and is adapted to engage with a pin 1212 on the shifting rock arm 868, as shown in Figs. 4 and 16. At its upper end the coupling arm 1210 is provided with a finger or stop 1213 which engages with the rear side of the coupling arm 1201.

1214, Fig. 4, represents a push key passing through an opening in the rear part of the frame, and connected at its front end with the coupling arm 1201, while near its rear end it is provided with a shoulder 1215 and is connected with the frame by a spring 1216.

In the position of the parts shown in Fig. 16, the key 1214 is released, the coupling hooks 1201 and 1210 are disengaged from their pins 1203 and 1212 and the throw off arm 915 is retracted so as to permit both coupling hooks 866 and 874 to engage their respective pin 867. In this condition of the parts, the number set up on the number keys will be printed in accordance with whichever operating key is depressed. Upon pushing the alternator key 1214 forward and engaging its shoulder 1215 with the front side of the rear part of the frame, the coupling hook 1201 is moved with its jaw into engagement with the pin 1203, the spring 1209 is permitted to draw the hook 1210 with its jaw into engagement with the pin 1212 and the coupling arm 1201 pushes the throw-off roller 916 forwardly and causes both coupling hooks 866 and 874 to be disengaged from their companion pin 867.

It is now immaterial which operating key is depressed inasmuch as the depression of any one of these keys produces the same result. Upon depressing an operating key the arm 1204 is raised and with it the rock arm 1200, which is connected by the coupling hook 1201 with the rockarm 1204, thereby causing the pawl 1199 to turn the ratchet wheel 1197 and the cam sections connected therewith one space. When the depressed operating key is released the pawl 1199 rides idly backward over the ratchet wheel 1197. Upon again depressing an operating key the pawl is caused to turn the ratchet wheel 1197 and cam sections 1194 and 1195 another step. During the successive rotary steps of the alternating cam the same alternately raises and lowers the cam arm 1205, which movement is transmitted by the coupling hook 1210 to the rock arm 868 and the latter, owing to its engagement with the cam slot 870 of the arm 872, causes the shaft 873 to be rocked alternately in opposite directions, whereby the numbers set up successively on the keyboard are printed alternately in the right and left hand columns of a pair. Upon releasing the alternator shift key 1214 the parts are again restored to the position shown in Fig. 16, in which the automatic column printing alternating mechanism is rendered inoperative.

*Carriage control of the functions of the machine*

Means are provided whereby the movements of the carriage may be made to cause the machine to perform certain functions or operations, which will be hereinafter more fully described.

1227, 1228, 1229, 1230, 1231, 1232, 1233, 1234, and 1235 represent a plurality of intermediate or tappet levers which are arranged upright in front of the carriage, and pivoted to turn in a vertical plane. The upper arm of these levers is preferably constructed in the form of a bow and each is provided with a nose 1236, 1237, 1238, 1239, 1240, 1241, 1242, 1243 and 1244, respectively, the several upper arms are of different length and nested one within the other so that their noses are arranged in a vertical row, as shown in Figs. 2, 3, 66 and 67. Each bow has a downwardly extending arm and each arm has a pin near its lower end, the arms of alternate bows are arranged in succession and are sufficiently elastic laterally to allow them to be sprung sidewise for engaging or disengaging their pins into links each of which is provided with a hole for that purpose. The object of this construction is to permit of providing means whereby the same tappet lever may be connected with one or another functional connecting link according to which is desired. The several tappet levers are pivoted on a transverse rod 1245 which is mounted at its opposite ends on the upper ends of two shifting arms 1246 and 1247 pivoted at their lower ends on brackets 1248 and 1249 projecting rearwardly from the rear part of the main frame, as shown in Figs. 2 and 66. The pins on the lower arms of the tappet levers are in line with the pivots of the shifting arms so that any links connected to the lower arms of the tappet levers are not affected by the bodily swinging movement of the act of tappet levers. In the operative position of the tappet levers the entire set is moved rearwardly bodily, as shown in Figs. 3 and 66, so that their noses are in position to be engaged by functional tappets 1250, 1251, 1252, 1253, 1254, 1255, 1256, 1257 and 1258 which are mounted in sets on the carriage. The rearward bodily movement of the tappet levers is limited by engagement of the shifting arm 1246 with the low face of a cam 1259, which is pivoted to the adjacent bracket 1249 so as to be capable of turning in a vertical plane, as shown in Fig. 66. The tappet levers are yieldingly held in this rearward position by a spring 1260 connecting the shifting arm 1246 and the bracket 1249. Upon turning the cam 1259 so that its high face engages and turns forward the shifting arm 1246, the tappet levers are shifted bodily into their forward position, whereby their noses are moved out of the path of the functional tappets 1250 to 1259 inclusive, and the automatic control of the functions of the machine by the carriage is rendered inoperative. The turning of the cam 1259 is effected by means of an arm 1261 projecting downwardly therefrom, as shown in Fig. 66.

In the form shown in the drawings, each of the functional tappets is constructed of flat metal and comprises a horizontal narrow or contracted body 1262, an enlarged head 1263 arranged at the front end of the body and projecting laterally from opposite sides thereof, and a finger piece 1264 arranged at the rear end of the body and projecting laterally from only one side thereof, as shown in Fig. 70.

A plurality of stacks or tiers of such functional tappets are arranged at suitable intervals lengthwise on the upper side of the carriage, the tappets of each stack being so arranged that their finger pieces alternately project in opposite directions so as to enable the same to be moved conveniently forward and backwardly into and out of their operative positions. Each stack or set of functional tappets is guided on the carriage by resting the same on top of the stop plate 1103, and embracing the bodies thereof by a frame or loop, said frame or loop comprising two upright posts 1265 and 1266 which engage with opposite sides of the bodies, and a cross piece 1267 connecting the upper ends of the the posts above the stack of functional tappets, as shown in Fig. 69.

The posts are narrower than the spaces between the head and tail or finger piece of each functional tappet. Upon pushing one or more of the functional tappets forwardly until its tail engages the adjacent post the head of the respective tappet is in the proper position to engage the nose of the companion tappet lever in line therewith when movement of the carriage carries the tappets past the levers, thereby causing the mechanism connected with said lever to be controlled automatically by the carriage. Upon pushing the functional tappet backwardly again so that its head engages the front side of the posts the respective tappet will not engage the nose of the companion tappet lever, and the lever and parts connected therewith will not be affected by the movement of the carriage. It will be noted that heads 1263 and tails 1264 of the functional tappets operate in conjunction with posts 1265 and 1266 to limit the forward and backward movement of the tappets The functional tappets may be held in their forward or backward positions by various means, that shown in the drawings consisting of front and rear holes 1268 and 1269 formed in the body of each functional tappet, and an upright bolt 1270 for each loop adapted to pass through an opening 1271 in the cross piece 1267 thereof and through either the front opening 1268 or the rear opening 1269 of each functional tappet, and to engage a threaded opening 1272 in the stop plate 1103, as shown in Figs. 5 and 6.

In use the separate stacks may be shifted and secured to the carriage in any position, according to the desired position of the columns in the same manner that the plate 1103 and its stop 1078 may be shifted and secured, as already described, and the stops or tappets in the different stacks that control the functions desired to be performed in their columns may be set forward and secured by the bolts 1270, whereby the carriage in moving forward from one column to another will automatically actuate the respective tappet levers for causing the machine to perform the desired functions in the desired columns.

If identical settings for carriage control are regularly or frequently desired, the functional tappets may be rigidly mounted on a stop plate, as shown in Fig. 54. This construction necessitates the employment of different stop plates, each provided with fixed functional tappets arranged to do a particular kind of work.

Where the columns are always in a fixed position, adjustable stops can be mounted on a plate if desired.

*Automatic control of platen feed by the carriage*

When the carriage is fed horizontally, for the purpose of printing items in a horizontal line across the paper, it is desirable to feed the platen automatically one line after the last item in a line has been printed, in order to cause the paper to move for printing the next line below its preceding one.

For this purpose the tappet lever 1228 and its respective tappet 1251 are operatively connected by the rearwardly extending link, horizontal lever, and forwardly extending link 1283 to a downwardly extending arm 1284 secured to the shaft 1280, to which is also secured a forwardly extending arm 1286 which terminates in a laterally projecting finger 1287 arranged beneath the arm 1160, as shown in Figs. 66, 68 and 79.

When the tappet 1251 engages its respective tappet lever 1237 it operates to raise the arm 1286 causing its finger 1287 to lift the arm 1160, which depresses the shifting bar 952, moving it out of operative relation with the platen feeding lever 965, whereby the platen feeding mechanism is made inoperative.

If the cam lever 1261 is depressed, to make operative the automatic carriage cross or horizontal feed mechanism, and the stop 1251 is set in the operative position in each set of stacks, one for each column of figures desired except the first, when the machine is operated the carriage will be automatically fed to print the items in a line across the sheet of paper, the platen paper line feed being inoperative except in the first, or left hand, column; and in said first column it will operate to line space the paper before printing takes place, as described under the heading "Paper feeding mechanism".

*Non-print and non-paper feed key*

Sometimes it is desired to prevent feeding the paper while adding a list of numbers without printing the same, and to permit of doing this a key 1297 is provided which is arranged on the keyboard, preferably near the left end of the front row of keys, and which is operatively connected with the printing mechanism and the paper feed mechanism so that they are rendered inoperative when the key 1297 is depressed. The connection between the no print key 1297 and the printing and paper feeding mechanisms, best shown in Figs. 6, 10, 31 and 85, consists of a front elbow lever pivoted on the rod 377 and having a front arm 1298 which is engaged by the shank of the key 1297, a rear elbow lever mounted on the rod 348 and having a front arm 1300 which is connected by a horizontal link 1301 with the rear arm 1302 of the front elbow lever, an upright link 1303 connected at its upper end with the rear arm of the rear elbow lever 1300 while its lower end is connected with the front end of the lever 1160 of the carriage and paper shifting bar 952, and a shifting finger 1304 connected by a sleeve 1305 with the rear elbow lever and engaging with the under side of a finger 1306 on the no-print bar 924. Upon depressing the key 1297 the bar 924 is raised, whereby the releasing hooks 169 are also raised so that when the bar 171 of the printing frame moves rearwardly, during the operation of the machine, the printing mechanism will not operate and, at the same time, the carriage and paper feed bar 952 will be depressed so that the platen will not be turned and feed the paper during the operation of the machine.

For holding or locking the key in a depressed position its shank is provided with shoulders 1307 which may be engaged with shoulders on the keyboard top, as shown in Figs. 84 and 85.

*Carriage control of non-print mechanism*

For the purpose of enabling the printing mechanism to be automatically rendered inoperative by the movement of the carriage, the rear arm 927, Fig. 63, of the printing hook shifting bar 924 is engaged by an upper forwardly extending arm of an elbow lever pivoted on the rear frame $f$, and whose downwardly extending arm is connected by a rod 1308 with the lower arm of the tappet lever 1234. Upon setting the tappet 1257 of one or more of the tiers forwardly into operative position, said tappet, upon being moved by the carriage into engagement with the tappet lever 1234, causes the latter to be turned so as to raise the bar 924 together with the printing hooks, thereby rendering the printing mechanism inoperative.

*Carriage return lever*

When the carriage reaches the end of its movement, toward the right, it may be returned to the left by hand and, at the same time, the platen may be automatically moved thereby to feed the paper for printing in the next line, and during this return movement the tappet levers are bodily moved forwardly out of the path of the tappets on the carriage so that the parts operated by the tappets will not be disturbed and so as to permit of freely returning the carriage to the place of beginning.

The means for this purpose comprise a horizontal shipper bar or rod 1309, Fig. 67, arranged transversely between the front side of the carriage and the rear side of the upper ends of the rock arms 1246 and 1247 upon which the tappet levers are pivoted, depending rock arms 1310 and 1311 pivoted at their upper ends 1314 and 1316, respectively, on the carriage and connected at their lower ends with opposite ends of the shipper rod 1309, and upper arm 1312 extending forwardly from the right rock arm 1311 and forming a rock lever with the latter, and an upright hand lever 1313 pivoted at its lower end on the right end of the carriage so as to swing transversely in the direction of the return movement of the carriage and provided at its lower end with a forwardly projecting finger 1315 arranged underneath the arm 967 supporting the platen feeding pawls 968 and 969. The finger 1315 is provided near its end with a hole through which passes the front end of the arm 1312 of the shipper bar 1309, as shown in Figs. 2 and 103.

Upon moving the return lever by hand to the left the carriage is moved toward the left and, at the same time, the finger 1315 turns the rock lever 1312 so as to move the shipper rod 1309 forwardly, thereby moving the supporting arms 1246 and 1247 and the tappet levers forwardly, so that the upper arms of the latter are out of the path of the tappets which are set in a forward or operative position on the carriage, and at the same time the finger 1315 raises the pawl arm 967 and causes the pawls to turn the platen for feeding the paper for printing on the next line.

*Dividing the printing devices into separate sets*

Means are provided for dividing the accumulating and printing mechanisms so as to permit recording two or more sets or columns of numbers independently of each other, this mechanism is constructed as follows:

1318, Figs. 27 and 28, represents a vertically movable slide mounted on the left side of each trip arm latch 163 and carrying at its upper end the shoulder or lug 208 of the respective latch forming part of the automatic zero printing mechanism.

The preferred means for guiding the slide 1318 on the latch consists in providing the slide on its right side with laterally and downwardly projecting lips 1319 which are arranged in openings 1320, Fig. 65, in the latch and engage with the right side of laterally and upwardly projecting lips 1321, formed on the left side of the latch, as shown in Figs. 27 and 28.

The slide 1318 is yieldingly held in its depressed position, in which the shoulder 208 thereof stands in the path of the next higher transfer hook 209, by means of a spring 1322 which is arranged in coinciding slots in the latch and slide and engages at its upper end with a teat 1323 at the upper end of the slot in the latch, and at its lower end with a similar teat 1324 at the lower end of the slot in the slide.

This means of mounting the slide on the latch enables these parts to be arranged compactly.

Upon moving the slide of any latch upwardly, so that its upper shoulder 208 is moved out of the path of the hook or finger 209 of the next higher latch, the printing devices are divided at this point into two sets or groups, each of which is capable of printing a number independently of the other.

This division of the printing devices is due to the fact that by shifting a slide so that its shoulder 208 is out of the path of the next higher transfer hook or finger 209, the transmission of the movement of the latches in the left hand set to latches in the right hand set is prevented, thereby preventing automatic printing of the zeros in the right hand printing device, by reason of the shifting of latches 163 in the left hand set.

The raising of the slide for thus dividing the latches 163 into groups may be effected by various means, that shown in Figs. 20, 24 and 25 of the drawings comprising a vertically rotatable tappet 1325 adapted to engage with the under side of a shoulder or lug 1326 which projects forwardly from the lower end of the latch slide 1318.

This tappet may be shifted transversely in the machine so as to bring it underneath the lower lug or shoulder 1326 of any one of the printing latch slides and thus permit the printing devices to be divided at any desired place, into two sets.

The means for this purpose, shown in the drawings, comprise a horizontal tappet rock shaft 1327 arranged transversely in front of the printing latches 163, and a collar 1328 carrying the tappet 1325 and mounted on the tappet shaft so as to be compelled to turn therewith but free to slide lengthwise thereon. This connection between the tappet shaft and collar is preferably effected by making this shaft square in cross section and the bore of the collar 1328 which receives the shaft 1327 of corresponding form, as shown in Figs. 20, 24 and 25.

The adjustment of the tappet transversely in the machine or lengthwise of its shaft 1327 is preferably effected by means shown in Figs. 2, 3, 10, 24 and 63 as comprising an adjusting shaft 1329 journaled lengthwise in the frame, an upwardly projecting rock arm 1330 arranged on the front end of the adjusting rock shaft, a link 1338 connecting the upper end of the rock arm 1330 with a collar 1339. Said collar is mounted on the sleeve 1328, to move longitudinally therewith and to rotate relative thereto. A crank arm 1331 is secured to the rear end of the adjusting shaft.

Upon turning the crank arm 1331 the tappet 1325 may be slid on the tappet shaft underneath the lower shoulder of any one of the printing latches 163, and when the tappet is in the desired position it is locked in this position by a spring catch 1332, mounted on the crank arm 1331 and adapted to engage with one of a segmental row of notches 1333 formed in a flange 1334 on the rear side of the frame.

After the tappet 1325 has been thus adjusted the same may be turned, together with its collar 1328 and shaft 1327, by an upright rock arm 1335 secured to the tappet shaft 1327, Figs. 10 and 24, and a longitudinal shifting bar or key stem 1336 connected at its front end with the upper end of the rock arm 1335, as shown in Fig. 10, and passing with its rear end through an opening in the rear frame, as shown in Figs. 2 and 8. This key is provided with a catch arranged on its under side and having an abrupt rear side and an inclined front side, and with a finger piece or handle similar to the shifting keys hereinbefore described.

When the printing devices are not divided into two parts the tappet 1325 is in its depressed position, shown in Fig. 20, and the shifting bar is moved rearwardly with its catch in rear of the opening of the frame, as shown in Fig. 8.

When it is desired to divide the printing devices into two groups or sets the shifting key 1336 is pushed forwardly and held in this position by engaging the abrupt rear side of its catch with the frame in front of the lower end of the opening in the frame.

For the purpose of rendering the tappet inoperative, it is only necessary to raise the rear end of the shifting key 1336 sufficiently to move the catch above the lower edge of the frame opening, when the key bar 1336 will be moved rearwardly by a spring 1337, shown in Fig. 10, and the tappet shaft 1327 will be turned in the direction for depressing the tappet 1325 and permitting the respective slide to descend so that its upper shoulder 208 is again in its operative position.

*Carriage control of the division of the printing devices*

For the purpose of automatically dividing the keyboard by the paper carriage, when the carriage is moved into one or more predetermined positions, means are provided which include the tappets 1252 of the paper carriage and the tappet lever 1229 heretofore described, and, in addition thereto, a link 1364 which may be made to connect the lower arm of the tappet lever 1229 with a depending rock arm 1365, secured to a sleeve on the square tappet shaft 1327, as shown in Figs. 10, 67 and 79. As the carriage moves into a position in which one of its tappets 1252 engages the nose 1238 on the upper arm of the tappet lever 1229, the latter is turned so as to pull rearwardly on the rod and thereby turn the tappet shaft 1327 so as to divide the keyboard at the particular place where the dividing device has been set. This automatic division of the keyboard occurs whenever the tappets have been set for this purpose on the carriage. When the carriage is moved so that said tappets are disengaged from the tappet lever 1229 the dividing device is automatically rendered inoperative by the spring 1337 connected with the depending arm 1365, as shown in Fig. 10. In order to prevent the manual and automatic keyboard dividing devices from interfering with each other, the hand operated key or bar 1336 has a slot 1366 which receives a pin 1367 on the upright arm 1335, and the depending arm 1365 has a slot which receives a pin on the link 1364, as shown in Fig. 10. By this means a backward pull on the link 1364 by the carriage tappet causes the upright arm 1335 to move idly on its bar 1336, and when the latter is pushed forward by hand the depending arm 1365 moves idly on the link 1364.

*Auxiliary keyboard dividing device*

At times it is necessary to divide the keyboard into more than two sections and for this purpose an additional or auxiliary dividing device is provided so as to permit of dividing the keyboard and the mechanism controlled by it into three sections. This dividing device is preferably so constructed that it may be set for dividing the mechanism at the right and left in its set position independent of the other or main dividing device just described, which is arranged to divide the left hand part of the keyboard. This auxiliary keyboard dividing device is shown in Figs. 24 and 26 and is constructed as follows:—

1380 represents an adjusting sleeve which is capable of longitudinal adjustment on the right end of the tappet shaft but compelled to turn therewith; this being preferably effected by making this sleeve square in cross section and fitting the same on the tappet shaft 1327. 1381 represents an auxiliary dividing tappet arranged on the inner end of the adjusting sleeve 1380 and adapted to be shifted by the sleeve so as to clear the lower lugs 1326 of the dividing slides or to stand underneath one of said lugs toward the right hand end of the row of printing trip latches 163. The outer end of the adjusting sleeve 1380 passes through a circular collar 1384, which is journaled in a bearing in the adjacent side of the machine frame e and held against axial movement by outer and inner flanges thereon bearing against the outer and inner side of said machine frame e. After the auxiliary tappet 1381 has been shifted lengthwise on the tappet shaft to the desired position the same may be held in position by a set screw 1385 arranged in the collar 1384 and engaging with the adjusting sleeve.

When it is desired to divide the key controlled mechanism at the right hand side of the same, the auxiliary tappet 1381 is first set underneath the lug of that slide 1318 which ordinarily couples the trip latches on opposite sides of the division. Upon now turning the tappet shaft 1327, in the manner hereinbefore described, the tappet 1381 will raise the dividing slide so as to prevent automatic printing of zeros across the division.

When two divisions in the keyboard are desired both dividing devices are first set into the required positions on the tappet shaft and then the latter is turned for effecting the divisions in the keyboard. If only one division in the keyboard is desired one dividing device only is set to effect the division while the other is moved into a position in which it is inoperative.

*Indicator for keyboard divide*

In order to enable the operator to determine the position of the dividing devices for effecting the desired divisions in the printing devices and associated parts of the keyboard, indicating or determining means are provided. Although this may be effected in various ways, the means shown in the drawings consists of a segmental scale 1386, Fig. 2, arranged on the frame adjacent to the shifting handle 1331 and graduated to correspond with the position of the left dividing tappet 1325 relatively to the dividing slides 1318, and the adjusting sleeve carrying the right tappet is for a like purpose provided with a scale or graduations 1387, as shown in Fig. 26.

*Division or splitting of printing mechanism modifies horizontal ruling*

When the shaft 1327 is rocked, as explained hereinbefore, to effect a split or division in the printing mechanism through the lifting of one or two slides 1326 by the action of one or both of the lugs 1325 and 1381, corresponding fingers or projections 1340 and 1383 are rocked into the path of any of the fingers 1341 formed on the actuators 25 which may be in the same plane therewith.

It may be recalled that in the operation of the ruling devices for effecting the printing of a horizontal rule the stop arms 39, which normally arrest the rearward movement of the actuators, will be withdrawn and the fingers 493 will tend to cause a rearward movement of all of the actuators to position the ruling type at the printing line. However, when the machine is split and it is attempted to do ruling, the fingers 1340 and 1383 will prevent the rearward movement of the carriers 25 at the lines of split, and the spring fingers 493 of these carriers will be merely tensioned. The spring fingers 493 have been constructed so as to be flexible for taking care of this condition. But the rearward movement of the carriers to the left of those which are detained by the fingers 1340 and 1383 will, through the automatic zero mechanism cause printing of zeros by the type of the carriers which are detained. It will therefore be seen that when the machine is split, and ruling is done, a line of ruling will be printed which will be interrupted by a zero printed under the lowest denomination of each set above a line of split, thus:—0—0—.

Division indicating bar

For the purpose of indicating on the keyboard where the division has been made in the printing mechanism and also to guide the operator in determining the division between the dollars and cents rows of keys, an adjustable indicator is provided. This indicator preferably consists of a longitudinal bar 1388 adapted to be arranged between different adjacent rows of keys and provided at opposite ends with depending pins 1389 which are adapted to engage with openings or sockets 1390, formed in the top of the keyboard in line with the spaces between the rows of keys, as shown in Figs. 1 and 24A. When a division is made in the keyboard an indicator bar is placed between the particular rows of keys to mark the line of division and a like indicator may also be used to designate the division between the dollars and cents keys or any other division desired in the keyboard.

Partial non-print controlled by ruling key

Means are provided for disabling the printing hammers, associated with one section of the keyboard, whenever certain of the special shifting keys, including the ruling key are depressed. Thus, two columns of numbers may be printed simultaneously under the split-printing arrangement but, when a horizontal rule is to be printed, either under the control of the keys 363, or automatically under the control of the carriage, those hammers associated with the left hand column of numbers will be disabled and the horizontal rule will be formed only below the right hand column of numbers.

Means are also provided whereby this mechanism may be made operative or inoperative, either manually by the operator or, automatically, under the control of the paper carriage. The mechanism for accomplishing this is constructed as follows:

Arranged adjacent to the left hand side of the group of printing latches 169 is a throw-off frame which is pivotally mounted and which, when rocked, will serve to disable one or more of the printing devices. This throw-off frame, as shown in Figs. 63 and 64, comprises a hub 1391 which is pivotally mounted upon a rod 1391a and is capable of both a rotary movement and a longitudinal sliding movement upon said rod. A pair of forwardly extending arms 1392 and 1393 of the frame are joined at their forward ends by a cross bar 1394, while the arm 1393 has a rearward extension 1395 provided with a lateral finger or bar 1396, which is adapted to extend under any desired number of the printing latches 169. The transverse movement of the frame, to position the finger 1396 under the desired latches, is effected by means of an elbow lever 1397, 1402, which is pivoted on the frame and the lower arm of which is connected by a link 1398 with a rock arm 1399 mounted on the previously mentioned rock shaft 1329. The upper arm 1402 of the bell crank is connected by a link 1401 to a collar 1400 mounted on the hub of the throw-off frame, so as to move axially therewith but not turn therewith. The arrangement of the parts is such that when the rock shaft 1329 is shifted by the handle 1331, to effect a division in the keyboard between any two adjacent trip latches and related parts, the finger 1396 will be moved from left to right under a corresponding number of printing latches, to thereby disable the left hand printing section, in the manner which will be described.

1403 represents an upright throw-off bar or lever arranged between the front cross bar 1394 of the throw-off frame and its supporting hub 1391. The throw-off bar is provided at its front edge or side with a downwardly facing shoulder or hook 1404, which is adapted to engage the cross bar 1394, to rock the throw-off frame, under the conditions which will presently be described. At its upper end the throw-off bar is pivoted on an upper rearwardly projecting arm 1405 of an elbow lever mounted on the cross rod 455 and having a downwardly extending arm 1406 (Fig. 63), which is connected by a link 1407 to an arm 1408 (Fig. 10), extending rearwardly from a frame which is mounted on a rod 353 and is adapted to be rocked by the depression of some of the shifting keys, including the rule key. The connections for the latter purpose are best shown in Fig. 29 and comprise a link 518 which has a pin and slot connection with the arm 502 of a bell crank, which is rocked by depression of the rule key 363. The forward end of link 518 is connected to an arm 503, pivoted at 504, and the lower end of which is connected by a link 505 to an arm 506 of a bell crank 506, 507. The lower arm of this bell crank is adapted to engage a cross bar carried by a frame 398 which also carries the rearwardly extending arm 1408. It will be apparent that through these connections depression of the key 363 will serve to rock the bell crank 506, 507 counter-clockwise and will rock the frame 398 in the same direction to cause a downward pull upon the link 1407, and this movement will in turn be transmitted to the bell crank 1405, 1406 to cause a downward movement of the throw-off bar 1403. If the shoulder 1404 of the throw-off bar is at this time engaged over the cross bar 1394, it will serve to rock the throw-off frame in a clockwise direction (Fig. 63) and lift those latches 169 which are above the finger 1396 into ineffective position. Provision is made for either manually or automatically controlling the effectiveness of the throw-off bar and, for this purpose, any suitable mechanism, such as the following, may be employed.

In order that the throw-off bar 1403 may be rendered effective or ineffective at will, the lower end of the latter is pivotally connected to a sectional shifting bar 1409, 1414, the sections of which are connected by a pair of pins 1410 and 1411 carried by one, and slots 1412 and 1413 carried by the other, the rear section being provided with a key 1414 which extends through the rear frame f of the machine. A spring 1416 connected with the section 1409 and a spring 1417 connected with the key section 1414 serve to normally draw these two members rearwardly, so that the throw-off bar 1403 is correspondingly shifted toward the rear to disengage its shoulder 1404 from the cross bar 1394. If the key 1414 is forced inwardly or toward the front of the machine and its shoulder 1415 is engaged with the rear frame f to latch the key in its inward position, the pins 1410 and 1411 of the key section will engage the forward ends of the slots 1412 and 1413, to force the bar 1409 forwardly and thereby rock the throw-off bar 1403 sufficiently to engage the shoulder 1404 over the cross bar 1394. In order to restore the parts to their normal position it is merely necessary to lift up slightly on the rear end of key 1414 to disengage its shoulder 1415 and permit the springs 1416 and 1417 to shift the key as well as the bar 1409 toward the rear. The purpose of the pin and slot connection between the bar 1409 and the key section 1414 is to permit independent movement of these parts, so that the throw-off bar 1403, together with bar 1409 may be shifted forwardly into active relation with the cross bar 1394, under the control of the carriage, without shifting the key section which, if moved, might become latched. The connections for so shifting the throw-off bar under control of the carriage, as best shown in Figs. 63 and 79, comprise a link 1421 which may be connected with the tappet lever 1228 so that as the latter is tilted rearwardly or clockwise (Fig. 67) the link 1421 will be drawn toward the rear and will rock a two-armed lever 1419, so as to give a forward thrust to a rod 1420. The latter, as best shown in Fig. 63, is connected to the throw-off bar 1403, so that wherever a carriage tappet 1251, in a particular column is in its active position, the throw-off frame may be placed under the active control of the throw-off bar 1403, even though the key 1414 is in its normal, rearward position. Consequently, when the ruling key 363 is depressed with the carriage in such a column, the finger 1396 will be elevated to disable a portion of the printing latches 169.

*Elimination of printing of numbers in part of a column*

Means are further provided whereby the printing may be eliminated in a certain section or column of the printing mechanism, without depression of the rule key, and even though keys may have been depressed in that section either intentionally or accidentally. Means are also provided whereby this mechanism may be rendered operative or inoperative manually or may be controlled automatically by the paper carriage.

1422 and 1423 represent the upper and lower arms of a printing controlling rock lever which are capable of moving together or one independently of the other. These arms are both pivoted on a rod 1424 and are compelled to move forward together by means of a tail or shoulder 1425 on the upper arm 1422 engaging with a tail or shoulder 1426 on the lower arm 1423, said shoulders being normally held in engagement with each other by a spring 1427 which connects the arms 1422 and 1423 and normally makes the lever which they form a rigid structure, as shown in Fig. 63. The upper arm 1422 projects rearwardly from the pivot rod 1424 and overhangs the front bar 1394 of the throw-off frame. On its upper side the upper arm 1422 is provided with a finger 1428 which is arranged in front of a finger 1429 depending from the hub of the rock lever 1405 and 1406. The printing lever may be operated either manually or automatically. The manual operating means comprises a sectional shifting bar having front and rear sections 1430 and 1431, respectively, which are slidably connected by pins in one bar engaging with longitudinal slots in the other bar similar to the construction of the front and rear section bars 1414 and 1409 before described, as shown in Fig. 63. The front bar section 1430 is connected with the lower arm 1423 of the printing lever while the rear bar section 1431 passes through an opening in the rear part of the frame and has a thumb piece or key and a rearwardly facing shoulder similar to the shoulder 1415 on the bar 1414. Both bar sections are yieldingly held in their rearmost position by springs 1432 and 1433 connecting the same with the frame, as shown in Fig. 63.

Upon pushing the bar sections forwardly by means of the key the printing lever 1422 and 1423 will be turned so that its arm 1422 depresses the front bar 1394 of the throw-off frame, the parts being held in this position by the shoulder of the rear bar section 1431 engaging with the front side of the rear part of the machine frame. While the throw-off frame is thus turned the coupling hooks 169 are lifted thereby and printing of the corresponding printing devices is prevented. In this condition of the parts numbers may be set up on one section of the keyboard and printed, while numbers intentionally or accidentally set up on the left hand section of keys will not be printed, but may serve to control other functions of the machine. When, however, a shifting key, such as the rule key, is operated and the frame 398, Figs. 10 and 29, is thereby moved forwardly, the finger 1429 of the elbow lever 1406 is moved forwardly by the link 1407 and by engaging the finger 1428 causes the upper arm 1422 of the printing lever to rise independently of its companion lower arm 1423, thereby permitting the throw-off frame 1394 to turn in the position for lowering the coupling hooks into their operative position. As a result of this operation of the parts, a full horizontal rule is printed across the foot of both columns. When the frame 398, Figs. 10 and 29, again returns to its normal position the finger 1429 recedes and allows the upper arm 1422 of the printing lever to again be returned by the spring 1427 into its depressed position in which it lifts the printing coupling hooks 169 into their inoperative position through the medium of the throw-off frame so that the numbers added by the respective adding mechanism to the left are not printed individually. Upon releasing the shifting bar sections 1430 and 1431 and permitting the same to move rearwardly the printing lever is rendered inoperative.

*Carriage control of the elimination of the printing of numbers in part of a column*

The means for causing the automatic non-printing of individual numbers set up comprises the tappets 1253 on the paper carriage, the tappet lever 1230 the upper arm of which may be engaged by one or another of said tappets, an intermediate lever 1434, Figs. 63 and 79, pivoted on the rear frame, a front link 1435 connecting one arm of the intermediate lever 1434 with the lower arm 1423 of the printing lever, and a rear link 1436 connecting the other arm of the intermediate lever with the lower arm of the tappet lever 1230. When the carriage is moved to bring one of its tappets 1253 into engagement with the upper arm of the tappet lever 1230, the latter is turned in the direction for depressing the upper arm 1422 of the total printing lever, and thereby renders the printing devices of the left column inoperative. But when the ruling mechanism is operated the horizontal rule is printed at the foot of the column, in the manner before described, regardless of the position of the paper carriage.

Owing to the slack connection between the two sections 1430 and 1431 of the manual shifting bar the paper carriage is free to render the left hand column printing mechanism inoperative without interference from the hand shifting mechanism.

Words printing controlling key

It is at times desirable to print words or their abbreviations such as com., bal., dis., etc. in front of the numbers being added and listed. For this purpose, means are provided which enable the operator to do this and still not reduce the capacity of the machine at other times, and these are constructed as follows:—

The rear arms of any desired number, preferably three of the main type and gear segment supporting levers 25–142 to the left are made shorter and not connected directly to the link of the type supporting bar. Instead, an auxiliary rock lever is pivoted by a pin 1437 (see Figs. 80 and 81) or otherwise to the short arm 142 of the main supporting lever.

The rear arm 1438 of the auxiliary lever connects with the rear link 146 and its front arm 1439 has a lateral off-set 1440 which projects into an opening 1441 in the short rear main arm 142 and forms a slack connection between the short main arm and the auxiliary lever, whereby the latter is permitted to move relatively to the main supporting lever a sufficient extent to move the type head 144 one half step, as shown in Figs. 80 and 81.

Each front arm 1439 of the auxiliary lever is provided with a finger 1442 on its front end, adapted to be engaged by a cross bar 1443 which is supported by arms 1444 and 1445 on the shaft 1446. An arm 1447 extending downwardly from the shaft 1446 is connected to a word printing key 1448 mounted at the front end of the machine, as shown in Fig. 1, in the following manner. The lower end of its stem is pivoted to one end of a forwardly extending arm 1449 which is fixed to a rod or shaft 1450, an upwardly extending arm 1451 is fixed to said shaft and is connected by a link 1452 with the arm 1447 of the rock shaft, as shown in Figs. 8, 80 and 81.

The type heads 144 are provided with letter or word type 1453 arranged between the number type 145, as shown in Figs. 80 and 82. The number type are normally in the printing line but when the words key 1448 is depressed the bar 1443 is moved downwardly depressing the finger 1442 and arm 1439, thereby raising the rear arm 1438 and moving the type head to a position to bring the letter type, which is half way between the number type, to the printing position.

The first three rows of number keys 280 to the left may be marked with small letters, as shown in Fig. 1. Assuming that a number 5 key is depressed the 5 number type would be ordinarily moved to the printing line, as shown in Fig. 80, but when the word key 1448 is also depressed it causes the type head to move upwardly an additional half step, bringing the letter type 1453 in the printing line, as shown in Fig. 81, and when the machine is operated a letter or word corresponding to the letter or word on said number keys will be printed.

By equipping the first type segment at the left with intermediate word or letter type and the first row of number keys to the left with corresponding letters representing the first letter of the words desired to be printed, the second segment with letter type and the second column of number keys with letters representing the middle letter or words or abbreviations desired to be printed, and the third segment and third column of number keys with type and letters respectively corresponding to the third or last letter of words or abbreviations desired to be printed, a large number of combinations of letters or words can be produced.

The words key is provided on its shank with notches which may be engaged with a notch in the guide plate to lock it in its operative position, as shown in Figs. 80, 81 and 84.

Automatic elimination of the printing of zeros to the right of words

Means are provided whereby the depression of the words key, for printing letters instead of figures automatically, prevents the automatic printing of zeros to the right of the letters printed.

This may be accomplished in various ways but the method shown in the drawings utilizes the left hand keyboard dividing device, which is first set to divide the printing devices between the letter printing segments and the remaining segments by setting the lever 1331.

The rod 1446, shown in Figs. 80 and 81, is provided with a depending arm 1454 which is connected by a rod 1455 with the rock arm 1335, Fig. 10. When the words key 1448 is depressed it moves the rock arm 1335 forwardly and thereby renders the automatic printing of the zeros to the right inoperative, as before described.

The link 1455 has a pin and slot connection with the arm 1335, whereby the arm may move independently of the link.

Supplemental counting and numbering device

A combined supplemental counting device, whereby items may be counted, and numbering device, whereby they may be consecutively numbered and their numbers consecutively printed, and which in either case is capable of automatically printing the total of the items counted or numbered, is incorporated into the machine.

This supplemental counting or numbering device is best shown in Figs. 89, 92, 93, 94 and 95 and is constructed as follows:

1459 represents a longitudinal printing bar arranged adjacent to the left of the highest accumulator actuating elbow lever 25 and supported near its rear end by a link, while its front end is operatively connected with the lower arm 147 of a rock lever having an upper arm 154 which is engaged by a trip cam 156, the same as in the printing devices heretofore described. The trip cam is normally held in its elevated inoperative position by a trip latch 163, and the latter has pivoted thereto the usual rearwardly projecting hook 169 adapted to be engaged by the rocking printing frame 171. Near its rear end the bar 1459 is supported by a link 146, similar to the links 146 of the regular adding and printing mechanisms, but pivoted at its upper end on a stud secured to the stationary frame d. Parallel with and adjacent to the left side of the rear end of the printing bar 1459 is a supporting bar or plate 1460 which is connected to bar 1459 by transverse rods 1461, 1462 and 1463. On the rearmost rod 1463 are arranged one or more printing wheels, three of such wheels 1464, 1465 and 1466 being shown in Fig. 95 side by side, and indicating, respectively, the units, tens and hundreds members of the counting or numbering device. Each of these wheels is provided on its periphery with ten number type comprising the digits, and between adjacent types the same is provided with recesses 1467 so that the type wheel forms practically a gear wheel. The type or number wheels are separated from each other and from the bars 1459 and 1460 by interposed spacing collars 1468, and each type wheel is provided on its left side with a pin or shoulder 1469 which is adapted to engage with the abrupt face or shoulder 1470 of a stop pawl or dog 1471 when the zero type of said wheel is in the printing position. The several stop pawls are pivoted on the rod 1472 and each is yieldingly held in its elevated position by a spring 1473 so that the shoulder 1470 thereof is normally in the path of the pin 1469, the upward movement of the stop pawl being limited by the rod 1474 which serves as a stop.

1475 and 1476 represent carrying gear wheels mounted on the rod 1462 and meshing, respectively, with the units and tens printing gear wheels 1464 and 1465. 1477 and 1478 represent carrying disks arranged at the left of the units and tens carrying gear wheels 1475 and 1476 and each provided with a single tooth 1479. The carrying disk 1477 at the left of the units carrying gear wheel 1475 is connected with the latter by a hub 1480 and its tooth 1479 is adapted to mesh successively with the recesses of the tens type wheel 1465.

The carrying disk 1478, at the left of the tens carrying gear wheel 1465, is connected with the latter by a hub 1481 and its tooth 1479 is adapted to mesh successively with the recesses of the hundreds type wheel 1466.

1484 represents the shaft of a rock lever mounted on the bars 1459 and 1460 and provided at its right end with an upper arm 1482 to which is pivoted an actuating pawl 1483 which engages with the units carrying gear wheel, while its left end is provided with a forwardly extending arm 1485 which is connected with the upper end of a link 1486. The lower end of the latter is provided with a hook or shoulder which is adapted to engage with a pin or shoulder 1487 on a forwardly extending arm 1488, Figs. 77 and 89, secured to the shaft 805 to which is secured the cam arm or lever 957 heretofore described; a spring 1486½, one end of which is secured to a stationary part of the machine and the other to the link 1486, serves to draw the latter rearwardly. As cam lever 957 is rocked by the cam 959, during each operation of the machine the actuating pawl 1483 turns the units carrying gear wheel 1475, as well as the units printing or numbering wheel 1464, forward one tooth or number space. Whenever the units carrying gear wheel completes a rotation the tooth 1479 of its carrying disk 1477 engages with the tens type wheel 1465 and turns the same one tooth or number space. In like manner the tooth 1479 of the disk 1478 turns the hundreds type wheel 1466 one space when the tens carrying gear wheel 1476 and type wheel 1465 complete a rotation. During the last part of the first half of each operation of the machine the rocking printing frame 171 engages with the hook 169 and pulls the trip latch 163 out of engagement from the trip cam 153, whereby the latter in descending rocks the lever 147 and causes the type wheels to be projected with the particular type at the printing line against the ink ribbon and record sheet of the platen and produce a record thereon of said type. The numbers of the type wheels may be printed successively and consecutively in this manner as the counting on the same proceeds at each operation of the machine.

*Counting and numbering clearing mechanism*

For the purpose of clearing or restoring this supplemental counting or numbering device to zero the following means are provided:—

1489 represents a return gear wheel mounted on the rod 1462 and meshing with the hundreds type wheel 1466 at the left of the hundred carrying disk 1478.

1490 represents detent pawls pivoted on the rod 1472 and each yieldingly held in engagement with one of the gear wheels by a spring 1491. 1492, 1493 and 1494 represent a plurality of friction rings each arranged adjacent to the left of one of the gear wheels 1475, 1476 and 1489, secured between the bars or plates 1459 and 1460 on the shaft 1461, spaced apart by washers 1495 on the shaft 1461, and held from turning by the shaft 1484 and spacing washers 1496 on the shaft 1484. Within each of the friction rings is arranged a spiral return spring 1497 which is secured at its inner end to the hub of the respective gear wheel, while the outer convolutions of the return springs bear frictionally against the inner annular bore of their companion friction rings. As each gear wheel turns forwardly the return spring connected with its hub is wound up or strained until the tension on the same is such as to overcome the friction between the return spring and the bore of the companion friction ring. When this occurs the return spring, during the continued forward turning movement of the gear wheels, simply slides circumferentially within the bore of its friction ring.

When it is desired to restore the type or number wheels 1464, 1465 and 1466 to zero the detent pawls 1490 are depressed out of engagement with their gear wheels, thereby releasing the latter and permitting the return springs 1497 to turn the same quickly backwardly together with the type wheels meshing therewith. The backward movement of each type wheel continues until its pin 1469 engages with the shoulder 1470 of the respective stop pawl 1471, at which time the type wheel presents its zero type to the printing line and is ready for beginning the next counting or numbering operation.

For the purpose of permitting the several detent pawls 1490 to be disengaged simultaneously from their respective gear wheels a releasing bar 1498 is arranged transversely above the detent pawls and supported by rock arms 1499 and 1500 from the rod 1472, as shown in Fig. 95. While the detent pawls 1490 are disengaged, the actuating pawl 1483 must also be disengaged from the units gear wheel 1475, and this is effected automatically by a tail 1501 projecting upwardly from the right rock arm 1499 and engaging with a tail 1502 depending from the actuating pawl 1483, as shown in Figs. 92 and 93.

The operation of printing the number represented by the counting device is effected simultaneously with the printing of the number which is being listed.

It will be noted that the counting mechanism is advanced by the cam 959 during each operation of the machine and that it is not provided with individual setting keys.

*Counting and numbering prevented during idle operations*

Means are provided for preventing the counting mechanism and its printing mechanism from operating when the machine is operated while no number setting key is depressed. The means for this purpose, shown in Figs. 89 and 90, comprises an upper elbow lever pivoted on the transverse rod 263 and arranged with its upper forwardly projecting arm 1503 underneath the bar 555 while its lower depending arm 1504 is provided with a laterally projecting finger 1505. An upright elbow lever pivoted on a horizontal stud or pin 1506 on the adjacent part of the frame is provided with an upwardly projecting arm 1507 which engages against the rear side of the finger 1505, while its forwardly projecting lower arm 1508 is adapted to engage with the under side of the printing hook 169 of the counting and numbering mechanism. An elbow lever also pivoted on the stud or rod 1506 has an upper upwardly projecting arm 1509 which also engages with the rear side of the finger 1505, and has a lower rearwardly projecting arm 1510 which is adapted to engage with the upper side of a tail 1511 projecting forwardly from the actuating pawl 1483 in front of its pivot.

Whenever a number setting key on the keyboard is depressed the universal bar 555, which is supported by a pair of arms 556 pivoted on the shaft 263, is raised through the engagement of a shoulder on the detent 261, corresponding to the key depressed; thus permitting the upper elbow lever 1503 and 1504 to turn forwardly, and permitting one of the lower elbow levers to lower the printing hook 169 into the path of the printing frame or yoke 171 and the other lower elbow lever to lower the actuating pawl 1483 into engagement with the units carrying gear wheel 1475 of the numbering and counting mechanism. In this position of the parts an operation of the machine will cause the number wheels of the counting device to be advanced one step or number and a record of the number represented by the counting mechanism to be produced on the sheet. When, however, no number key on the keyboard is depressed and the universal bar 555 remains in its depressed position, then the upper and lower elbow levers will remain in their retracted positions, in which the printing hook 169 will be held out of the path of the printing frame or yoke 171, and the actuating pawl 1483 will be held out of engagement with the lowermost or units carrying wheel 1475 and thus render the counting mechanism and its printing mechanism inoperative.

*Counting prevented during ruling operations*

Means are provided whereby counting is prevented while ruling, and whereby the counting mechanism is prevented from printing during such operations. The means for this purpose, shown in Figs. 29 and 89, comprise a longitudinal rod or bar 1512, which is connected at its front end with the arm 513 of the frame 398, as shown in Figs. 29 and 89, while its rear end is connected with the link 1486. Upon depressing the ruling key 363, the frame 398 is shifted, which causes the bar 1512 to move the link 1486 forwardly so that its shoulder is out of the path of the pin 1487 on the cam rock arm 1488, whereby the cam does not transmit movement to the link 1486 and the actuating pawl 1483, and the counting device is inoperative. Owing to the fact that the universal bar 555, which extends only across the number key latches, is not raised by any key in the same row with the ruling key, whereby the arm 1503 of the upper elbow lever is depressed and the arm 1508 of the lower elbow lever is raised, the printing hook 169 is raised so its nose 170 is out of the path of the bar 171 and the printing of the counting mechanism is inoperative, as shown in Fig. 89.

*Counting or numbering key*

Means are provided for preventing the counting and numbering mechanism from printing except when the machine is operated after depression of a total shift key. In other words the device may be converted either into a counting device, in which the items are counted and the total number of items only is printed on depression of a total shift key, or into a numbering device, in which each item is consecutively numbered and the total number of items printed during an operation in which the total shift key is depressed. This mechanism is constructed as follows:

1513 represents the upper arm of an upright rock lever arranged in the rear part of the machine, which is connected by a link 1514 with the upper arm of the elbow lever 1507, as shown in Fig. 89, while its lower arm 1515 is connected with the front end of the shank of a horizontally movable counting and numbering key 1516. The numbering key projects through an opening in the rear frame of the machine, is similar in construction to other keys similarly located, as heretofore described, and is provided with a shoulder which is adapted to engage with the front side of the rear frame and hold it in its forward position when required. Upon pushing the counting and numbering key 1516 forwardly, in this manner, the elbow lever 1507 and 1508 is turned through the medium of the link 1514 so as to keep the printing coupling hook 169 in its elevated position, as shown in Fig. 89, whereby the number represented on the counting wheels will not be printed during the counting operations. But while the elbow lever is thus held in its inoperative position the other elbow lever 1509 and 1510 is free to be released by the universal bar 555 when a number setting key is depressed, thereby permitting the actuating pawl 1483 to drop into engagement with the lowest or units carrying gear wheel, whereby the successive operations of the machine are counted but not printed or numbered, and the mechanism acts as a counting device.

If the counting and numbering key 1516 is released, said key and the lower arm 1515 will be moved to their rearmost position by the spring 1517 until arrested by the stop pin in the counting and numbering key 1516, and the upper arm 1513 and link 1514 will be moved forwardly, whereby the pin 1518 of the elbow lever 1507 and 1508 is free to move in the slot 1506 of the link 1514, and the printing of the numbers of the items counted is allowed to proceed; thus the mechanism is transformed into a numbering device whereby the items listed are numbered consecutively, their numbers printed simultaneously with the printing of the items and the total number of the items numbered and counted may be printed.

*Printing total of counting and numbering*

Means are provided whereby the total representing the number of items counted or counted and numbered may be automatically printed.

As has been described, the printing mechanism of the counting mechanism is normally inoperative except when a number key is depressed.

The means for rendering it operative when a shifting key is depressed are constructed as follows:—An elbow lever having upper and lower arms 1520 and 1521, respectively, is pivoted on the stud 1506; the upper arm projects forwardly and is provided with a finger 1522 which is adapted to engage the upper side of the arm 1508 of the lower elbow lever. A horizontal coupling link 1523 has a rearwardly facing shoulder 1524 on its rear part, which shoulder is adapted to engage with a finger 1525 on the lower arm 1521, as shown in Figs. 89 and 90, and a forwardly facing shoulder 1526 adapted to engage with a shoulder or pin 1527 on an arm 1528 projecting upwardly from the frame 398, as shown in Fig. 89. It has previously been explained how the depression of the ruling key 363 (Fig. 29) is adapted to rock the frame 398 and its connected arm 513. Similar connections are provided from various other keys of the group in the left hand column, Fig. 10, such as the several total keys, which are adapted to control the adding devices for the purpose of taking totals, as more fully explained in the parent patent hereinbefore mentioned. For the present it is sufficient to note that certain of the shifting keys are adapted to rock the frame in a manner similar to that in which the ruling key rocks it. Upon an operation in which a shifting key has been depressed the forward pull of the bar 1512, connected with the arm in the lower part of the frame 398, withdraws the coupling hook 1486 from the pin 1487 of the arm 1488 so that the operation of the machine is not counted by the counting mechanism but, at the same time, the upper arm 1528 of the frame 398 pushes the bar 1523 rearwardly, whereby the lever 1520 and 1521 is turned in the direction for causing the same to shift the elbow lever 1507 and 1508 so that the same lowers the printing coupling hook 169 into the path of the printing yoke and thereby causes the total on the counting device to be printed. To permit of thus turning the elbow lever 1507 and 1508 while the numbering and counting key 1516 is locked in its forward position, the upper arm 1513 of the intermediate lever and the rear end of the link 1514 are yieldingly connected by a pin and slot and the link 1514 is yieldingly held in its rearmost position by a spring 1329 connecting it with the upper lever arm 1513, as shown in Fig. 89. The front end of the link 1514 is also connected by a pin and slot with the upper arm 1507 of the printing hook shifting lever 1508 so as to permit the lever to move freely when the link 1514 is moved forwardly while the counting and numbering key 1516 is in its rearward position.

By the foregoing mechanism it is possible to successively number the items which are being listed and then print the total number of the items.

*Rule key prevents number printing*

For the purpose of preventing printing of the numbers of the counting and numbering device when the ruling key 363 is depressed, the front end of the coupling bar 1523 is provided with a forwardly projecting inclined finger or tail 1530 which is arranged over a shoulder or pin 1531 on the upper arm of the ruling intermediate lever 506, as shown in Fig. 89. Upon depressing the ruling key 363 the pin 1531 on the upper arm of the intermediate lever 506, by engaging with the tail 1530 raises the front end of the coupling bar 1523 so that its front shoulder 1526 is out of the path of the pin 1527 of the frame 398, thereby preventing the printing coupling hook 169 from being lowered into operative position at the same time that the coupling link 1486 is withdrawn from the pin 1487 of the cam arm 1488, whereby counting and numbering are prevented during a ruling operation of the machine. The coupling bar 1523 is yieldingly held in its forward and depressed position by a spring 1532, as shown in Fig. 89.

*Means for rendering operative or inoperative the counting and numbering device*

Means are provided for rendering the counting and numbering device operative or inoperative and for also preventing the automatic printing of the total of the counting and numbering device. The means for this purpose, shown in Figs. 89 and 91, comprise a key 1555 having its shank passing through an opening in the rear frame and provided with a slot 1558 at its front end through which passes the pin 1535 on the lever 1533, which supports the front end of the key stem and also extends across the rear of link 1486. A sliding link 1553 is provided with a slot 1554 at its front end and a slot 1557 at its rear end. The pin 1535 secured on the lever 1533 also passes through the slot 1554 of the sliding link 1553 and serves to support both the link and the stem of the key 1555 and preserve their relation to each other. The key stem 1555 is provided near its rear end with a pin 1556 which passes through the slot 1557 in the rear end of the slide 1553 and serves to slidably secure said link 1553 to the stem of the key 1555. A finger 1559 arranged on the slide 1553 engages with the rear side of the lower arm 1538 of the elbow lever 1537, 1538. This elbow lever is formed in two sections both pivoted upon the rod 1539 and is normally rocked as a unitary lever through connections including a finger 1540 formed on a downward extension from the arm 1537, which finger is normally held against the back edge of the arm 1538 by a spring 1541. For the present purpose the key 1555 and slides 1553 may be considered as one piece, they are made separate in order to provide for carriage control of counting and numbering, as hereinafter described. Upon pushing the key 1555 and slide 1553 forwardly the finger 1559 of the slide turns the lever 1538 so as to uncouple the bar 1523 from the lever 1521-1522, and thus prevent the frame 398, when operated, from causing the counting and numbering device to print under the control of any of the shifting keys. At the same time, the pin 1535 is moved forward, causing the counter coupling hook 1486 to be moved off the pin 1487 of the cam rock arm 1488, so as to prevent the counting device from operating; and the upper finger 1542 on the lower rock arm 1538 turns the lower arm 1515 of the intermediate lever and pulls rearwardly on the link 1514, whereby the elbow lever 1507-1508 is turned and raises the printing hook 169 into its inoperative position for preventing printing. The key 1555 may be retained in this position by engaging its shoulder 1560 against the rear frame. A spring 1561 serves to hold the key stem and its slide in its rearmost or operative position and a pin 1562 on the key stem limits its rearward movement. The key and slide are held in this position, when desired, by means of a nose or shoulder on the shank of said key engaging with the front side of the rear frame member.

*Carriage control of the counting and numbering mechanism*

Means are provided for controlling the operation of the counting and numbering device automatically by the movement of the paper carriage; the means for this purpose shown in the drawings consisting of a shifting lever 1563, Fig. 89, pivoted on the rear frame member and engaging its lower end with the rear side of the finger 1559 on the slide 1553. Said lever 1563 is connected by a link 1564 with one end of a rock lever 1564 (Fig. 79) whose other end is connected by a link 1564 with the lower arm of the tappet lever 1232 heretofore described, and a tappet 1255 arranged on the carriage and adapted to engage with the upper arm of the tappet lever 1232. As the tappet 1255 engages the tappet lever 1232, during the forward movement of the carriage, the shifting lever 1563 moves the slide 1553 forward, thereby rendering the counting and numbering device inoperative automatically. At this time the key 1555 is not shifted, owing to the slot and pin connection between these parts, thereby preventing the slide 1553 from being locked in its forward position by engagement of the nose 1560 of the key 1555 with the front side of the rear frame member.

*Lock for counting and numbering mechanism*

For the purpose of locking the key either in one position or the other and thereby locking the counting or counting and numbering mechanism in its operative or inoperative condition, a lock is provided which may be of any suitable construction. The lock shown in Figs. 89 and 91 of the drawings has its case 1565 secured to the front side of the rear frame member, and is provided with a horizontally movable bolt which may be moved over the shank of the key 1555 or moved to one side thereof when the bolt is retracted into its unlocked position. The key 1555 may be moved either forward or backward through its guide opening in the rear frame member by lifting this key sufficiently to permit the shoulder or nose 1560 on its underside to pass over the lower edge of its guide opening, but when the bolt of the lock is projected over the shank of the key 1555 the key cannot be lifted to enable its nose 1560 to clear the lower end of the guide opening, whereby the counting and numbering device may be locked either in its operative or inoperative condition. A detachable key 1566 may be provided whereby the counting device may be locked as desired and the key then removed.

*Supplementary typewriting mechanism*

At times it is desirable to write words or sentences in connection with the numbers which are being added and printed, as, for instance, when making out bills. To permit of doing this a typewriter is combined with the adding and printing mechanism and is constructed as follows, particular reference being made to Figs. 96, 99 and 100.

A plurality of type bars 1601a are arranged above and in rear of the platen 148 and pivoted at their rear ends to swing vertically for moving the letter type 1602 at their front end toward and from the upper side of the platen. A plurality of rear elbow levers, arranged in rear of the type segments and platen, are pivoted on the rod 1603, secured in the lower rear part of a supplemental frame 1604. Said rear elbow levers swing in vertical planes and each has an upwardly projecting rear arm 1605 which is connected by a link 1606 with a tail 1607 on its respective type bar, and a forwardly projecting front arm 1608. A plurality of front levers 1609 are arranged below the type segments and accumulators, pivoted on a rod 1610 to swing vertically. The rear arm 1611 of each front lever engages with the lower front arm 1608 of its respective rear elbow lever, while the extremity of its front arm is turned upwardly, and carries a vertically movable letter type key 1612, said letter type key being arranged in front of and below the number setting keys 210.

Normally the type bars 601a are raised into their inoperative position by springs 1613 and the levers 1609 are thereby turned so as to raise the letter keys 1612. Upon depressing any one of said letter keys its corresponding letter type bar 1601a is depressed and delivers a blow of its type 1602 against the platen leaving an impression on the paper or record sheet supported thereon.

When the platen is swung and turned into its rearmost position its printing line is in position for receiving the impressions from the letter type 1602, but when numbers are to be printed on the sheet the platen moves forward with a combined turning and swinging movement for presenting its printing line to the number type segments 144. It will thus be noted that the same platen cooperates with the number printing type segments and also with the letter printing type bars by moving its printing line to conform with one or the other of these printing devices.

*Typewriter keys locked when listing mechanism is operated*

Means are provided for preventing the typewriter keys from being depressed while the listing mechanism is being operated, thereby preventing printing of letters or words out of place on the platen which, at this time, has been moved to bring the printing line opposite the number type segments. The means for this purpose, shown in Figs. 96 and 100, are constructed as follows:

1614 represents a universal rod or bar, arranged transversely over the rear arms 1611 of the front rock levers and supported at opposite ends by rock arms 1615 and 1616; a catch 1617 is pivoted on the base of the supplemental frame 1604 and adapted to swing into and out of engagement with the universal rod 1614 and urged by a spring 1618 into effective position, in which it holds with said rod 1614 depressed and the letter keys 1612 elevated. Pivoted on the rod 805 is a releasing elbow lever having an upper arm 1620 (Figs. 77 and 96) provided with a finger 1619 which overlies the cam arm 957. The lower arm 1621 of said elbow lever is provided with a finger 1622 adapted to engage with the front side of the detent catch or dog 1617. When the cam 959 presents its low face to the cam lever 957 the elbow lever is turned by a spring 1623 so that its lower arm moves rearwardly and disengages the catch 1617 from the universal rod 1614, as shown in Fig. 96, thereby permitting of depressing the typewriter keys 1612 and printing words by means of the type bars 1601a on the sheet carried by the platen. When, however, the cam 959 begins to turn for effecting printing by the type segments 144, according to the numbers set up on the number keys 210, the releasing elbow lever 1620-1621 swings forward and allows the catch to engage the universal rod 1614 and thereby prevent the depression of the typewriter keys 1612.

*Typewriter key locks listing mechanism*

Means are provided for preventing a printing operation of the adding machine from being performed while a typewriter key is depressed, thereby preventing improper printing on the platen.

The means for this purpose are constructed as follows and shown in Figs. 96 and 102:

A rock lever comprising two arms 1624 and 1625 is secured to a shaft which is pivoted in bearings on the base of the adding machine. This rock lever engages its front arm 1625 with the rear end of the releasing hook 694, and its rear arm 1624 with a nose 1626 on one of the arms 1615 which support the universal rod 1614. Whenever a typewriter key 1612 is depressed the universal rod 1614 is raised and the intermediate lever 1624-1625 is turned in a direction which causes the hook 694 to be lowered out of engagement with the detent pawl or dog 690ª, as shown in Fig. 96, thereby preventing release of the motor and a number printing operation during the displacement of any of the letter type keys.

*Combined letter and column spacing escapement mechanism*

An escapement mechanism is provided whereby the carriage is permitted to move forward by successive steps equal to a letter space of the typewriting mechanism. This letter escapement mechanism is combined with the column escapement mechanism of the number printing mechanism so that when the typewriting mechanism is being used and the letter escapement is operative the column pawls or number escapement mechanism are rendered inoperative, but when the number escapement is operative while printing numbers then the letter escapement is inoperative.

For this purpose the letter escapement is constructed and combined with the number escapement as follows:—

1627 (Fig. 101) represents a row of letter escapement teeth arranged lengthwise on the under side of the carriage and forming an escapement rack. 1628 and 1629 represent front and rear letter escapement pawls or pallets arranged lengthwise in a recess 1630 in the rail or track 930 and pivoted thereto, one in advance of the other, so as to swing in a vertical plane, so that they may be engaged successively with each tooth of the letter escapement rack. Normally the front pawl 1628 is held with its bill in engagement with a tooth of the letter escapement rack by a spring 1631 connecting a lug 1632 on the same with the rail 930, and while the front pawl is in this position the rear pawl 1629 is held with its bill out of engagement with the teeth of the letter escapement rack by a finger 1633 arranged on the rear pawl 1629 in rear of its pivot and held in engagement with the top of the front pawl in front of the pivot of the latter by a spring 1634 which connects the rear letter escapement pawl with the rail 930. 1635 and 1636, Fig. 98, represent the upper and lower arms of an elbow rock lever which is pivoted loosely on the rock shaft 998 adjacent to the left supporting arm 1090 of the number escapement bar 1087. The upper arm 1635 is adapted to engage with the rearwardly projecting tails 1637 and 1638 of the front and rear letter escapement pawls 1628 and 1629, as shown in Figs. 101 and 98. 1639 represents a horizontal shifting bar or rod which has its rear end connected by a pin 1640 and slot 1641 with the arm 1636 so as to form a slack connection therewith, and which is provided with a finger 1642 adapted to engage with the rear side of the arm 1274, as shown in Fig. 98. 1643 represents a vertical dog pivoted at its upper end to the arm 1635 and provided at its lower end with a shoulder 1644 which is adapted to engage with a pin or shoulder 1645 on the adjacent part of the frame. The dog 1643 is constantly pressed against the pin 1645 by a spring 1646 connecting the same with an ear 1647 on the lever 1635-1636. 1648 and 1649 represent upper and lower arms of an elbow lever which is pivoted on the shaft 805 in the lower rear part of the machine and which has its upper arm 1648 connected with the front end of the shifting bar 1639, as shown in Figs. 96, 98 and 77. The lower arm 1649 of this lever projects forwardly from its pivot 805 and is connected with a forward extension of the arm 1624 of the elbow lever 1624-1625 by a link 1650.

Whenever a typewriter key 1612 is depressed, for the purpose of writing, the universal bar 1614 is raised, the shifting rod 1639 is pulled forwardly, and the arm 1635 is raised and engages the tail 1637 of the front pawl 1628, withdrawing said pawl from the rack 1627. This movement of the front pawl 1628 allows the rear pawl 1629 to be raised by its spring 1634 into engagement with the rack 1627. During this movement the lever 1635 does not move high enough to prevent the free movement of the tail 1638 of the rising rear pawl 1629. Simultaneously with the release of the front pawl 1628 the bar 1087 is raised by the finger 1642 of the bar 1639 engaging the arm 1274, and the column tappets 1079 and 1080 are operated so as to release them in case they should be in engagement with one of their stops 1078.

When the rock arm 1635-1636 is turned by the forward pull of the shifting bar 1639 the latch 1643 is not raised sufficiently high to engage the pin 1645.

During the subsequent return or backward movement of the shifting bar 1639 and the downward movement of the arm 1635 and number escapement bar 1087, the rear typewriter escapement pawl 1629 is again disengaged from the writing escapement rack 1627 and the front escapement pawl 1628 is engaged with said rack, thereby permitting the carriage to advance one tooth of said rack, and the pawls 1079 and 1080 of the column escapement mechanism are allowed to return to their normal position.

This operation is repeated each time a typewriting key is depressed, thereby advancing the carriage along the printing line by steps, each of which is equal to a letter space.

When the number printing mechanism is operated, for advancing the carriage column by column, during successive steps, the escapement bar 1087 is raised higher so as to engage the column escapement pawls 1079 and 1080 alternately with the column escapement teeth 1078, and the finger 1651 of the arm 1274 turns the rock lever 1635-1636 a greater extent than when the same is shifted by a typewriting key 1612, whereby both tails 1637 and 1638 are engaged and both front and rear writing escapement pawls 1628 and 1629 are turned sufficiently to disengage the same simultaneously from the teeth of the writing escapement rack 1627. At the same time, the latch 1643 is lifted sufficiently to engage its shoulder 1644 with the pin 1645 and hold the lever 1635 in its elevated position; whereby the writing escapement mechanism is rendered inoperative, the carriage is wholly under control of the number printing mechanism, and the typewriter escapement mechanism is prevented from interfering with the carriage taking the long column steps which are necessary to the column spacing of listed numbers. The parts remain in this condition until a writing key is depressed, and when this occurs the first part of the forward movement of the bar 1639 causes a finger 1652 thereon to disengage the latch 1643 from the pin 1645, whereby the lever arm 1635 is permitted to drop a short distance, and permit the rear writing escapement pawl 1629 to reengage with the teeth 1627, but immediately thereafter the pin 1640 will have reached the end of the slot 1641 in the link 1639 and the arm 1635 is held from further downward movement until the said key is released and the arm 1635 is thereby allowed to drop and the front pawl 1628 allowed to engage the rack 1627. If the typewriter key is depressed with the proper rapid blow the type will make the impression on the paper before the platen has started to move, so that no blurring effect will occur and the carriage will have moved one space for the next letter immediately as the type leaves the platen.

Typewriter escapement release key

When it is desired to render the letter space escapement inoperative and permit the carriage to advance to the next column stop of the adding mechanism, as, for instance, when it is desired to print in a column which would ordinarily be occupied by numbers, suitable means such as the following are provided:—

1653 and 1654 represent the front and rear arms of a letter space releasing key lever which are arranged near the right and left, respectively, of the typewriter keyboard and connected by a transverse bar 1659, as shown in Figs. 99 and 100. 1655 and 1656 represent an elbow lever pivoted on the rod 1280 and having its lower arm 1655 connected by an upright link 1657 with the rear arm 1654 of the letter space releasing key, while its upper arm 1656 is loosely connected by a horizontal link 1658 with the lower arm 1636 of the escapement lever 1635–1636. The rear arm 1654 of the letter space releasing key lever does not extend over the universal bar 1614, so that upon depressing the front arm 1653 of this lever it will not affect the column stop escapement pawls or pallets 1079 and 1080, but only causes the elbow lever 1635–1636 to turn and disengage both the pawls 1628 and 1629 of the letter space escapement from the teeth of the letter space rack 1627. The instant this occurs the carriage is removed from the control of the letter space escapement and moves forward until the operative pawl 1079 of the column escapement engages with the next following column stop 1078. A number may now be printed equal in length to the available space between the respective column stop and the words printed by the typewriting mechanism in advance of the same.

The link 1657 is not connected directly with the rear lever 1654 of the letter space releasing key, but is connected at its lower end to the rear end of a link 1660, whose front end is pivoted to a lug 1661 in the base of the machine, and this link 1660 is constructed to make contact with the end of the lever 1654, as shown in Fig. 102. The purpose of this construction is to readily separate or unite the typewriter and the adding machine.

Means for preventing typewriting over number printing

It is desirable, whenever typewriting in a line has been suspended and a number has been printed by the printing mechanism of the adding machine, to prevent writing from being resumed until the paper carriage has been moved sufficiently to carry the printed number away from the letter type printing position. Otherwise the subsequent operation of the typewriting mechanism would cause letters to be printed over the numbers previously printed.

The means for this purpose may be constructed in various ways. For instance, the coupling bar 1275, see Fig. 66, may be lowered so that it engages with the pin 1278 on the rock arm 956 during the forward or return stroke of the latter, whereby the escapement bar 1087 will be caused to automatically shift the number or column escapement dogs or pawls 1079 and 1080, and the carriage will advance one column every time a number has been printed, thereby presenting a new surface of the record sheet to the letter type printing position and preventing the printing of letters over the numbers just printed.

In so far as the operation of the mechanism just described is concerned, the coupling bar 1275 may be permanently connected with the rock arm 956, but by detachably connecting the coupling bar and the arm as shown, the additional functions, heretofore described, and those to be hereinafter described are possible. This mechanism is made operative by lowering the lever 1261 which makes the carriage automatically feed one column after the printing of each number by the adding machine, as hereinbefore described.

Column key releases typewriter keys

It is at times desirable to disengage the coupling bar 1275 from the pin 1278 so that the carriage will not be automatically advanced one column for each number printing operation but instead cause the carriage to be advanced by the depression of the column key 1096. In this case it is desirable to cause the typewriter keys to be locked and remain so until the column key is depressed or the platen is otherwise moved so that the part thereof bearing the printed numbers is not at the printing position of the letter type bars.

The mechanism for accomplishing the last mentioned purpose is described as follows:

1662 represents an upright detent bar which is pivoted at its lower end on the upper arm of the elbow lever 1620, 1621, as shown in Figs. 77 and 96. This bar is pressed yieldingly rearwardly against a stationary transverse rod 1663 by a spring 1664. 1665 represents a spring pressed dog arranged on the detent bar and forming a downwardly facing shoulder on said bar. 1666 represents a tail or finger projecting forwardly from the front end of the coupling bar 1275 and arranged in rear of the detent bar 1662. Whenever the adding mechanism is operated and the cam arm 957 is raised by the salient part of the cam, the elbow lever 1620–1621 is turned and the detent bar 1662 is raised until the shoulder of the dog 1665 engages over the rod 1663, whereby the elbow lever 1620–1621 is held up and prevented from following the downward movement of the cam arm 957 as the latter follows the receding or low part of the cam 959. The dog 1617 is thus permitted to move forwardly over the universal bar 1614 and hold the typewriter keys against depression.

By means of the loose connection between the cam arm 957 and the elbow lever 1620–1621 the detent bar 1662 can be locked in its elevated position while the cam arm 957 descends and effects the return or forward movement of the paper feeding and platen shifting bar 952. Upon now depressing the column key 1096 and causing the carriage to advance a column the coupling bar 1275, during its forward movement at this time, engages its finger 1666 with the detent bar 1662 and moves the latter forwardly sufficiently to disengage its dog 1665 from the rod 1663, whereby the elbow lever 1620-1621 is permitted to move into engagement with the cam arm 957 and disengage the dog 1617 from the universal bar 1614, thereby releasing the typewriter keys 1612 and permitting the depression thereof. In a like manner the coupling bar 1275 also disengages the detent bar 1662 from the rod 1663 and restores the use of the typewriting keys 1612, whenever the paper return key 1024 is depressed and the platen is automatically turned backwardly for shifting the printing position on the sheet from bottom to top thereof.

It is apparent from the above that the detent bar 1662 will be thus locked in its elevated position during the first part of a number printing operation, and then disengaged by the coupling bar 1275 during the last part of such operation, whenever the machine is set for automatically advancing the carriage from one column to another, whereby typewriting is prevented while the machine is used in this manner.

Platen feed unlocks typewriter keys

Means are provided whereby the typewriting mechanism, when locked by a number printing operation, is automatically unlocked when the paper line feeding mechanism is operated to feed the platen by a number printing operation to move the paper for printing on the next line. For this purpose the controlling arm 1286, Figs. 68 and 96, of the paper feeding mechanism is provided with a laterally projecting finger or shoulder 1667 which engages with the rear side of the upright rock arm 1668, which is loosely connected by a link 1669 with the detent bar 1662, as best shown in Fig. 96. When the arm 1286 is raised and the bar 952 is lowered so that it does not engage the feed arm 965 and the paper feed mechanism is inoperative the finger 1667 is in its rearmost position, whereby the rock arm 1668 is also permitted to remain in its rearmost position without affecting the detent bar 1662. But when the arm 1286 is depressed and the lever 953-1160 is permitted to turn into a position in which the bar 952 engages the paper feed arm 965 and the paper feed mechanism is operative, then the finger 1667 moves forwardly and pushes the rock arm 1668 and link 1669 forwardly, whereby the detent bar 1662 is disengaged from the rod 1663 and the keys 1612 of the typewriting mechanism are unlocked or released whenever the paper feeding mechanism operates. When the paper is thus shifted a line by the paper feed mechanism and the typewriting mechanism is released it is possible to write immediately below the number previously printed by the adding mechanism if desired.

Key for releasing typewriter keys

If it is desired to release the typewriter keys for such purposes as continuing the typewriting in close proximity to a number consisting of a less number of digits than would fill the space corresponding to the width of a column, or to write over the numbers previously printed as, for instance, when the number is to be erased and the carriage has not been moved, then the typewriting mechanism may be deliberately made operative while the number printed is in the printing position of the letter type bars. For this purpose there is provided a releasing key lever 1670 adjacent to the letter key levers, a key button arranged on the front arm of the restoring key lever 1670, an intermediate rock arm 1671 engaging with the rear arm of the restoring key lever, an upright link 1672 connected at its lower end with the rock arm 1671, and a rearwardly projecting rock arm 1673 connected with the upper arm 1668 and also connected loosely with the upper end of the link 1672, as shown in Figs. 96, 100 and 102. Let it be assumed that a number has been printed by the operation of the adding mechanism, that the automatic cross column feed is not operative so that the column key 1096 is used for moving the carriage when this movement is desired, that the carriage has not been moved after the number was printed by the number printing mechanism, that the typewriter keys have been locked by reason of the detent bar 1622 engaging with its dog 1665 over the rod 1663 while in its elevated position leaving the dog 1617 hooked over the universal bar 1614, and that it is desired to print over the numbers for cancelling the same. This can be accomplished by first depressing the releasing or restoring key 1670, which movement is transmitted successively by the lever arm 1670-1671, link 1672, arms 1673 and 1668, and link 1669, to the detent 1662. The movement of detent 1662 disengages the dog 1665 thereon from the rod 1663, whereby the arm 1621 is permitted to be drawn rearwardly by its spring and the weight of the detent 1662, and the dog 1617 is forced rearwardly out of engagement with the universal rod 1614, thereby permitting the typewriting mechanism to be operated notwithstanding the printing position of its type bars is over the number printed on the record sheet.

Idle operation releases typewriter keys

The means which prevents the typwriting mechanism from being operated when the number printing mechanism is operated with a working stroke is arranged to permit the typewriting mechanism to operate after the number printing mechanism has been operated with an idle stroke. For this purpose a rock lever 1674 (Figs. 96 and 97), pivoted loosely on the shaft 263, is provided with a finger 1675 on its upper arm extending over the adjacent arm 262 of the shift key rocking member, while its lower arm is adapted to be engaged on the rear side by a finger 1676 on the lower arm of the rock lever 556 of the universal bar 555 and on its front side by a cam or incline 1677 on the upper end of the detent bar 1662, as shown in Figs. 96 and 97. When no number or shift key of the keyboard has been depressed the intermediate rock lever 1674 is arranged with its lower arm in the path of the incline 1677 on the detent bar 1662, as shown in full line in Fig. 96, and if the number printing mechanism is now operated with an idle stroke the detent bar, upon being lifted by the cam 959, will be moved forwardly by its incline 1677 engaging with the lower arm of the intermediate rock lever 1674, thereby preventing the detent dog 1665 from engaging the rod 1663 and permitting the detent bar to again descend during the last part of the idle operation of the number printing mechanism, whereby locking of the typewriting mechanism is prevented and the same is retained in its operative condition, no printing having been done during this idle operation, and if the carriage has not been fed laterally typewriting can be done in the same line and space if desired.

When a number key has been depressed the raising of the universal bar 555, which occurs at such a time, causes the lower finger 1676 of the universal bar lever 556 to turn the intermediate lever 1674 so that the lower arm thereof is arranged in front of the path of the incline 1677, as shown by dotted lines in Fig. 96. The intermediate lever is turned into the same position by the arm 262 of the shift key rocking member engaging its upper finger 1675 when a shift key is depressed. It follows that when the intermediate lever 1674 is thus shifted by the number key or a shift key the lower arm of the lever will not be engaged by the incline 1677 of the detent bar, so that the latter when raised, during the operation of the adding mechanism, will engage its dog or hook 1665 over the rod and thus prevent the typewriting mechanism from being operated.

Capital and lower case letters

For the purpose of permitting each type bar to print more than one set of characters, each of these bars is provided at its free end with a plurality of type which are arranged in different positions relatively to the circumference of the platen and the latter is capable of being shifted relatively to the several type on each type bar. As shown in the drawings, each type bar is provided with an upper case type 1678 and a lower case type 1679. In its rearmost position the platen is arranged with its printing line opposite the rearward or lower case type 1679 of the several type bars, and while in this position words in lower case type may be printed on the same line on which numbers are printed by the number printing segments when the platen is moved forwardly and downwardly into its number printing position.

When it is desired to print words in upper case type or capital letters the platen is turned forwardly about its axis sufficiently to bring the printing line of the platen opposite the front type of the type bars, as indicated by dotted lines in Fig. 96. The platen is moved forward, for this purpose, by means of a capital or shift key lever 1680 arranged at the left of the typewriter keyboard and journaled on the rod 1610, a rock arm 1681 resting on the rear arm of the key lever 1680, an upright link 1682 connected at its lower end with the arm 1681, and a rock arm 1683 projecting forwardly from the rock shaft 805 and connected at its front end by a pin and slot connection 1684 with the upper end of the link 1682, as shown in Figs. 96, 77 and 102. The mechanism just described is so constructed that upon depressing the key on the front arm of the key lever 1680 this movement is transmitted successively to the rock arm 1681, link 1682, arm 1683, shaft 805, arms 955 and 956, platen shifting bar 952, and carriage shifting lever 951; and turns the platen forwardly until its printing line is opposite the front, upper case or capital type of the type bars.

Upon releasing the key 1680 the platen again turns backwardly into its rearmost position by the means heretofore described in connection with the platen shifting mechanism. Owing to the loose connection between the arm 1683 and the link 1682 the rock shaft 805 and connected parts are permitted to move independent of the arm 1681 and link 1682.

Indicator guide plate

As already stated, the printing point of the letter printing type on the platen is at the left of the printing position of the number printing type. Inasmuch as the number printed at times does not occupy the entire space reserved for the number type this space may be utilized for printing letters thereon. In order to determine how much space is available for letters at the left of the number an indicating guide plate is provided, consisting of a plate or bar 1685 arranged lengthwise in front of the platen and bearing a scale or graduations corresponding to the positions of the letter printing point and the row of number printing points, as shown in Figs. 1, 4, 5, 74 and 96. The scale bar is provided at opposite ends with depending supporting arms 1686 and 1687 which are pivoted at their lower ends on the rear frame section and which are engaged by springs 1688 for holding the scale yieldingly in engagement with the front side of the platen.

When the platen is moved into its rearward position the indicator scale bar 1685 is arranged immediately below the printing line of the platen, whereby the operator can determine how much space remains at the left of the number printed which can be filled in, wholly or partly, with letters, words or characters by the letter printing mechanism.

Upon moving the platen forwardly and downwardly into printing relation to the number printing segments, the indicator bar 1685 is deflected and the printing line is carried below the same in position to be engaged by the number type segments.

Detachable typewriting mechanism

To permit of marketing the adding machine with or without the typewriter attachment the frame 1604 of the typewriter is made wholly separate from the frame of the adding machine, and said frames are detachably connected. The construction shown in Figs. 96 and 102 permits of detaching the typewriter from the adding machine or attaching the same thereto without disturbing the connections between the typewriter key levers and the carriage feeding, platen feeding and number keyboard, owing to the loose connection between these parts.

I claim:

1. In a printing mechanism, the combination with a pivoted carrier, of a type-supporting member pivotally connected to said carrier, a plurality of types supported by said member, a platen for backing a record sheet, stops for controlling movement of said carrier about its pivot so as to present any desired one of said types to printing relation with said record sheet; and means for swinging said member on said pivotal connection for effecting printing by the type which is in operative relation with said record-sheet; said means comprising a pivotally mounted cam arm normally held in a retracted position, and devices for bodily advancing said cam arm from said retracted position.

2. In a calculating machine, the combination of a differentially movable carrier, a type support movable with said carrier, and a movable member having a cam face which operates to move the type support in one direction and another cam face which operates to move the type support in the opposite direction.

3. In a calculating machine, the combination of a differentially movable carrier, a type bar having a head supporting a row of type, a rock lever having one of its arms connected with said type bar, and a movable cam engaging with the other arm of said lever and operating to move the type bar laterally relative to the carrier.

4. In a calculating machine, the combination of a differentially movable carrier, a type bar having a head supporting a row of type and movable with said carrier, a rocking member connected with said type bar, a cam arm having a cam, a trip latch engaging with said cam arm adapted to hold the same out of engagement with said rocking member, a releasing device connected with said trip latch, and a spring connected with said cam arm and operating to engage the same with said rocking member when released by the trip latch.

5. In a calculating machine, the combination of a plurality of differentially movable carriers, a plurality of type bars each having a head supporting a row of type and each movable with one of said carriers, a rocking member connected with each type bar, a cam arm having a cam associated with each rocking member, a trip latch engaging with each cam arm adapted to hold the same out of engagement with its rocking member, a releasing dog connected with each latch and common means adapted to engage said releasing dogs and withdraw said latches from said cam arms.

6. In a calculating machine, the combination of a plurality of diffrentially movable carriers, a plurality of type bars each having a head supporting a row of type and each movable with one of said carriers, a rocking member connected with each type bar, a cam arm having a cam associated with each rocking member, a trip latch engaging with each cam arm adapted to hold the same out of engagement with said rocking member, a releasing dog connected with each latch and adapted to engage the respective carrier, a vibrating actuator adapted to engage said releasing dogs and withdraw the latches from said cam arms, and an oscillating frame which supports said actuator and to which said cam arms are pivoted.

7. In a calculating machine, the combination of a plurality of differentially movable carriers, a plurality of type bars each having a head supporting a row of type and each movable with one of said carriers, a rocking member connected with each type bar, a cam arm having a cam associated with each rocking member, a trip latch engaging with each cam arm adapted to hold the same out of engagement with said rocking member, a releasing dog connected with each latch and adapted to engage the respective carrier, a vibrating actuator adapted to engage said releasing dogs and withdraw the latches from said cam arms, an oscillating frame which supports said actuator and to which said cam arms are pivoted, a main operating frame, and connections between said operating frame and oscillating frame.

8. In a calculating machine, the combination of a plurality of differentially movable carriers, a plurality of type bars each having a head supporting a row of type and each movable with one of said carriers, a rocking member connected with each type bar, a cam arm having a cam associated with each rocking member, a trip latch engaging with each cam arm adapted to hold the same out of engagement with said rocking member, a releasing dog connected with each latch and adapted to engage the respective carrier, a vibrating actuator adapted to engage said releasing dog and withdraw the latch from said cam arm, an oscillating frame which supports said actuator and is pivotally connected with said cam arms, and a return bar arranged on said oscillating frame and adapted to engage with said cam arms.

9. In a calculating machine, the combination of a type carrier provided with a row of seats and a row of shoulders adjacent to said seats, a plurality of type each arranged in one of said seats, and a pair of spring fingers secured to opposite sides of each type and adapted to engage with said shoulders.

10. In a calculating machine, the combination of a type carrier provided in its edge with a row of seats or notches, and adjacent to said seats with a row of shoulders or openings, a plurality of type adapted to bear against the edge of the carrier and each provided with a shank arranged in one of said seats, and spring fingers arranged on opposite sides of the carrier in pairs, each pair being secured to opposite sides of a type and provided with lugs which project toward each other into engagement with one of said openings.

11. In a calculating machine, the combination of a type carrier provided in its edge with a row of seats or notches, and adjacent to said seats with a row of shoulders or openings, a plurality of type adapted to bear against the edge of the carrier and each provided with a shank arranged in one of said seats, extensions projecting along the carrier on opposite sides of the type shank, and spring fingers arranged on opposite sides of the carrier in pairs, each pair extending from opposite sides of a type and provided with lugs which project toward each other for engaging one of said openings.

12. In a calculating machine, the combination of a type carrier provided in its edge with a row of seats or notches, and adjacent to said seats with a row of shoulders or openings, a plurality of type adapted to bear against the edge of the carrier and each provided with a shank arranged in one of said seats, extensions projecting along the carrier on opposite sides of the type shank, and spring fingers arranged on opposite sides of the carrier in pairs, each pair extending from opposite sides of a type, one of said fingers being provided with a lug projecting toward the opposite finger for the purpose of engaging said shoulder or opening.

13. In a calculating machine, the combination of a plurality of type carriers arranged side by side and adapted to print parallel rows of numbers, a plurality of parallel guide bars between which said carriers move, a frame having side pieces arranged on opposite sides of said type carriers, and transverse rods mounted on said side pieces and supporting the upper and lower ends of said guide bars.

14. In a calculating machine, the combination of a plurality of type carriers arranged side by side and adapted to print parallel rows of numbers, a plurality of parallel guide bars between which said carriers move, a frame having side pieces arranged on opposite sides of said type carriers, transverse rods mounted on said side pieces and supporting the upper and lower ends of said guide bars, and washers arranged on said rods between said guide bars.

15. In a calculating machine, the combination of a plurality of oscillating carriers each provided with a movable type head, a plurality of cams, a plurality of elements having positive connections with said type heads and actuated by said cams for actuating said type heads, trip latches for holding said cams in their normal inoperative position, means for disengaging said latches from said cams, and automatic means effective when any trip latch is disengaged from its cam for causing each trip latch on one side of the disengaged latch to be shifted out of engagement from its respective cam.

16. In a calculating machine, the combination of a plurality of oscillating carriers, printing type movably supported on each carrier, a plurality of rock levers each connected with one arm to the type on one carrier, a plurality of cam arms each having a cam adapted to engage with the other arm of one of said rock levers, a plurality of trip latches each adapted to engage with one of said cam arms and hold the same in an inoperative position, a plurality of dogs each connected with one of said trip latches and adapted to rest on the corresponding carrier, an actuator for said dogs, and a coupling finger projecting laterally from each trip latch and adapted to engage with a shoulder on the one adjacent trip latch.

17. In a calculating machine, the combination of a plurality of carriers arranged side by side and having a normal forward and backward movement, a series of number type from zero to nine arranged on each carrier, a ruling type arranged on each carrier in advance of the zero type, a series of movable stops adapted to arrest the backward movement of said carriers when arriving at zero position, a universal bar adapted to engage said stops and move the same into an inoperative position for permitting said carriers to move backwardly one step from zero position into ruling position, and a ruling key operatively related to said universal bar.

18. In a calculating machine, the combination of a plurality of carriers arranged side by side and having a normal forward and backward movement, a series of number type from zero to nine arranged on each carrier, a ruling type arranged on each carrier in advance of the zero type, a series of movable stops adapted to arrest the backward movement of said carriers when arriving at zero position, a universal bar adapted to engage said stops and move the same into an inoperative position for permitting said carriers to move backwardly one step from zero position into ruling position, shifting means for moving said carriers backwardly into ruling position, and a ruling key operatively related to said universal bar and shifting means.

19. In a calculating machine, the combination of a plurality of carriers arranged side by side and having a normal forward and backward movement, a series of number type from zero to nine arranged on each carrier, a ruling type arranged on each carrier in advance of the zero type, a series of movable stops adapted to arrest the backward movement of said carriers when arriving at zero position, a universal bar adapted to engage said stops and move the same into an inoperative position for permitting said carriers to move backwardly one step from zero position into ruling position, rock arms supporting said universal bar, spring presser fingers adapted to engage said carriers and move the same backwardly when free into ruling position, a rock shaft supporting said presser fingers, and a ruling key operatively related to the universal bar and presser fingers.

20. In a calculating machine, the combination of a plurality of carriers arranged side by side and having a normal forward and backward movement, a series of number type from zero to nine arranged on each carrier, a ruling type arranged on each carrier in advance of the zero type, a series of movable stops adapted to arrest the backward movement of said carriers when arriving at zero position, a universal bar adapted to engage said stops and move the same into an inoperative position for permitting said carriers to move backwardly one step from zero position into ruling position, rock arms supporting said universal bar, spring presser fingers adapted to engage said carriers and move the same backwardly when free into ruling position, a rock shaft supporting said presser fingers, an operating frame, coupling means for operatively connecting and disconnecting said universal bar and presser fingers with said operating frame, and a ruling key operatively related to said coupling means.

21. In a calculating machine, the combination of the type, the platen adapted to support the record sheet and movable toward and from the printing position, a rocking support for said platen; and means for rocking said support during every operation of the machine comprising a rock arm operatively connected with said support, a transverse bar engaging with said arm, an upright rock arm connected with said bar, a horizontal bar connected with the upright arm, a cam engaging with the horizontal arm and operating to move the platen into the printing position, and a spring operating to move the platen out of the printing position.

22. In a calculating machine, the combination of the type, a rotary platen, a driven gear wheel concentric with and connected to the platen, a driving gear wheel, and a support carrying said platen and movable for engaging and disengaging said driven gear wheel with the driving gear wheel.

23. In a calculating machine, the combination of the type, a platen, a driven gear wheel connected with the platen, a driving gear wheel which meshes with the driven gear wheel, a pair of rock arms which support said platen and whereby the driven gear wheel may be moved into and out of engagement with the driving gear wheel, and a second pair of rock arms which pivotally support the first mentioned arms on the axis of the driving gear wheel and whereby the platen is moved into and out of the printing position.

24. In a calculating machine, the combination of the type, the platen adapted to support the record sheet, a rocking support which carries said platen toward and from the printing position, a driven gear wheel connected with said platen, a driving gear wheel pivoted concentrically with said support and meshing with said driven gear wheel, means for turning said driving gear wheel and for rocking said support, and a detent device which prevents backward turning of said driving gear wheel.

25. In a calculating machine, the combination of the type, the platen adapted to support the record sheet, a rocking support which carries said platen toward and from the printing position, a driven gear wheel connected with said platen, a driving gear wheel pivoted concentrically with said support and meshing with said driven gear wheel, means for turning said driving gear wheel and for rocking said support, a return gear wheel meshing with the driving gear wheel, and a detent device which operates to prevent backward rotation of the driving and return gear wheels.

26. In a calculating machine, the combination of the type, the platen adapted to support the record sheet, a rocking support which carries said platen toward and from the printing position, a driven gear wheel connected with said platen, a driving gear wheel pivoted concentrically with said support and meshing with said driven gear wheel, means for turning said driving gear wheel and for rocking said support, a platen shifting arm connected with said rocking support, a paper feed lever having a pawl engaging with said driving gear wheel, an actuating device engaging with the shifting arm and feed lever, and a detent device operating to prevent backward rotation of the driving gear wheel.

27. In a calculating machine, the combination of the type, the platen adapted to support the record sheet, a rocking support which carries said platen toward and from the printing position, a driven gear wheel connected with said platen, a driving gear wheel pivoted concentrically with said support and meshing with said driven gear wheel, means for turning said driving gear wheel and for rocking said support, a platen shifting arm connected with said rocking support, a paper feed lever having a pawl engaging with said driving gear wheel, a vibrating actuating bar engaging with said shifting arm and said feed lever, and a detent device operating to prevent backward rotation of the driving gear wheel.

28. In a calculating machine, the combination of a rotary platen, a driven gear wheel concentric with and connected to the platen, a driving gear wheel meshing with the driven gear wheel, a rocking feed arm, a pawl arranged on the arm and adapted to engage said driving gear wheel, and an adjustable stop adapted to arrest the backward movement of the feed arm.

29. In a calculating machine, the combination of a platen, a driven gear wheel connected with the platen, a driving gear wheel meshing with the driven gear wheel, a rocking feed arm, a pawl arranged on the arm and adapted to engage said driving gear wheel, an adjustable stop lever having one arm adapted to be engaged by the feed arm, and a post having a row of shoulders which are adapted to be engaged by the other arm of said lever.

30. In a calculating machine, the combination of a platen, a driven gear wheel connected with the platen, a driving gear wheel meshing with the driven gear wheel, a reciprocating feed arm, a pawl arranged on the arm and adapted to engage said driving gear wheel, an adjustable stop adapted to arrest the backward movement of said feed arm, a paper return mechanism associated with said gear wheels, and means for disengaging said pawl from the driving gear wheel during the last part of the backward stroke of the feed arm.

31. In a calculating machine, the combination of a platen, a driven gear wheel connected with the platen, a driving gear wheel meshing with the driven gear wheel, a reciprocating feed arm, a pawl arranged on the arm and adapted to engage said driving gear wheel, an adjustable stop adapted to arrest the backward movement of said feed arm, a paper return mechanism associated with said gear wheels, and means for disengaging said pawl from the driving gear wheel during the last part of the backward stroke of the feed arm comprising a tail arranged on the pawl and adapted to engage said stop.

32. In a calculating machine, the combination of a printing mechanism, a paper platen, shifting means for moving said platen toward and from the printing position, universal operating means therefor and means for rendering said shifting means operative or inoperative comprising a rock lever carrying said platen, a tail connected with said rock lever and having a shoulder, and a dog adapted to engage the shoulder of said tail and hold the platen in the printing position.

33. In a calculating machine, the combination of an operating mechanism, a platen, means connected with said operating mechanism for turning the platen forwardly, a spring operatively connected with said platen and adapted to be wound up during the forward turning movement of the platen, a detent device operating normally to prevent unwinding of said spring, shifting means for rendering said detent device inoperative, and a shift key operatively connected with said shifting means to be raised thereby at a predetermined time, the detent device being rendered inoperative by the depression of said key.

34. In a calculating machine, the combination of an operating mechanism, a platen, means connected with said operating mechanism for turning the platen forwardly, a pinion operatively connected with said platen, a gear wheel meshing with the pinion, a return spring connected with said gear wheel and adapted to be wound up during the forward turning movement of the platen, a detent pawl engaging with said pinion, a releasing lever engaging with said pawl, a shift key, an elbow lever having one of its arms connected with said key, a coupling rod connected at one end with said releasing lever, and a hook on the opposite end of said coupling rod adapted to engage with the second arm of said elbow lever.

35. In a calculating machine, the combination of an operating mechanism, a platen, means connected with said operating mechanism for turning the platen forwardly, a pinion operatively connected with said platen, a gear wheel meshing with the pinion, a return spring connected with said gear wheel and adapted to be wound up during the forward turning movement of the platen, a detent pawl engaging with said pinion, a releasing lever engaging with said pawl, a shift key, an elbow lever having one of its arms connected with said key, a coupling rod connected at one end with said releasing lever, a hook on the opposite end of said coupling rod adapted to engage with the second arm of said elbow lever, and means for disengaging said hook from said arm of the elbow lever.

36. In a calculating machine, the combination of a platen, means for turning the platen forwardly, a pinion operatively connected with said platen, a gear wheel meshing with the pinion, a return spring connected with said gear wheel and adapted to be wound up during the forward turning movement of the platen, a detent pawl engaging with said pinion, a releasing device for disengaging said pawl from said pinion, a shift key, and means for coupling said key to said releasing device after a predetermined forward movement of said platen.

37. In a calculating machine, the combination of a platen, means for turning the platen forwardly, a pinion operatively connected with said platen, a gear wheel meshing with the pinion, a return spring connected with said gear wheel and adapted to be wound up during the forward turning movement of the platen, a detent pawl engaging with said pinion, a releasing device for disengaging said pawl from said pinion, a shift key adapted to be coupled with and uncoupled from said releasing device, a dog for holding said key in its depressed position, a tappet or cam on said gear wheel operating to shift said dog for releasing said key, and a spring which raises said key when the same is released.

38. In a calculating machine, the combination of a platen, means for turning the platen forwardly, a pinion operatively connected with said platen, a gear wheel meshing with the pinion, a return spring connected with said gear wheel and adapted to be wound up during the forward turning movement of the platen, a detent pawl engaging with said pinion, a releasing device for disengaging said pawl from said pinion, a shift key adapted to be coupled with and uncoupled from said releasing device, a dog for holding said key in its depressed position, a spring ring having an inwardly projecting arm which is secured centrally to said gear wheel and provided with a laterally projecting cam or tappet, and a shifting device which is operated upon by said tappet and which is connected with said dog.

39. In a calculating machine, the combination of a platen, means for turning the platen forwardly, a pinion operatively connected with the platen, a gear wheel meshing with the pinion, a shift key, means for holding the key in its depressed position, and means for permitting said key to rise comprising a tappet or cam mounted on said gear wheel for circumferential adjustment thereon.

40. In a calculating machine, the combination of a platen, means for turning the platen forwardly, a pinion operatively connected with the platen, a gear wheel meshing with the pinion, a shift key, means for holding the key in its depressed position, means for permitting said key to rise comprising a tappet or cam mounted on said gear wheel for circumferential adjustment thereon, and a rock arm having a nose adapted to be engaged by said tappet, said nose being held rigid with said rock arm when engaged by the tappet in its forward movement and yielding upon the rock arm when engaged by the same during its backward movement.

41. In a calculating machine, the combination of a platen, means for turning the platen forwardly, a pinion operatively connected with the platen, a gear wheel meshing with the pinion, a return spring connected with said gear wheel, and adapted to be wound up by the forward movement of the platen, a detent pawl engaging with said pinion, a shift key, a connection between said key and said pawl which permits of disengaging the pawl from the pinion, a tappet on the gear wheel, a dog for holding the key in its depressed position and a connection with said dog which is operated on by said tappet for shifting said dog so as to permit said key to rise.

42. In a calculating machine, the combination of a platen, means for turning the platen forwardly, a pinion operatively connected with the platen, a gear wheel meshing with the pinion, a return spring connected with said gear wheel and adapted to be wound up by the forward movement of the platen, a detent pawl engaging with said pinion, a shift key, a connection between said key and said pawl which permits of disengaging the pawl from the pinion, means for coupling or uncoupling said connection with said key constructed to be operated from said gear wheel, a tappet on the gear wheel, a dog for holding the key in its depressed position, and a connection with said dog which is operated on by said tappet for shifting said dog so as to permit said key to rise.

43. In a calculating machine, the combination of a platen, means for turning the platen forwardly, a pinion operatively connected with the platen, a gear wheel meshing with the pinion, a return spring connected with said gear wheel and adapted to be wound up by the forward movement of the platen, a detent pawl engaging with said pinion, a shift key, a connection between said key and said pawl which permits of disengaging the pawl from the pinion and which comprises a releasing arm operatively connected with said pawl, an elbow lever having one arm connected with the key, a shifting bar connected at one end with said releasing arm and provided at its opposite end with a hook adapted to engage with the other arm of the elbow lever, a releasing lever having one arm adapted to engage said shifting bar, a trip arm operatively connected with the other arm of the releasing lever, a trip pin arranged on the gear wheel and adapted to engage the trip arm, a dog adapted to engage the elbow lever and hold the key in its depressed position, a tappet arm connected with said dog, and a tappet arranged on said gear wheel and adapted to engage with said tappet arm.

44. In a calculating machine, the combination of a platen, means for turning the platen forwardly, a pinion operatively connected with the platen, a gear wheel meshing with the pinion, a return spring connected with said gear wheel and adapted to be wound up by the forward movement of the platen, a detent pawl engaging with said pinion, a shift key, a connection between said key and said pawl which permits of disengaging the pawl from the pinion and which comprises a releasing arm operatively connected with said pawl, an elbow lever having one arm connected with the key, a shifting bar connected at one end with said releasing arm and provided at its opposite end with a hook adapted to engage with the other arm of the elbow lever, a releasing lever having one arm adapted to engage said shifting bar, a trip arm operatively connected with the other arm of the releasing lever, a trip pin arranged on the gear wheel and adapted to engage the trip arm, a dog adapted to engage the elbow lever and hold the key in its depressed position, a tappet arm connected with said dog, a tappet arranged on said gear wheel and adapted to engage with said tappet arm, and a cushion device which checks the return movement of said trip arm and connecting parts.

45. In a calculating machine, the combination of a platen, means for turning the platen forwardly, a pinion operatively connected with the platen, a gear wheel meshing with the pinion, a return spring connected with said gear wheel and adapted to be wound up by the forward movement of the platen, a detent pawl engaging with said pinion, a shift key, a connection between said key and said pawl which permits of disengaging the pawl from the pinion, and which comprises a releasing arm operatively connected with said pawl, an elbow lever having one arm connected with the key, a shifting bar connected at one end with said releasing arm and provided at its opposite end with a hook adapted to engage with the other arm of the elbow lever, a releasing lever having one arm adapted to engage said shifting bar, a trip arm operatively connected with the other arm of the releasing lever, a trip pin arranged on the gear wheel and adapted to engage the trip arm, a dog adapted to engage the elbow lever and hold the key in its depressed position, a tappet arm connected with said dog, a tappet arranged on said gear wheel and adapted to engage with said tappet arm, and a cushion device which checks the return movement of said trip arm and connecting parts and which consists of an air cylinder and a piston arranged in said cylinder and operatively connected with the trip arm and releasing lever.

46. In a calculating machine, the combination of a platen, means for turning the platen forwardly, a pinion operatively connected with said platen, a gear wheel meshing with said pinion, a spring connected with said gear wheel and adapted to be wound up during the forward movement of the platen, a detent device operating on said pinion and a movable support for said gear wheel whereby the same may be moved into and out of engagement with said pinion.

47. In a calculating machine, the combination of a platen, means for turning the platen forwardly, a pinion operatively connected with said platen, a gear wheel meshing with said pinion, a spring connected with said gear wheel and adapted to be wound up during the forward movement of the platen, a detent device operating on said pinion, a rock arm supporting said gear wheel, and a dog for holding said arm in position for engaging the gear wheel with said pinion.

48. In a calculating machine, the combination of a platen, means for turning the platen forwardly, a pinion operatively connected with said platen, a gear wheel meshing with said pinion, a spring connected with said gear wheel and adapted to be wound up during the forward movement of the platen, a detent device operating on said pinion, a rock arm supporting said gear wheel, a dog for holding said arm in position for engaging the gear wheel with said pinion and means for releasing said dog operated from the gear wheel.

49. In a calculating machine, the combination of a platen, means for turning the platen forwardly, a pinion operatively connected with said platen, a gear wheel meshing with said pinion, a spring connected with said gear wheel and adapted to be wound up during the forward movement of the platen, a detent device operating on said pinion, a rock arm supporting said gear wheel, a dog for holding the rock arm in position for engaging the gear wheel with said pinion, a releasing arm connected with the dog, and a trip pin arranged on the gear wheel and adapted to engage with the releasing arm for disengaging the dog from said rock arm.

50. In a calculating machine, the combination of a platen, means for turning the platen forwardly, a pinion operatively connected with said platen, a gear wheel meshing with said pinion, a spring connected with said gear wheel and adapted to be wound up during the forward movement of the platen, a detent device operating on said pinion, a rock arm supporting said gear wheel, a dog for holding the rock arm in position for engaging the gear wheel with said pinion, a releasing arm connected with said dog by means permitting the arm and dog to approach each other but limiting their separation, and a trip pin arranged on the gear wheel and adapted to engage said releasing arm.

51. In a calculating machine, the combination of a platen, means for turning the platen forwardly, a pinion operatively connected with said platen, a gear wheel meshing with said pinion, a spring connected with said gear wheel and adapted to be wound up during the forward movement of the platen, a detent device operating on said pinion, a rock arm supporting said gear wheel, a dog for holding the rock arm in position for engaging the gear wheel with said pinion, a releasing arm connected with said dog by means permitting the arm and dog to move toward each other but limiting their separation, a trip pin arranged on the gear wheel and adapted to engage said releasing arm, a shoulder arranged on the releasing arm, a trip arm adapted to be moved by said trip pin against said shoulder, a shift key, a dog for holding the shift key in its depressed position, connections between said gear wheel and said last mentioned dog for disengaging the dog from the key, a connection between the key and said detent device whereby the latter is disengaged from said pinion upon the depression of the key, a releasing device engaging with said last mentioned connection for uncoupling the same from the key, and a connection between said releasing device and the trip arm.

52. In a calculating machine, the combination of a platen, means for turning the platen forwardly, a carriage upon which the platen is mounted, a shaft operatively connected with said platen and mounted on the carriage so as to move lengthwise therewith but free to turn thereon, a pinion turning with said shaft but held against axial movement therewith, a gear wheel meshing with the pinion, a spring connected with the gear wheel and adapted to be wound up during the forward movement of the platen, and a releasable detent device for preventing backward rotation of the platen and the parts connected therewith.

53. In a calculating machine, the combination of the operating mechanism, the paper feed mechanism, the paper return key, an elbow lever having one of its arms arranged to control said operating mechanism, a link connected with the return key and having a finger adapted to engage with the other arm of said elbow lever, and a shift key moving the link so that its finger may engage or not engage the last mentioned arm of said elbow lever.

54. In a calculating machine, the combination of the setting mechanism, the operating mechanism, the paper feed mechanism, the paper return key, an elbow lever having one of its arms adapted to control the operating mechanism and its other arm adapted to control the setting mechanism, a link connected with the return key and having a finger adapted to engage a finger on the last mentioned arm of said elbow lever, and a shift key for moving said link so as to permit its finger to engage or not engage the finger of said elbow lever.

55. In a calculating machine, the combination of the setting mechanism, the operating mechanism, the paper feed mechanism, the paper return key, an elbow lever having one of its arms adapted to control the operating mechanism and its other arm adapted to control the setting mechanism, a link connected with the return key and having a finger adapted to engage a finger on the last mentioned arm of said elbow lever, a shifting elbow lever having one of its arms loosely connected with said link, and a shift key connected with the other arm of said shifting elbow lever and provided with means for holding the same in its operative position.

57. In a calculating machine, the combination of a paper carriage, a plurality of type arranged side by side and adapted to print parallel longitudinal rows of numbers, and key operated mechanism for feeding said carriage forwardly comprising a stop member having a plurality of stops rigid therewith and capable of being adjusted into different positions on the carriage lengthwise of the latter, and an escape device co-operating with said stops.

57. In a calculating machine, the combination of a paper carriage, a plurality of type arranged side by side and adapted to print parallel longitudinal rows of numbers, and key operated mechanism for feeding said carriage forwardly comprising a longitudinal row of stops arranged on the carriage, a pair of escapement pawls having hooks arranged one in advance of the other, and means for engaging said pawls successively with each of said stops comprising a stud projecting laterally from one of said pawls, an oscillating lever adapted to engage said stud, and a connection between the last mentioned pawl and the other pawl whereby the latter is actuated.

58. In a calculating machine, the combination of a paper carriage, a plurality of type arranged side by side and adapted to print parallel longitudinal rows of numbers, and a key operated mechanism for feeding said carriage forwardly comprising a longitudinal row of stops arranged on the carriage, main and auxiliary escapement pawls pivoted one in advance of the other and having hooks arranged one in advance of the other and adapted to engage alternately with each of said stops, a tail arranged on one of said pawls and engaging with the other pawl, a spring operating normally to hold one of said pawls in an operative position and the other in an inoperative position, and an actuating device comprising a stud projecting from the normally inoperative pawl, a rocking bail adapted to engage said stud, and connections for oscillating said bail.

59. In a calculating machine, the combination of a paper carriage, a plurality of type arranged side by side and adapted to print parallel longitudinal rows of numbers, and a key operated mechanism for feeding said carriage forwardly comprising a longitudinal row of stops arranged on the carriage, main and auxiliary escapement pawls pivoted one in advance of the other and having hooks arranged one in advance of the other and adapted to engage alternately with each of said stops, a tail arranged on one of said pawls and engaging with the other pawl, a spring operating normally to hold one of said pawls in an operative position and the other in an inoperative position, a stop for limiting the movement of said normally inoperative pawl away from said row of stops and an actuating device engaging with the normally inoperative pawl comprising a stud projecting laterally from said normally inoperative pawl, a rocking bail adapted for engagement with said stud, a depressible key and a train of connections rigidly joining said key with said bail, a second key and connections normally joining said second key with said bail but disconnectable therefrom.

60. In a calculating machine, the combination of a paper carriage; a plurality of type arranged side by side and adapted to print parallel longitudinal rows of numbers; and a key operated mechanism for feeding said carriage forwardly, said key operated mechanism comprising a longitudinal row of stops arranged on the carriage, main and auxiliary escapement pawls adapted to arrest the carriage at different points, a connection between said pawl whereby the same are alternately moved into the path of said stops, and a shifting device operatively connected with said pawls and adapted to be released from said pawls during the last part of its shifting movement.

61. In a calculating machine, the combination of a paper carriage; a plurality of type arranged side by side and adapted to print parallel longitudinal rows of numbers; and a key operated mechanism for feeding said carriage forwardly, said key operated mechanism comprising a longitudinal row of stops arranged on the carriage, main and auxiliary escapement pawls adapted to arrest the carriage at different points, a connection between said pawls whereby the same are alternately moved into the path of said stops, a rock shaft, a shifting bar mounted on the shaft and engaging with one of said pawls, a shifting arm connected with said shaft, a rock arm, a latch pivoted on the rock arm and adapted to engage said shifting arm, a tail on the latch, and a stop adapted to be engaged by said tail.

62. In a calculating machine, the combination of a paper carriage; a plurality of type arranged side by side and adapted to print parallel longitudinal rows of numbers; and a key operated mechanism for feeding said carriage forwardly, said key operated mechanism comprising a longitudinal row of stops arranged on the carriage, main and auxiliary escapement pawls adapted to arrest the carriage at different points, a connection between said pawls whereby the same are alternately moved into the path of said stops, a rock shaft, a shifting bar mounted on the shaft and engaging with one of said pawls, a shifting arm connected with said shaft, a rock arm, a latch pivoted on the rock arm and adapted to engage said shifting arm, a tail on the latch, a stop adapted to be engaged by said tail, a pull bar connected at one end with said rock arm, and a key operatively connected with the opposite end of said bar.

63. In a calculating machine, the combination of a paper carriage; a plurality of type arranged side by side and adapted to print parallel longitudinal rows of numbers; and a key operated mechanism for feeding said carriage forwardly, said key operated mechanism comprising a longitudinal row of stops arranged on the carriage, main and auxiliary escapement pawls adapted to arrest the carriage at different points, a connection between said pawls whereby the same are alternately moved into the path of said stops, a rock shaft, a shifting bar mounted on the shaft and engaging with one of said pawls, a shifting arm connected with said shaft, a rock arm, a latch pivoted on the rock arm and adapted to engage said shifting arm, a tail on the latch, a stop adapted to be engaged by said tail, a pull bar connected at one end with said rock arm and provided at its other end with a hook, an elbow lever one arm of which is adapted to be engaged by said hook, and a key connected with the other arm of said elbow lever.

64. In a calculating machine, the combination of a spring propelled carriage, a paper supporting platen mounted on said carriage, a plurality of type arranged side by side and adapted to print parallel longitudinal rows of numbers, means for turning the platen forwardly, means for turning the platen backwardly, escapement means for moving the carriage forwardly, and a key controlled mechanism operating to simultaneously turn said platen backwardly and operate said escapement means to move said carriage forwardly.

65. In a calculating machine, the combination of a carriage, a paper supporting platen mounted on said carriage, a plurality of type arranged side by side and adapted to print parallel longitudinal rows of numbers, means for turning the platen forwardly, means for turning the platen backwardly comprising a pinion operatively connected with said platen, a detent pawl engaging with said pinion, means for moving the carriage forward comprising a spring drum operatively connected with said carriage, a longitudinal row of stops arranged on the carriage, escapement pawls engaging alternately with each of said stops, a rock shaft, a shifting bar mounted on said shaft and adapted to operate said pawls, a finger adapted to disengage said detent pawl from said pinion, and a key operatively connected with said shaft and said finger.

66. In a calculating machine, the combination of a carriage, a paper supporting platen mounted on said carriage, a plurality of type arranged side by side and adapted to print parallel longitudinal rows of numbers, means for turning the platen forwardly, means for turning the platen backwardly comprising a pinion operatively connected with said platen, a detent pawl engaging with said pinion, means for moving the carriage forward comprising a spring drum operatively connected with said carriage, a longitudinal row of stops arranged on the carriage, escapement pawls engaging alternately with each of said stops, a rock shaft, a shifting bar mounted on said shaft and adapted to operate said pawls, a trip arm connected with said shaft, a rock arm, a latch mounted on the rock arm and adapted to engage with the trip arm, a tail arranged on said latch and adapted to engage a stationary part, a finger arranged on the rock arm and adapted to disengage said detent pawl from the pinion, and a key operatively connected with said rock arm.

67. In a calculating machine, the combination of a paper carriage, a plurality of type arranged side by side and adapted to print parallel longitudinal rows of numbers, a key operated mechanism for feeding said carriage forwardly comprising a longitudinal row of stops, a carrier for each of said stops consisting of a carrying plate provided on its underside with a pin adapted to engage with one of a series of openings in the carriage and having a hook at one end which engages with one edge of the carriage and carries one of said stops, and means for holding said plate in place.

68. In a calculating machine, the combination of a paper carriage; a plurality of type arranged side by side and adapted to print parallel longitudinal rows of numbers; a key operated mechanism for feeding said carriage forwardly comprising a longitudinal row of stops; a carrier for each of said stops consisting of a carrying plate provided on its underside with a pin adapted to engage with one of a series of openings in the carriage and having a hook at one end which engages with one edge of the carriage and carries one of said stops; and means for holding said plate in place said means consisting of a locking plate movable transversely on the carriage and into engagement with the opposite edge of said carrying plate, and a spring catch mounted on the carriage and adapted to engage said locking plate.

69. In a calculating machine, the combination of a printing device, a paper carriage, a stop bar having a plurality of differently spaced sets of stops arranged in longitudinal rows on different sides of the bar, a plate detachably secured to the carriage and provided with bearings in which said bar is rotatable for bringing any one of its sets of stops in the operative position, and a dog or pawl adapted to engage with said stops.

70. In a calculating machine, the combination of a printing device, a paper carriage, a stop bar mounted on the frame and provided with a plurality of rows of notches or seats on different sides of the bar, each row forming a set and being spaced differently from the notches or seats in the other rows, two thumb pieces journaled on the frame of the machine but held against axial movement thereon, one of said thumb pieces having a flat sided socket which receives the adjacent flat sided end of the stop bar while the other thumb piece has an internal threaded socket which receives the adjacent threaded end of the stop bar, and a catch arranged on the carriage and adapted to engage with the notches or seats of said bar.

71. In a calculating machine, the combination of a printing device, a paper carriage, a stop bar mounted on the frame and provided with a plurality of rows of notches or seats on different sides of the bar, each row forming a set and being spaced differently from the notches or seats in the other rows, two thumb pieces journaled on the frame of the machine but held against axial movement theron, one of said thumb pieces having a flat sided socket which receives the adjacent flat sided end of the stop bar while the other thumb piece has an internal threaded socket which receives the adjacent threaded end of the stop bar, a spring arranged in the socket of the threaded thumb piece and bearing at opposite ends against the bottom of said socket and the adjacent end of the stop bar and a catch arranged on the carriage and adapted to engage with the notches or seats of said bar.

72. In a calculating machine, the combination of a carriage; a paper supporting platen mounted on said carriage; a plurality of type arranged side by side and adapted to print parallel longitudinal rows of numbers, and key operated column selecting means whereby the carriage may be shifted back and forth at will for printing in one column or another on the paper comprising parts associated with the carriage and movable in opposite direction, an actuator, and means for coupling said actuator with the reversely movable parts to move them in either direction.

73. In a calculating machine, the combination of a carriage, a paper supporting platen mounted on said carriage, a plurality of type arranged side by side and adapted to print parallel longitudinal rows of numbers, and key operated column selecting means whereby the carriage may be shifted back and forth at will for printing in one column or another on the paper comprising a rocking member associated with the carriage and having parts movable in opposite directions, an actuator, and means for coupling said actuator with the reversely movable parts to move them in either direction.

74. In a calculating machine, the combination of a carriage, a paper supporting platen mounted on said carriage, a plurality of type arranged side by side and adapted to print parallel longitudinal rows of numbers, and key operated column selecting means whereby the carriage may be shifted back and forth at will for printing in one column or another on the paper comprising a rock shaft associated with the carriage and having arms on opposite sides of its center, and means for coupling said actuator either with the arm on one side or the arm on the other side of the center of the rock shaft.

75. In a calculating machine, the combination of a carriage, a paper supporting platen mounted on said carriage, a plurality of type arranged side by side and adapted to print parallel longitudinal rows of numbers, and key operated column selecting means whereby the carriage may be shifted back and forth at will for printing in one column or another on the paper comprising a rock arm associated with the carriage, and means for holding or releasing said rock arm.

76. In a calculating machine, the combination of a carriage, a paper supporting platen mounted on said carriage, a plurality of type arranged side by side and adapted to print parallel longitudinal rows of numbers, key operated column selecting means whereby the carriage may be shifted back and forth at will for printing in one column or another on the paper comprising a rock shaft, a rock arm arranged on the rock shaft and associated with the carriage, an actuator, another rock arm arranged on the rock shaft and connected with said actuator, and a locking dog adapted to engage with one of said rock arms and hold the same and the parts connected therewith at rest or to release the same to cause them to operate.

77. In a calculating machine, the combination of a carriage, a paper supporting platen mounted on said carriage, a plurality of type arranged side by side and adapted to print parallel longitudinal rows of numbers, key operated column selecting means whereby the carriage may be shifted back and forth at will for printing in one column or another on the paper comprising a rock shaft, a rock arm arranged on the rock shaft and associated with the carriage, an actuator, another rock arm arranged on the rock shaft and connected with said actuator, a locking dog adapted to engage with one of said rock arms and hold the same and the parts connected therewith at rest or to release the same to cause them to operate, and a latch for holding said locking dog either in its operative or inoperative position.

78. In a calculating machine, the combination of a carriage, a paper supporting platen mounted on said carriage, a plurality of type arranged side by side and adapted to print parallel longitudinal rows of numbers, key operated column selecting means whereby the carriage may be shifted back and forth at will for printing in one column or another on the paper comprising a rock arm, escapement pawls mounted on said arm and adapted to co-operate with stops on the carriage, and means for holding or releasing said rock arm.

79. In a calculating machine, the combination of a carriage, a paper supporting platen mounted on said carriage, a plurality of type arranged side by side and adapted to print parallel longitudinal rows of numbers, key operated column selecting means whereby the carriage may be shifted back and forth at will for printing in one column or another on the paper comprising a rock shaft, an arm arranged on said rock shaft and associated with said carriage, coupling arms projecting from opposite sides of said rock shaft and provided with pins or shoulders, a coupling bar provided with two jaws, and means for shifting said coupling bar laterally for engaging one of its jaws with the pin of one coupling arm or its other jaw with the pin of the other coupling arm.

80. In a calculating machine, the combination of a carriage, a paper supporting platen mounted on said carriage, a plurality of type arranged side by side and adapted to print parallel longitudinal rows of numbers, key operated column selecting means whereby the carriage may be shifted back and forth at will for printing in one column or another on the paper comprising a rock shaft, an arm arranged on said rock shaft and associated with said carriage, coupling arms projecting from opposite sides of said rock shaft and provided with pins or shoulders, a coupling bar provided with two jaws, means for shifting said coupling bar laterally for engaging one of its jaws with the pin of one coupling arm or its other jaw with the pin of the other coupling arm, and a cam for vibrating said coupling bar.

81. In a calculating machine, the combination of a carriage, a paper supporting platen mounted on said carriage, a plurality of type arranged side by side and adapted to print parallel longitudinal rows of numbers, and key operated column selecting means whereby the carriage may be shifted back and forth at will for printing in one column or another on the paper comprising a rock shaft, an arm arranged on said rock shaft and associated with said carriage, coupling arms projecting from opposite sides of said rock shaft and provided with pins or shoulders, a coupling bar provided with two jaws, means for shifting said coupling bar laterally for engaging one of its jaws with the pin of one coupling arm or its other jaw with the pin of the other coupling arm, a cam, and a rock shaft having an arm engaging said cam and a rock arm connected with said coupling bar.

82. In a calculating machine, the combination of a paper carriage; a plurality of type arranged side by side and adapted to print parallel columns of numbers; and key operated column selecting means whereby the carriage may be shifted back and forth at will for printing in one column or another on the paper, said selecting means comprising a plurality of column selecting keys, and means operatively connecting said keys with said carriage and so constructed that the depression of one key causes the carriage to be shifted with one column on the paper to the printing position and the depression of another key causes the carriage to be shifted with another column on the paper to the printing position.

83. In a calculating machine, the combination of a paper carriage; a plurality of type arranged side by side and adapted to print parallel columns of numbers; and key operated column selecting means whereby the carriage may be shifted back and forth at will for printing in one column or another on the paper, said selecting means comprising a plurality of column selecting keys, means operatively connecting said keys with said carriage and so constructed that the depression of one key causes the carriage to be shifted to bring one column on the paper to the printing position and the depression of another key causes the carriage to be shifted to bring another column on the paper to the printing position, and means operating to hold the mechanism in position for printing in the column corresponding to the column selecting key last depressed.

84. In a calculating machine, the combination of a paper carriage; a plurality of type arranged side by side and adapted to print parallel columns of numbers; and key operated column selecting means whereby the carriage may be shifted back and forth at will for printing in one column or another on the paper, said selecting means comprising a rocking member associated with the carriage and having pins or shoulders on opposite sides of its center, a coupling bar having jaws adapted to be coupled with either of said pins or shoulders, respectively, by a lateral movement of said bar, a cam lever operatively connected with said coupling bar, a shifting rock arm engaging with the cam of said cam lever, and connections between said column selecting keys and said controlling rock arm.

85. In a calculating machine, the combination of a paper carriage; a plurality of type arranged side by side and adapted to print parallel columns of numbers; and key operated column selecting means whereby the carriage may be shifted back and forth at will for printing in one column or another on the paper, said selecting means comprising a rocking member associated with the carriage and having pins or shoulders on opposite sides of its center, a coupling bar having jaws adapted to be coupled with either of said pins or shoulders, respectively, by a lateral movement of said bar, a cam lever operatively connected with said coupling bar, a shifting rock arm engaging with the cam of said cam lever, connections between said column selecting keys and said controlling rock arm, and a detent operating to hold the shifting rock arm either in one or the other of its operative positions.

86. In a calculating machine, the combination of a paper carriage; a plurality of type arranged side by side and adapted to print parallel columns of numbers; and key operated column selecting means whereby the carriage may be shifted back and forth at will for printing in one column or another on the paper, said selecting means comprising a rocking member associated with the carriage and having pins or shoulders on opposite sides of its center, a coupling bar having jaws adapted to be coupled with either of said pins or shoulders, respectively, by a lateral movement of said bar, an elbow lever having one arm connected with said coupling bar, a cam lever connected by a link with the other arm of said elbow lever, a shifting rock arm engaging with the cam of said cam lever, and coupling hooks operatively connected with said column selecting keys respectively and adapted to be connected with or disconnected from said shifting rock arm.

87. In a calculating machine, the combination of a paper carriage; a plurality of type arranged side by side and adapted to print parallel columns of numbers, and key operated column selecting means whereby the carriage may be shifted back and forth at will for printing in one column or another on the paper, said selecting means comprising a plurality of column selecting keys, arranged in operative relation to said carriage, and means whereby the depression of either of said column selecting keys causes the carriage to be shifted with one column to the printing position while the other column selecting key is rendered inoperative.

88. In a calculating machine, the combination of a paper carriage; a plurality of type arranged side by side and adapted to print parallel columns of numbers; and key operated column selecting means whereby the carriage may be shifted back and forth at will for printing in one column or another on the paper, said selecting means comprising a cam lever operatively connected with the carriage, a shifting rock arm engaging with said cam lever, two column selecting keys, coupling hooks each connected with one of said keys and adapted to connect the same with the shifting rock arm, and means operating to shift each coupling hook into its inoperative position upon depressing the column selecting key corresponding to the other coupling hook.

89. In a calculating machine, the combination of a paper carriage; a plurality of type arranged side by side and adapted to print in parallel columns of numbers; and key operated column selecting means whereby the carriage may be shifted back and forth at will for printing in one column or another on the paper, said selecting means comprising a cam lever operatively connected with the carriage, a shifting rock arm engaging with said cam lever, two column selecting keys, intermediate levers each connected with one of the column selecting keys, coupling hooks pivoted on said intermediate levers, respectively, and each adapted to be engaged with or disengaged from the shifting rock arm, and links loosely connecting the intermediate lever of each column selecting key with the coupling hook of the other key.

90. In a calculating machine, the combination of an operating mechanism, means for controlling said operating mechanism, a paper carriage, means for controlling said paper carriage, a plurality of type arranged side by side and adapted to print parallel columns of numbers, and a key operatively related to said carriage controlling means and said operating mechanism controlling means and adapted when depressed to cause the operation of both of said controlling means.

91. In a calculating machine, the combination of an operating mechanism, means for controlling said operating mechanism, a paper carriage, means for controlling said paper carriage, a plurality of type arranged side by side and adapted to print parallel columns of numbers and a plurality of keys operatively related to said carriage controlling means and said operating mechanism controlling means, the construction being such that depression of one key causes the carriage to move one column of the paper to the printing position and cause the operation of the operating mechanism while the depression of another key causes the carriage to move another column of the paper to the printing position and also causes the operation of the operating mechanism.

92. In a calculating machine, the combination of an operating mechanism, means for controlling said operating mechanism, a paper carriage, means for controlling said paper carriage, a plurality of type arranged side by side and adapted to print parallel columns of numbers, and a plurality of keys operatively related to said carriage controlling means and said operating mechanism controlling means, the construction being such that depression of one key causes the carriage to move one column of the paper to the printing position and cause the operation of the operating mechanism while the depression of another key causes the carriage to move another column of the paper to the printing position and also causes the operation of the operating mechanism, the connection between each of said keys and the means for controlling the operating mechanism being slack so as to cause each of said keys to be unaffected by the depression of the other key.

93. In a calculating machine, the combination of an operating mechanism, a paper carriage, a plurality of type arranged side by side and adapted to print parallel columns of numbers, a plurality of column selecting keys operatively related to said operating mechanism and to said paper carriage, so that upon depressing one of said keys the operating mechanism is caused to operate and the carriage is caused to move with one column of the paper to the printing position while upon depressing the other key the operating mechanism is also caused to operate and the carriage is caused to move with another column of the paper to the printing position, and means whereby said keys may be rendered operative or inoperative relatively to said carriage.

94. In a calculating machine, the combination of an operating mechanism, a paper carriage, a plurality of type arranged side by side and adapted to print parallel columns of numbers, a plurality of keys, intermediate levers connected with said keys and operatively related to said operating mechanism, means for controlling said carriage and operating to move the same so as to present either one column or another of the paper to the printing position comprising a shifting arm, coupling pawls for connecting and disconnecting said intermediate levers and shifting arm, and means for rendering said coupling pawls operative or inoperative comprising a rock arm operating on the coupling pawls, and a shift key connected with said rock arm.

95. In a calculating machine, the combination of an operating mechanism, a plurality of type arranged side by side and adapted to print parallel columns of numbers, a paper carriage adapted to move one or another column on the paper to the printing position, and a key operatively related to said carriage and said operating mechanism and having a slack connection with the latter so that during the first part of the depression of the key the carriage will be set for bringing the required column on the paper to the printing position and during the last part of the depression of the key the operating mechanism will be caused to operate.

96. In a calculating machine, the combination of a key board, a printing device, a paper carriage adapted to receive two columns of numbers and normally arranged with said columns on opposite sides of the printing position and means for causing said carriage to move laterally in either direction for bringing either column thereof to the printing position.

97. In a calculating machine, the combination of a printing device, a paper supporting and feeding device comprising a platen capable of rotation for feeding the paper and movable laterally in either direction for presenting either of two columns on the paper to the printing position, a platen shifting bar, a rock lever connected with said bar, a latch having two differently located shoulders adapted to engage with a pin or shoulder on the rock lever, a platen rock arm operatively connected with the mechanism which moves the platen laterally, front and rear connected rock arms, a slack connection between the rear rock arm and said platen rock arm, and a dog mounted on said front rock arm so as to be effective when moved in one direction and ineffective when moved in the opposite direction, and a cam face on the dog adapted to engage the rock lever.

98. In a calculating machine, the combination of a printing device, a paper carriage, means for controlling said carriage so as to either present one column or alternately present each of a pair of columns to the printing position, means for feeding said carriage crosswise two columns at a time, automatic means for returning the paper from the foot to the head of the column, and a common actuating device for said column feed and paper return mechanisms.

99. In a calculating machine, the combination of a printing device, a paper carriage, means for controlling said carriage so as to either present one column or alternately present each of a pair of columns to the printing position, means for feeding said carriage crosswise one column when the printing is done in one column and two columns when the printing is done in two columns, means for returning the paper from the foot to the head of the column, and a common manipulative device for effecting said single or double column spacing and said paper return.

100. In a calculating machine, the combination of a printing device, a paper carriage, means for controlling the carriage so as to either present one column or alternately present each of two columns to the printing position, a paper feed mechanism constructed to feed the paper one space for each operation of the machine when the printing is done in one column and to prevent feeding of the paper while the carriage is moving crosswise in one direction from one column to another of a pair, and a carriage feed mechanism having parts which operate to feed the carriage one column when the printing is done in one column only and which is set by said two column paper feeding mechanism for subsequently feeding the carriage two columns.

101. In a calculating machine, the combination of a printing device, a paper carriage, a carriage feed mechanism comprising a rock shaft, a paper feed mechanism, a paper return mechanism having a rock arm, a trip arm having a slack connection with said shaft, a yielding cam arranged on said rock arm and adapted to engage with said trip arm, a latch having differential shoulders adapted to engage with said trip arm, a stop or pin arranged on the rock arm and adapted to shift said latch, and a trip lever having one arm operatively connected with said trip lever while its other arm is arranged to be engaged by the paper feed mechanism.

102. In a calculating machine, a printing device, a paper feeding device, and means for rendering said printing and paper feeding devices inoperative simultaneously or rendering said printing device solely inoperative comprising a no-print bar having a finger, a key positively connected with said bar, a rear elbow lever provided with a finger loosely engaging with the no-print bar finger, a paper feed bar connected with the rear elbow lever, and a key connected with said elbow lever.

103. In a calculating machine, the combination of a printing device, a paper carriage, controlling means whereby the movement of the carriage from one position to another transverse of the printing device may control a function of the machine when the carriage is moved in one direction, and means whereby said controlling means is rendered inoperative while the carriage is being shifted in the opposite direction.

104. In a calculating machine, a printing device, a paper carriage, tappets arranged on the carriage, function selection devices, movable members adapted to be shifted by said tappets and to operate said function selecting devices, and means for shifting said movable members out of the path of said tappets.

105. In a calculating machine, a printing device, a paper carriage, tappets arranged on the carriage, function selection devices, tappet levers adapted to be turned by said tappets and operatively connected with said function selecting devices, a movable support for said levers, a shipper rod adapted to engage said support and move the levers bodily out of the path of said tappets, and a hand lever mounted on the carriage and operatively connected with said rod.

106. In a calculating machine, the combination of a plurality of main levers, a type carrier having number type and letter type, an auxiliary lever pivoted on each main lever and having one of its arms connected by a link with the type carrier, a vibrating bar engaging with the other arm of the auxiliary lever, a rock shaft having an arm carrying said bar, and a key operatively related to said shaft.

107. In a calculating machine, the combination of a type carrier having a plurality of normally effective number type and normally ineffective letter type arranged adjacent to the number type, means for automatically printing zeros at the right of each number, a device for rendering said letter type effective, and means operable in conjunction with said device for rendering part of said automatic zero printing means inoperative.

108. In a calculating machine, the combination of a type carrier having a set of number type and a set of letter type arranged adjacent to the number type, a device for effecting printing from said letter type, a paper carriage, and means whereby the movement of the carriage renders said letter printing device operative or inoperative.

109. In a calculating machine, the combination of printing means comprising a type carrier having a plurality of number type and letter type arranged adjacent to the number type, means for automatically printing zeros at the right of each number, means for rendering part of said automatic zero printing devices inoperative, a paper carriage, and means controlled by the movement of the carriage for rendering said letter printing device inoperative and for rendering said automatic zero printing device inoperative.

110. In a calculating machine, the combination of a printing mechanism having a plurality of number setting keys, an item counting and numbering mechanism, and means for preventing the item counting and numbering mechanism from operating when the machine is operated while no number setting key is depressed.

111. In a calculating machine, the combination of a printing mechanism having a plurality of number setting keys, a counting and printing mechanism having a plurality of number wheels, an actuating pawl for said wheels, a rocking yoke and a printing hook, and means for preventing said counting and printing mechanism from operating when the machine is operated while no number key is depressed comprising a universal bar adapted to be shifted by the depression of a number key, an upper lever engaging the universal bar, and a pair of lower levers engaging with said upper lever and operatively engaging said actuating pawl and said printing hook.

112. In a calculating machine, the combination of a printing mechanism, a counting and printing mechanism comprising a plurality of number wheels, an actuating pawl for said wheels, a rocking yoke, and a printing hook adapted to engage with said yoke, a coupling link operatively connected with said actuating pawl and provided with a shoulder, a cam rock arm having a pin or shoulder engaging with the shoulder of the coupling link, a cam for shifting the cam arm, a frame and a shifting link connecting the frame with said coupling link.

113. In a calculating machine, the combination of a printing mechanism, a counting device, and means for rendering said counting device operative or inoperative comprising a cam rock arm having a pin or shoulder, a cam for actuating said rock arm, a hook operatively connected with said counting device and adapted to engage with said pin, and a key for engaging said hook and disengaging the latter from the pin or shoulder on the cam arm.

114. In a calculating machine, the combination of a counting and numbering device; a paper carriage; and means whereby the operation of the counting and numbering device is controlled by the movement of the carriage said means comprising a key operatively connected with said counting and numbering device, a slide having a slack connection with said key, a shifting lever engaging with said slide, a tappet lever operatively connected with said shifting lever, and a tappet arranged on the carriage and adapted to engage with said tappet lever.

115. In a calculating machine, the combination of a number printing mechanism; a letter printing mechanism; a platen co-operating with both of said printing mechanisms; and means for preventing the number printing mechanism from operating while the letter printing mechanism is in operation, said means comprising a universal rod operatively related to said letter printing mechanism, a rock arm carrying said rod and provided with an upwardly projecting nose, a releasing lever engaging one of its arms with said nose, and a manually operated motor releasing hook which is engaged by the end of said releasing lever.

116. In a calculating machine, the combination of number printing mechanism having type segments and an operating mechanism, a typewriting mechanism having type bars and operating keys, a platen co-operating with said type segments and bars, a carriage supporting said platen, two sets of escapement teeth arranged on said carriage, one set being widely spaced and the other narrowly spaced, number escapement dogs adapted to engage alternately with said widely spaced teeth, letter escapement dogs adapted to engage alternately with said narrowly spaced teeth, means whereby said number escapement dogs are actuated by the operating mechanism and which comprise a rock lever, means whereby said letter escapement dogs are actuated by said operating keys and which comprise a rock lever, and means whereby each of said rock levers when operated to render its respective escapement dogs operative causes the other rock lever to be also operated and render its respective dogs inoperative.

117. In a calculating machine, the combination of number printing mechanism having type segments and an operating mechanism, a typewriting mechanism having type bars and operating keys a platen co-operating with said type segments and bars, a carriage supporting said platen, two sets of escapement teeth arranged on said carriage, one set being widely spaced and the other narrowly spaced, number escapement dogs adapted to engage alternately with said widely spaced teeth, letter escapement dogs adapted to engage alternately with said narrowly spaced teeth, means whereby said number escapement dogs are actuated by the operating mechanism means whereby the letter escapement dogs are actuated by the letter keys, means whereby the letter escapement dogs are rendered inoperative when the number printing mechanism is operated, and a latch which holds the letter escapement dogs in an inoperative position while the number printing mechanism is operated and until the typewriting mechanism is again operated.

118. In a calculating machine, the combination of a number printing device, a typewriting mechanism, a platen co-operating with the number printing device and the typewriting mechanism, a carriage supporting the platen, means for locking the typewriting mechanism upon operating the number printing device, and means for releasing the typewriting mechanism upon moving the carriage.

119. In a calculating machine, the combination of a number printing device, a typewriting mechanism, a platen co-operating with the number printing device and the typewriting mechanism, a carriage supporting the platen, means for automatically advancing the carriage from one column to another, means for locking the typewriting mechanism upon operating the number printing device, and means for releasing the typewriting mechanism by the automatic carriage advancing means.

120. In a calculating machine, the combination of a number printing device, a typewriting mechanism, a platen co-operating with the number printing device and the typewriting mechanism, a carriage supporting the platen, a column feed mechanism for the carriage having a controlling key, means for locking the typewriting mechanism upon operating the number printing device, and means for releasing the typewriting mechanism by the depression of said column feed controlling key.

121. In a calculating machine, the combination of a number printing device, a typewriting mechanism, a platen co-operating with the number printing device and the typewriting mechanism, a carriage supporting the platen, a paper return mechanism having a controlling key, means for locking the typewriting mechanism upon operating the number printing device, and means for releasing the typewriting mechanism by the depression of the paper return controlling key.

122. In a calculating machine, the combination of a number printing device, a typewriting mechanism, a platen co-operating with the number printing device and the typewriting mechanism, a carriage supporting the platen, a paper feed mechanism, means for locking the typewriting mechanism upon operating the number printing device, and means for releasing the typewriting mechanism when the paper feed mechanism is operative.

123. In a calculating machine, the combination of a number printing device, a typewriting mechanism, a platen co-operating with the number printing device and the typewriting mechanism, a carriage supporting the platen, means for locking the typewriting mechanism upon operating the number printing device, and key controlled means for releasing the typewriting mechanism.

124. In a calculating machine, the combination of a number printing device, settable elements for determining the number printed, a typewriting mechanism, a platen co-operating with the number printing device and the typewriting mechanism, a carriage supporting the platen, and means controlled in part by said settable elements for preventing operation of the typewriting mechanism when the number printing device is operated with an effective stroke but which permits said typewriting mechanism to operate when the number printing device is operated with an idle stroke.

125. In a calculating machine, the combination of a number printing device, a typewriting mechanism, a platen co-operating with the number printing device and the typewriting mechanism, a carriage supporting the platen, a column space escapement for the carriage having a pair of pawls, a letter space escapement for the carriage having a pair of pawls, a column escapement lever for shifting the column escapement pawls, a letter escapement lever for shifting the letter escapement pawls, a shifting bar operatively connected with said pawl levers, a catch for holding said letter escapement lever in its operative position and adapted to be released by the forward movement of said shifting bar, and a trip device operatively connecting said bar with the typewriting mechanism.

126. In a calculating machine, the combination of a number printing device, a typewriting mechanism, a platen co-operating with the number printing device and the typewriting mechanism, a carriage supporting the platen, a column space escapement for the carriage having a pair of pawls, a letter space escapement for the carriage having a pair of pawls, a column escapement lever for shifting the letter escapement pawls, a letter escapement lever for shifting the letter escapement pawls, a shifting bar operatively connected with said pawl levers, a catch for holding said letter escapement lever in its operative position and adapted to be released by the forward movement of said shifting bar, a trip device operatively connecting said bar with the typewriting mechanism comprising an elbow lever connected with said bar and having two shoulders, and a trip dog adapted to engage with said shoulders and operatively associated with the typewriting mechanism.

127. In a calculating machine, the combination of a number printing device, a typewriting mechanism, a platen co-operating with the number printing device and the typewriting mechanism, a carriage supporting the platen, a column space escapement for said carriage associated with the adding mechanism, a letter space escapement for said carriage associated with the typewriting mechanism, a locking device for said typewriting mechanism, and operating mechanism for said number printing device, an elbow lever operatively connected with said typewriter locking device and said operating mechanism, a detent for holding said lever in the position into which it is moved during the first part of the movement of said operating mechanism, and means for releasing said detent.

128. In a calculating machine, the combination of a number printing device, a typewriting mechanism, a platen co-operating with the number printing device and the typewriting mechanism, a carriage supporting the platen, a column space escapement for said carriage associated with the number printing device, a letter space escapement for said carriage associated with the typewriting mechanism, a locking device for said typewriting mechanism, an operating mechanism for said number printing device, an elbow lever operatively connected with said typewriter locking device and said operating mechanism, a detent for holding said lever in the position into which it is moved during the first part of the movement of said operating mechanism, and means for releasing said detent comprising a shifting device controlled by a key on the typewriter keyboard and a shifting device controlled by the keys on the number printing keyboard.

129. In a calculating machine, the combination of a plurality of number printing type segments; a word printing mechanism having a plurality of type bars each of which is provided with a plurality of letter type; a platen; and means for moving said platen with its printing line either to the number printing segments or to either type of said type bars, said means comprising a shifting lever connected with the platen, a key lever, a rock arm resting on the key lever, a link connected with the rock arm, a rock shaft, an arm connecting said rock shaft with said link, and means for transmitting motion from the rock shaft to said shifting lever.

130. In a calculating machine, the combination of number printing mechanism having a number keyboard on its upper side, and number type carriers in its rear part, a typewriting mechanism associated with said number printing mechanism and having letter type carriers in rear of the number type carriers, a letter keyboard arranged in front of the number printing mechanism, operative connections between said letter keyboard and the letter type carriers arranged below the number printing mechanism, and a platen bodily shiftable in a direction parallel to its axis from a letter type impression receiving position to a number type impression receiving position.

131. In a combined adding and printing machine, the combination with a printing device comprising a carriage having a paper supporting platen and printing type for making an impression on said platen; of a machine base; a rear frame secured to said base and serving as a rear wall for said machine; a keyboard provided with controlling keys for controlling said machine; frames secured to said base for supporting said keyboard; and a cover for said machine whose front and sides engage said base, rear frame and keyboard, and which has an opening in its top for said keyboard, an opening in its rear for said rear frame, and an opening between said rear frame opening and said keyboard opening for said printing type.

132. In a combined adding and printing machine, the combination with a printing device comprising a carriage having a paper supporting platen and printing type for making an impression on said platen; of a machine base; a rear frame secured to said base and serving as a rear wall for said machine and as a support for said carriage; a keyboard provided with controlling keys for controlling said machine; frames secured to said base and to said rear wall for supporting said keyboard; and a cover for said machine whose front and sides engage said base, rear frame and keyboard, and which has an opening in its top for said keyboard, an opening in its rear for said rear frame and an opening between said rear frame opening and said keyboard opening for said printing type.

133. In a printing mechanism, the combination of a carrier, a type-supporting member supported thereby, a plurality of types supported by said member, a platen for backing a record sheet, means for controlling movement of said carrier in either of two directions from normal for presenting desired ones of said types of printing relation with said record-sheet, means for driving said member to effect printing on said record sheet by the type in operative relation therewith, and means controlled by said carrier for rendering said member driving means effective when said carrier is moved from normal position.

134. In a printing mechanism, the combination of a plurality of type-carriers arranged in denominational order, a set of numeral types mounted on each of said type-carriers and comprising types from 0 to 9, setting means for determining which of said integer types shall print, automatic means for effecting printing by the zero types of any set to the right of a set of types printing an integer under control of said setting means, a plurality of letter types mounted on each of said carriers, a key for rendering said numeral types ineffective and said letter types effective, the construction and arrangement being such that the rendering of said letter types effective automatically renders said automatic means ineffective.

135. In a printing mechanism, the combination of a plurality of sets of types, means for effecting approximate alignment of one of the types of each of a plurality of said sets, means for effecting printing by the types so aligned, and a device adapted to come into contact with said types upon operation of the second said means for effecting a more perfect alignment.

136. In a printing mechanism, the combination of a plurality of types, a carrier upon which said types are mounted and which is movable for bringing any one of said types to printing position, a differential stop member for controlling movement of said carrier and comprising a plurality of stops, a plurality of keys for controlling movement of said differential stop member, and operating mechanism for effecting movement of said differential stop member according to the control of said keys for bringing the respective stop of said member into co-operative relation to said carrier, and for effecting movement of said carrier into contact with said stop.

137. In a printing mechanism, the combination of a plurality of types, a carrier upon which said types are mounted and which is movable for bringing any one of said types to printing position, a differential stop member for controlling movement of said carrier and comprising a plurality of stops, a second stop member connected to the first stop member for controlling the same, a plurality of keys for controlling movement of said second stop member, and operating mechanism for effecting movement of said differential stop member according to the control of said second stop member as determined by said keys and for effecting movement of said carrier into contact with the positioned one of said stops.

138. In a printing mechanism, the combination of a plurality of types, a carrier upon which said types are mounted and which is movable for bringing any one of said types to printing position, a differential stop member for controlling movement of said carrier and comprising a plurality of stops, a second stop member connected to the first stop member for controlling the same, a detent for preventing movement of said second stop member and thereby preventing movement of the differential stop member, a plurality of keys for releasing said second stop member from said detent and controlling the extent of movement of said second stop member, and operating mechanism for effecting movement of said differential stop member according to the control of said second stop member as determined by said keys and for effecting movement of said carrier into contact with the positioned one of said stops.

139. In a printing mechanism, the combination of a plurality of types, a carrier upon which said types are mounted and which is movable for bringing any one of said types to printing position, a differential stop member for controlling movement of said carrier and comprising a plurality of stops, a second stop member connected to the first stop member for controlling the same, a detent for preventing movement of said second stop member and thereby preventing movement of the differential stop member, a plurality of keys for controlling the extent of movement of said second stop member, and operating mechanism for releasing said second stop member from said detent and effecting movement of said differential stop member according to the control of said second stop member as determined by said keys and for effecting movement of said carrier into contact with the positioned one of said stops.

140. In a printing mechanism, the combination of a plurality of types, a carrier upon which said types are mounted and which is movable for bringing any one of said types to printing position, a differential stop member for controlling movement of said carrier and comprising a plurality of stops, a second stop member connected to the first stop member for controlling the same, a detent device for preventing movement of said second stop member and thereby preventing movement of the differential stop member, a plurality of keys for controlling the extent of movement of said second stop member, and operating mechanism co-operative with said keys for effecting the release from said detent device of said second stop member and operable for effecting movement of said differential stop member according to the control of said second stop member as determined by said keys and for effecting movement of said carrier into contact with the positioned one of said stops.

141. In a printing mechanism the combination with a platen for backing a record sheet, of a type carrier, a plurality of types so arranged on said carrier that one of said types is normally in printing relation to said record sheet and other of said plurality of types are arranged on opposite sides of said one of said types, a normal stop against which said carrier normally stands, means for moving said carrier away from said stop for effectively positioning a type on one side of said normally effectively positioned type, means for moving said normal stop out of the path of said carrier, and means for moving the carrier from normal position toward said stop for effectively positioning a type on the other side of said normally effectively positioned type.

142. In a printing mechanism, the combination of a plurality of printing types operable to print on a record sheet, means for selecting which of said types shall print, means for restoring said selecting means to ineffective position, and a key for effecting printing by said types during one operation according to the control of said selecting means and for causing said selecting means to remain operative for effecting the same control during the next succeeding operation of said printing mechanism.

143. In a printing mechanism, the combination of a plurality of printing types operable to print on a record sheet; means operable for selecting which of said types shall print; operating mechanism for effecting printing by said types according to the control of said selecting means and for returning said selecting means to its normal null condition with respect to said printing types; and a key for effecting operation of said operating mechanism and for rendering said operating mechanism ineffective with relation to the returning of said selecting means during such operation, whereby said selecting means may exert the same control of said types during a plurality of operations of said printing mechanism and without the necessity of more than a single operation of said selecting means.

144. In a printing mechanism, the combination of a plurality of printing types operable to print on a record sheet, a manipulative member movable from normal ineffective position to effective position for selecting which of said type shall print on said record sheet, operating mechanism for effecting printing according to the control of said manipulative member and for effecting the return to normal position of said manipulative member, and a manipulative member operable for effecting operation of said operating mechanism and for rendering said operating mechanism ineffective with relation to the returning of said manipulative member to normal position.

145. In a printing mechanism, the combination of a plurality of printing types operable to print on a record sheet, a plurality of manipulative members movable from normal ineffective position to effective position for selecting which of said types shall print on said record sheet, operating mechanism for effecting printing according to the control of said manipulative members and for effecting the return to normal position of any of said manipulative members which may have been moved to effective position, and a manipulative member operable for effecting operation of said operating mechanism and for rendering said operating mechanism ineffective with relation to the returning of said manipulative members to normal position.

146. In a printing mechanism, the combination of a plurality of sets of printing types operable to print on a record sheet; a plurality of sets of manipulative members, one set of manipulative members for each of a plurality of said sets of types, each of said sets comprising a manipulative member for each of the types of its set of types, and each of said manipulative members being movable from normal ineffective position to effective position for controlling printing by its respective one of said types; operating mechanism for effecting printing according to the control of said manipulative members and for effecting the return to normal position of any of said manipulative members which may have been moved to effective position; and a manipulative member for effecting operation of said operating mechanism and for rendering said operating mechanism ineffective with relation to the returning to normal position of the manipulative members which may be in effective position in any of a plurality of said sets of manipulative members.

147. In a printing mechanism, the combination of a plurality of types each operable to print on a record sheet, a plurality of controlling elements each movable from normal ineffective position to effective position for controlling printing by a type of said plurality, locking means for holding any of said controlling elements in effective position when moved thereto, operating mechanism for operating said types to print according to the control of said controlling elements and for releasing from said locking means any of said controlling elements which may be held in effective position thereby, and a manipulative element operable for effecting operation of said operating mechanism and for rendering said operating mechanism ineffective with relation to the releasing of said controlling elements.

148. In a printing mechanism, the combination of a plurality of types each operable to print on a record sheet, a plurality of controlling elements each movable from normal ineffective position to effective position for controlling printing by a type of said plurality, locking means for holding any of said controlling elements in effective position when moved thereto, a device for effecting release from said locking means of any of said controlling elements which may be in effective position, operating mechanism for effecting operation of said types according to the control of said controlling elements and for effecting operation of said device, and a manipulative element operable for effecting operation of said operating mechanism and for rendering said operating mechanism ineffective with relation to said device.

149. In a printing mechanism, the combination of a plurality of types each operable to print on a record sheet; a plurality of controlling elements each movable from normal ineffective position to effective position for controlling printing by a type of said plurality; locking means for holding any of said controlling elements which may be in effective position; a device for effecting release from said locking means of any of said controlling elements which may be in effective position; operating mechanism operable for effecting operation of said types according to the control of said controlling elements and for effecting operation of said device, said device being normally in co-operative relation with said operating mechanism; and a manipulative element operable to effect movement of said device out of co-operative relationship with said operating mechanism and to effect operation of said operating mechanism.

150. In a printing mechanism, the combination of a plurality of printing type, operating mechanism, driving mechanism controllable by said operating mechanism and normally out of operative relation therewith and operable for effecting driving of said type to print, means for effecting operative relation between said driving mechanism and said operating mechanism, and a device for rendering the last said means ineffective and causing said driving mechanism to remain in normal position during operation of said operating mechanism.

151. In a printing mechanism, the combination of a plurality of type; of spring pressed means normally under tension; a device operable for effecting release of said means for effecting printing by said type; operating mechanism for operating said device and for storing power in said spring, said device being normally held out of co-operative relation with said operating mechanism; key-controlled means for effecting operative relation between said device and said operating mechanism; and key-controlled means for rendering the first said key-controlled means ineffective with relation to said device.

152. In a printing mechanism, the combination of a plurality of type; a carrier supporting said type and operable for bringing any of said type into printing relation with a record sheet; a driving device, driving device control means controllable by said carrier and normally held in ineffective position; operating means for effecting movement of said carrier to position said type and for effecting operation of said driving device control means to produce printing on said record sheet by the type brought into printing relation therewith; and a device for rendering said operating means ineffective with relation to said driving device control means.

153. In a printing mechanism, the combination of a type-carrier; a plurality of type mounted thereon; a plurality of keys, one key for each of a plurality of said type and each operable for controlling movement of said carrier to position its respective one of said type in printing relation to a record sheet; normally ineffective driving means operable for effecting printing by the operatively positioned one of said types; a driving means controlling device; operating means for effecting type positioning movement of said carrier according to the control of said keys, for rendering said driving means controlling device effective, and for effecting operation of said driving means; and means for maintaining said driving means controlling device in ineffective condition.

154. In a printing mechanism, the combination of a plurality of type carriers; a plurality of type mounted on each of said carriers; a plurality of sets of keys, one set of keys for each of said type carriers and each of said keys being operable for controlling the respective type carrier of its set for positioning a respective type thereof in printing relation with a record sheet; a universal printing device for effecting printing by all of said type which have been brought to printing relation with said record sheet under control of said keys, a single key operable to control a plurality of said type carriers to simultaneously bring a respective type on each of said type carriers into alignment and into printing relation with said record sheet; a universal printing device other than the first said universal printing device and operable to effect printing by the type brought to printing relation with said record sheet by said single key; operating mechanism for effecting operation of said type carriers according to the control of said keys and for effecting operation of both of said universal printing devices; and a device for rendering said operating mechanism ineffective with relation to one of said universal printing devices without rendering the same ineffective with relation to the other of said universal printing devices.

155. In a printing mechanism, the combination of a plurality of co-operatively related sets of printing type, a rotatable rod, a shouldered member mounted on said rod for longitudinal movement thereon and rotation therewith, means for moving said member lengthwise of said rod for bringing it into relation with any adjacent pair of said sets of type, and means for rotating said rod to cause said member to break the co-operative relationship between the sets of type of the pair with which it is brought into relation by the first said means.

156. In a printing mechanism, the combination of a plurality of co-operatively related sets of printing type, a device for breaking the co-operative relation between two adjacent sets of said type, a second device for breaking the co-operative relation between two adjacent sets of said type, separate setting means for determining where each of said devices shall break said co-operative relation, and common means for rendering both of said devices effective.

157. In a printing mechanism, the combination of a plurality of sets of type arranged side-by-side and each set comprising a rule type, means inter-relating said sets of type for automatically causing each of said sets of type to print with a particular one of its type when any type of a higher set is caused to operate, means for breaking the inter-relationship between any two adjacent ones of said sets of type, and a device for effecting ruling by the ruling type of all of said sets of type, said device being rendered ineffective with relation to one of the contiguous sets of type upon breaking the inter-relationship and effecting printing by another type of such set for indicating that the relationship has been broken at that place.

158. In a printing mechanism, the combination of a plurality of sets of type, each of said sets comprising ruling, zero and digital type; automatic zero mechanism whereby when a digital type is caused to print in one of said sets of type a zero type will be caused to print in each of the sets to the right thereof; splitting means whereby said automatic zero mechanism may be rendered ineffective between any two of said sets of type and whereby one of said sets of type may be prevented from bringing its ruling type to printing position; and a ruling mechanism for effecting printing by all of said ruling type when said splitting means is not effective, and for effecting printing when said splitting means is effective by the ruling type of all of the sets except such as are prevented from presenting their ruling type to the printing position, and for effecting printing by the zero type of such sets to indicate where the spliting has been done.

159. The combination in a calculating machine, of a printing-head having a plurality of types thereon, a carrier member pivotally mounted, an actuating member pivotally mounted and co-acting with said carrier for supporting said printing head in its normal position in which certain of said types are on one side and others on the other side of the printing position, means for moving said carrier in one direction from the normal position for positioning certain of the types, and means for moving said carrier in the opposite direction from the normal position for positioning other of said types.

160. In a calculating machine, the combination of a carriage provided with a platen for carrying paper and with an element for actuating the platen so as to line-space the paper; printing type; means for shifting the carriage in opposite directions and bringing it alternately into column-printing position and inter-column position and stopping it in said inter-column position; means co-operative with the carriage and type for printing a plurality of items successively in one column at the will of the operator; and means for controlling the platen actuating element so as to automatically line-space between successive prints of items in one column.

161. In a calculating machine, the combination of a carriage provided with a platen for carrying paper and with an element for actuating the platen so as to line-space the paper; printing type; means for shifting the carriage in opposite directions and bringing it alternately into column-printing position and inter-column position and stopping it in said inter-column position; means co-operative with the carriage and type for printing a plurality of items successively in one column and for printing items alternately in two columns at the will of the operator; and means for controlling the platen actuating element so as to automatically line-space between successive prints of items in one column and between two successive prints the first of which occurs in the right-hand and the second in the left-hand column.

162. In a calculating machine, the combination of a carriage provided with a platen for carrying paper and with an element for actuating the platen so as to line-space the paper; printing type; means for shifting the carriage in opposite directions and bringing it alternately into column-printing position and inter-column position and stopping it in said inter-column position; means co-operative with the carriage and type for printing a plurality of items alternately in two columns; and means for rendering the platen-actuating element ineffective between two prints the first of which occurs in the left-hand column and the second in the right-hand column.

163. The combination in a printing mechanism, of a platen, printing type mounted for movement toward the platen, means for simultaneously moving the platen toward the type and automatically rotating the platen, and a device for affecting the said means so that it moves the platen toward the type without rotating the platen.

164. The combination in a printing mechanism, of a platen, printing type mounted and arranged to move relative to the platen, means for moving the platen toward the type, means co-operating with the first said means for rotating the platen, and a hand-operated device for rendering the last said means inoperative.

165. The combination in a printing mechanism, of a carriage mounted and impelled to travel, a platen supported by the carriage, printing type correlated with the platen, a bar in association with the platen and extending in the direction of travel of the carriage, a device arranged to co-operate with said bar for moving the platen in a direction different from that in which the carriage travels, a device for rotating the platen, and means for rendering the first said device operative and inoperative for actuating the last said device.

166. The combination of a carriage arranged to travel in opposite directions, a frame supported by the carriage and arranged to move relatively to the carriage, a platen supported by the said frame, structure supported by the carriage and arranged for moving the platen relatively to said frame, a device for actuating said structure, printing type arranged to move relatively to said platen, and means for rendering the said device ineffective relatively to the said structure while the device itself remains active.

167. In a machine of the class described, printing mechanism including type elements, an operating mechanism, a record supporting device, means for moving said supporting device transversely along the line of print of said type elements, means operable by said operating mechanism for swinging said supporting device from a visible writing position to a position adjacent said type elements, means for returning said supporting device to visible writing position, and mechanism for producing a line space action on said device.

168. In a machine of the class described, printing mechanism including type elements, a record supporting device, an operating mechanism, means controlled by said operating mechanism for moving said supporting device transversely along the line of print of said type elements, means actuated by said operating mechanism for swinging said supporting device from a visible writing position to a position adjacent said type elements, means for returning said supporting device to visible writing position, mechanism actuated by said operating mechanism for producing a line space action on said device; and means for disabling said means for moving said supporting device transversely, said swinging means, and said line spacing mechanism, individually or collectively.

169. In a machine of the class described, a series of type segments mounted side by side on a single shaft, means for moving said segments in either direction from their normal position of rest, a plurality of keys, means whereby each segment is placed under control of its corresponding key when moved in one direction from normal, and means whereby a single key controls all of the segments when moved in the opposite direction from normal.

170. In a machine of the class described, a series of type segments each adjustable to present different types at the printing line, a carriage movable transversely of said segments, a paper supporting platen mounted in said carriage and movable therewith to present different portions of the platen to the type segments, means for causing an impression of selected type on the platen by an operation of the machine, and means controlled by the transverse positioning of the carriage for rendering said impression means inoperative to print from selected type.

171. In a machine of the class described, the combination of a plurality of type segments arranged in a row, a carriage supporting a platen and movable transversely of the type segments, means for causing an impression of selected type segments on said platen, connections whereby the taking of an impression from any type segment will normally cause an impression to be taken from all segments to its right, devices shiftable transversely of said type segments for determining a point at which said connections shall be disabled, and means controlled by the position of the carriage for actuating said devices to disable said connections at the predetermined point.

172. In a machine of the class described, a plurality of type carriers each adapted to be differentially adjusted, a movable carriage adapted to support a record strip, separate means for taking an impression from each adjusted type carrier upon said record strip, said means being normally inactive but each being rendered active by adjustment of its related type carrier, connections for rendering active each impression means to the right of an active impression means, means for disabling said connections at a plurality of points comprising an arbor and devices shiftable along said arbor into operative relation with any of said connections, and means controlled by said carriage for rocking said arbor.

173. In a machine of the class described, a plurality of type segments each carrying a plurality of series of designating characters; means for differentially positioning the type segments; keys for controlling the extent of movement of the segments; a paper carriage; a platen supported thereby; means for taking an impression from the type segments onto the platen, said means normally causing an impression from one series of type on the segments; means for causing the impression to be taken from the other series of type; and mechanism controlled by the position of the carriage for operating said last mentioned means.

174. In a printing mechanism a plurality of type segments adapted to print characters, a platen for backing a record sheet, a carriage supporting said platen and movable transversely to the plane of the type segments, a special printing member adapted to print consecutive numbers, means for causing said type segments and special printing member to make an impression on the record sheet backed by said platen, means for rendering said special printing member inoperative, and mechanism controlled by the carriage to operate said last mentioned means.

175. In a machine of the class described, a plurality of type carriers, a plurality of rows of settable devices for controlling said type carriers when set, means normally serving to restore said settable devices to unset position upon an operation of the machine, and means individual to and associated respectively with certain rows of said settable devices for preventing the restoration of the devices of such rows without affecting the restoration of the devices of other rows.

176. In a machine of the class described, a plurality of adjustable type carriers, a plurality of rows of settable devices for controlling the adjustment of said type carriers, means for retaining said devices when set, impression means for effecting the taking of impressions from said type carriers, means for releasing the settable devices and permitting their restoration to normal upon each operation of the machine, and means individual to and associated respectively with certain rows of said devices for preventing the restoration of the devices of such rows without affecting the restoration of the devices of other rows.

177. In a calculating machine, in combination, a plurality of type carriers arranged side-by-side each bearing the type character "zero" the digit characters 1 to 9 inclusive arranged on one side of the zero character, and a ruling type placed on the opposite side of said zero character; a plurality of stops associated respectively with said carriers and normally effective to stop said carriers with the zero character at the printing point, and means for withdrawing said stops and permitting movement of said carriers to bring the ruling type to the printing point.

178. In a calculating machine, in combination, a plurality of type carriers arranged side-by-side each bearing the type character "zero", the digit characters 1 to 9 inclusive arranged on one side of the zero character, and a ruling type placed on the opposite side of said zero character; a plurality of movable stops associated respectively with said carriers and adapted to stop said carriers with the zero character at the printing point, means for holding said carriers in engagement with said movable stops, and means for withdrawing said movable stops to permit movement of said carriers to bring the ruling type to the printing point.

179. In a calculating machine, in combination, a plurality of type carriers arranged side-by-side each bearing the type character "zero", the digit characters 1 to 9 inclusive arranged on one side of the zero character, and a ruling type placed on the opposite side of said zero character; a plurality of movable stops associated respectively with said carriers and adapted to stop said carriers with the zero character at the printing point, means for holding said carriers in engagement with said movable stops, means for withdrawing said movable stops to permit movement of said carriers to bring the ruling type to the printing point, and a fixed stop for positively stopping said carriers with the ruling type at the printing point.

180. In a calculating machine, in combination, a plurality of type carriers arranged side-by-side each bearing the type character "zero", the digit characters 1 to 9 inclusive arranged on one side of the zero character, and a ruling type placed on the opposite side of said zero character; a plurality of movable stops normally effective to stop said carriers with the zero characters at the printing point, means for differentially moving said carriers away from said stops to bring selected characters thereon to the printing point, means for restoring said carriers to their normal position in engagement with said movable stops, and means for withdrawing said movable stops and permitting movement of said carriers to bring the ruling type thereon to the printing point.

181. In a calculating machine, the combination of number printing mechanism, key mechanism for controlling said number printing mechanism comprising a plurality of rows or columns of number keys, a function controlling mechanism, a printing mechanism associated with said function controlling mechanism adapted to print characters associated with various functions, a key control for said function mechanism comprising a column of function keys adjacent said numeral keys, means for printing a special identifying character not associated with a function, control devices for said means comprising a special key not controlling a function, and means for retaining said function keys and said special key in depressed position during the operation of the machine and for releasing them at the end of the operation of the machine.

182. In a calculating machine, the combination of number printing mechanism, key mechanism for controlling said number printing mechanism comprising a plurality of rows or columns of number keys, a function controlling mechanism, a printing mechanism associated with said function controlling mechanism adapted to print characters associated with various functions, a key control for said function mechanism comprising a column of function keys adjacent said numeral keys, means for printing a special identifying character not associated with a function, control devices for said means comprising a special key not controlling a function, means for retaining said function keys and said special key in depressed position during the operation of the machine and for releasing them at the end of the operation of the machine, and means for disabling the release of said function and special keys and retaining them in depressed position for successive operations.

183. In a printing machine comprising a transversely movable carriage, the combination with the type, of a record sheet supporting platen mounted in said carriage and normally held in retracted position; means for moving said platen into position for receiving an impression from said type comprising a rocking support for said platen, an arm depending from said support, and a transversely extending bar adapted to engage said arm in any transverse position of said carriage.

184. In a printing machine comprising a transversely movable carriage, the combination with the type, of a record sheet supporting platen mounted in said carriage and normally held in retracted position; an operating mechanism, means for moving said platen to position for receiving an impression from said type comprising a rocking support for said platen, an arm depending from said support, and a transversely extending bar adapted to engage said depending arm in any position of said carriage; means actuated by said operating mechanism for shifting said bar; and means controlled by said operating mechanism for moving said type toward said platen to effect printing on the record sheet thereon while said platen is in impression receiving position.

185. In a printing machine, the combination with a type carrier adjustable to bring a selected type to a printing line, of a record sheet supporting platen normally held in a retracted position, an operating mechanism, means controlled by said operating mechanism for moving said type carrier to bring selected type to the printing line, moving said platen into position for receiving an impression from said type at the printing line, actuating said type to print on said platen and restoring said platen to normal retracted position.

186. In a printing machine, the combination of a printing device, a transversely movable carriage, a paper supporting platen upon said carriage normally held in a retracted position, a shifting device for moving the platen from said retracted position to impression receiving position, a feeding device for turning said platen forwardly and advancing the paper, operating mechanism, operating means for said paper feeding device comprising a transversely extending bar adapted to be oscillated by said operating mechanism, and means associated with said platen adapted for operative engagement with said bar in any position of said carriage.

187. In a printing machine, the combination of a printing device, a transversely movable carriage, a paper supporting platen carried by said carriage, a shifting device for moving the platen toward and from printing position, a feeding device associated with said platen for turning said platen forwardly and advancing the paper, operating means for said feeding device comprising a transversely extending bar adapted for operative engagement with said feeding device in any position of said carriage, means for actuating said bar to cause paper feeding, and means for displacing said bar out of operative relation with said feeding device.

188. In a printing machine, the combination of a printing device, a paper supporting platen normally held in a retracted position, a shifting device for moving said platen from retracted position to impression receiving position, a paper feeding device for turning said platen forwardly and advancing the paper as said platen is moved to impression receiving position, an operating mechanism, means for actuating said platen shifting device and said paper feeding device comprising an element adapted to be oscillated by said operating mechanism, and means for displacing said oscillating element out of operative relation with said paper feeding device while maintaining it in operative relation with said platen shifting device.

189. In a printing machine, the combination of a printing device, a paper supporting platen normally held in a retracted position, a shifting device for moving said platen from retracted position to impression receiving position, a paper feeding device for turning said platen forwardly and advancing the paper as said platen is moved to impression receiving position, an operating mechanism, means for actuating said platen shifting device and said paper feeding device comprising an element adapted to be oscillated by said operating mechanism, and means for displacing said oscillating element out of operative relation with said paper feeding device and said platen shifting device.

190. In a printing machine, the combination of a printing device, a transversely movable carriage, a paper supporting platen carried by said carriage and normally held in a retracted position, means for shifting said platen from such retracted position to an impression receiving position, means for rotating said platen forwardly and advancing the paper as said platen is moved to impression receiving position, an operating mechanism, means for actuating said platen shifting device and said paper feeding device comprising a transversely extending bar adapted to be oscillated by said operating mechanism, said platen shifting device and said paper feeding device comprising elements located in position to be actuated by said transversely extending oscillating bar in any position of the carriage.

191. In a printing machine, the combination of a platen, means for turning said platen forwardly, a pinion operatively connected with said platen, a gear wheel meshing with said pinion, a return spring connected with said gear wheel and adapted to be wound up during the forward turning movement of said platen, a detent pawl engaging with said pinion, a releasing device for disengaging said pawl from said pinion, a control element adapted to be displaced by a predetermined forward movement of said platen, and means for actuating said pawl releasing device upon the restoration of said element to its initial position.

192. In a printing machine, the combination of a platen, means for turning said platen forwardly, a pinion operatively connected with said platen, a gear wheel meshing with said pinion, a return spring connected with said gear wheel and adapted to be wound up during the forward turning movement of said platen, a detent pawl engaging with said pinion, a releasing device for disengaging said pawl from said pinion, a controlling key, means for shifting said key after a predetermined forward turning movement of said platen, and means for actuating said pawl releasing device upon the restoration of said key to its initial position.

193. In a printing machine, the combination of a platen, means for turning said platen forwardly, a pinion operatively connected with said platen, a gear wheel meshing with said pinion, a return spring connected with said gear wheel and adapted to be wound up during the forward turning movement of said platen, a detent pawl engaging with said pinion, a releasing device for disengaging said pawl from said pinion, a controlling key, a latching device for said controlling key, means for actuating said latching device to release said key after a predetermined forward turning movement of said platen, and means for actuating said pawl releasing device by a subsequent movement of said key.

194. In a calculating machine, the combination with a travelling carriage, a spring-operated means normally subject to automatic operation by the carriage whenever the latter is in a predetermined position but being otherwise unaffected by the carriage, said means controlling the performance of an operation of the machine, and a manually operable key also adapted to control the same operation as that controlled by the carriage, control by the carriage and by the key being without dependence on each other and without interference.

195. In a calculating machine having a travelling carriage, the combination with means for directly controlling the performance of an operation of the machine, said means being arranged to be automatically actuated by the carriage when the carriage is in a given position or positions but otherwise unaffected by the carriage, of a normally inoperative manually operable key adapted for use at will to control the same operation of the machine through the medium of the aforesaid means when the carriage is in other positions than those aforesaid, the aforesaid means for controlling the performance of an operation of the machine always being conditioned for operation either by the carriage or the key, the carriage and the key also being non-interfering and, respectively, unaffecting each other when exercising their control of the aforesaid means.

196. In a calculating machine having a travelling carriage, the combination with means normally conditioned to be adapted for operation by the carriage when the latter is in a given position or positions and also for automatic restoration to normal position when the carriage has moved to another position, said means controlling the performance of an operation of the machine, of a manually operable key also adapted for controlling the performance of the same operation of the machine as controlled by the aforesaid means, said key being unaffected by the carriage and likewise unaffecting of the operation of said means by the carriage and being normally free of control by said means so that the said means may automatically restore itself to normal position when released by the carriage, the aforesaid key being adapted for use at will to effect the performance of the aforesaid operation of the machine, the aforesaid means for controlling the performance of an operation of the machine always being conditioned for operation either by the carriage or by the key.

197. In a calculating machine, the combination of number printing type, a word printing mechanism having a plurality of sets of letter type, a platen normally located to receive an impression from one set of letter type, means for moving said platen bodily in a direction parallel to its axis to a second position for receiving an impression from another set of letter type, and means for similarly moving said platen to a third position to receive impressions from said number printing type.

198. In a machine of the character described, in combination, type carriers provided with type, a record medium supporting platen, an inking ribbon, and a pair of inking ribbon carrying spools; a unitary frame guiding said type carriers and inking ribbon and supporting said inking ribbon spools, said frame comprising side plates forming lateral guides for said ribbon, a set of rods extending between said side plates and forming guides for directing said ribbon from one of said spools to the other and between said type and said platen, spindles extending between said side plates and supporting said ribbon spools, a second set of rods extending between said side plates, and type carrier guides supported on said second set of rods.

199. In a machine of the character described, the combination of a plurality of number printing devices, a plurality of banks of number keys, means comprising a plurality of levers pivoted on a common shaft whereby the number keys of each bank control one of said number printing devices, a character printing device located at the right of said number printing devices, a plurality of shifting keys located at the left of said number keys, and means comprising a lever and a bail pivoted on said shaft whereby said shifting keys control said character printing device to cause the printing thereby of characters associated with said shifting keys respectively.

200. In a machine of the character described, in combination an impression receiving platen; a type carrier bearing the type character "zero" (0), the digit characters 1 to 9 inclusive placed on one side of said zero, and a special type character placed on the opposite side of said zero; said type carrier being normally positioned with the zero character thereon in position to print on said platen when actuated; means for actuating the type character at the printing position to print on said platen, said means being normally ineffective when said type carrier is in normal position; and devices for rendering said type actuating means effective when said type carrier is displaced in either direction to bring either a digit character or said special character to the printing position.

201. In a machine of the character described, in combination, an impression receiving platen; a type carrier bearing the type character "zero" (0), the digit characters 1 to 9 inclusive placed on one side of said zero, and a ruling type placed on the opposite side of said zero; said type carrier being normally positioned with the zero character thereon in position to print on said platen when actuated; means for actuating said type carrier to cause the type thereon which is in printing position to print on said platen when actuated; said means being normally ineffective when said type carrier is in normal position; and devices for rendering said type actuating means effective when said type carrier is displaced in either direction to bring either a digit character or said ruling type to the printing position.

202. In a machine of the character described, in combination, an impression receiving platen; a type carrier bearing the type character "zero" (0), the digit characters 1 to 9 inclusive placed on one side of said zero, and a special type character placed on the opposite side of said zero; said type carrier being normally positioned with the zero character thereon in position to print on said platen when actuated; means for actuating the type character at the printing position to print on said platen, said means being normally ineffective when said type carrier is in normal position; and devices for rendering said type actuating means effective when said type carrier is displaced in either direction to bring either a digit character or said special character to the printing position, said devices comprising a dog movable with said carrier, a dog operating device, and cooperating parts on said dog and operating device adapted to be brought into operative relation when said dog is displaced in either direction from normal position.

203. In a printing machine comprising a paper supporting platen, an operating mechanism, and a controlling means for said operating mechanism comprising a pivoted lever; in combination, means for rotating said paper supporting platen by steps, and means for blocking the movement of said operating mechanism controlling lever, said means being automatically actuated when said platen has rotated a predetermined number of steps.

204. In a printing machine comprising a paper supporting platen, an operating mechanism, and a controlling means for said operating mechanism comprising a pivoted lever; in combination, means for rotating said paper supporting platen by steps, and means for blocking the movement of said operating mechanism controlling lever, said means being automatically actuated when said platen has rotated a predetermined number of steps, and a shifting device for moving said blocking means out of operative relation to said operating mechanism controlling lever.

205. In a calculating machine, the combination of a spring propelled paper carriage, a platen mounted on the carriage and adapted to support the paper, a plurality of type arranged side by side and adapted to print parallel rows of numbers, means for rotating the platen, a paper return key and connections therefrom, a tabulator key and connections therefrom, an escapement device operating means adapted for actuation by both said paper return key connections and said tabulator key connections, and a platen return mechanism adapted for actuation by said paper return key connections.

206. In a calculating machine comprising a frame, a platen supporting paper carriage mounted for movement on said frame, and a printing mechanism adapted to cooperate with said platen; in combination, means for locating said carriage in any one of a plurality of positions with respect to said frame comprising a plurality of position determining stops associated with said carriage and having a certain spacing, an escapement mechanism mounted on said frame and comprising pawls adapted to cooperate with said carriage stops, and a supplemental carriage position determining means comprising a stop bar mounted on said frame and having carriage position determining elements spaced differently from the stops on said carriage, and a device mounted on and movable with said carriage adapted to cooperate with said carriage position determining elements.

207. In a calculating machine comprising a frame, a platen supporting paper carriage mounted for movement on said frame, and a printing mechanism adapted to cooperate with said platen; in combination, means for locating said carriage in any one of a plurality of positions with respect to said frame comprising a plurality of carriage position determining stops mounted for movement with said carriage and having a certain spacing, an escapement mechanism mounted on said frame and comprising pawls adapted to cooperate with said carriage stops, a supplemental carriage position determining means comprising a bar mounted on said frame and having therein a plurality of carriage position determining notches spaced differently from the stops on said carriage, and a catch on said carriage adapted to enter any of said notches.

208. In a calculating machine comprising a frame, a platen supporting paper carriage mounted for movement on said frame, and a printing mechanism adapted to cooperate with said platen; in combination, means for locating said carriage in any one of a plurality of positions with respect to said frame comprising a plurality of carriage position determining stops mounted for movement with said carriage and having a certain spacing, an escapement mechanism mounted on said frame and comprising pawls adapted to cooperate with said carriage stops, a supplemental carriage position determining means comprising a bar rotatably mounted on said frame and provided with a plurality of carriage position determining notches spaced differently from the stops on said carriage, a catch on said carriage adapted to enter any of said notches, the arrangement being such that rotation of said bar effects the disengagement of said catch from any of said notches.

209. In a printing machine comprising a paper carriage, a plurality of type arranged side-by-side and adapted to print parallel columns of numbers on the paper in said paper carriage; in combination, an operating mechanism adapted to position selected type for printing, to cause printing movement of the selected type, and to shift said carriage relative to said type; and a plurality of keys each adapted to initiate the movement of said operating mechanism, one of said keys being effective to move the carriage to bring one column to printing position and the other of said keys being effective to move the carriage to bring another column to printing position.

210. In a printing machine comprising a paper carriage, a plurality of type arranged side-by-side and adapted to print parallel columns of numbers on the paper in said paper carriage; in combination, an operating mechanism adapted to position selected type for printing, to cause printing movement of the selected type, and to shift said carriage relative to said type; operating mechanism controlling means; a carriage shifting mechanism; a plurality of keys and intermediate levers connected with said keys respectively; means for selectively connecting said keys with said carriage shifting mechanism to cause different movements of said carriage; and loose connections from each of said intermediate levers to said operating mechanism controlling means.

211. In a printing machine, the combination of a paper carrying platen, a printing device cooperating with said platen, means for moving said platen transversely of said printing device for presenting either of two columns of the paper to printing position, means for line spacing said platen comprising an arm associated therewith and a pivoted member adapted to engage and actuate said arm, and means for moving said pivoted member out of operative relation to said arm when said platen is moved to present one of said two columns to printing position.

212. In a printing machine, the combination of a paper carrying platen, a printing device cooperating with said platen, means for moving said platen transversely of said printing device for presenting either of two columns of the paper to printing position, means for line spacing said platen comprising an arm associated therewith and a pivoted member adapted to engage and actuate said arm, means operating when said platen moves to one columnar position to move said pivoted member out of operative relation to said arm, and means for retaining said pivoted member in inoperative position.

213. In a printing machine, the combination of a paper carrying platen, a printing device cooperating with said platen, means for shifting said platen transversely of said printing device for presenting either of two columns of the paper to printing position, normally effective line spacing mechanism, means for disabling said line spacing mechanism when said platen is shifted to one columnar position comprising an operating element moved into and out of engagement with said line spacing mechanism during the shifting movement of the platen, a latch for retaining said line spacing mechanism ineffective, and means for disabling said latch and rendering said line spacing mechanism effective during the first subsequent printing operation.

214. In a printing machine, the combination of a printing device, a paper carriage, means for locating said paper carriage relative to said printing device comprising a row of spaced stops and an escapement device cooperating therewith, means for causing said carriage while controlled by one of said stops to continuously present a single column or to alternately present each of two columns to the printing device, and a carriage feed mechanism operating to shift the control of the carriage from one stop to the adjacent stop in single column printing and to the second stop in two column printing.

215. In a printing machine, the combination of a printing device, a paper carriage, means for locating said paper carriage relative to said printing device comprising a row of spaced stops and an escapement device cooperating therewith, means for causing said carriage while controlled by one of said stops to continuously present a single column or to alternately present each of two columns to the printing device, and a carriage feed mechanism comprising a single key adapted when manipulated to shift the control of the carriage from one stop to the adjacent stop in single column printing and to the second stop in two column printing.

216. In a printing machine, the combination of a printing device, a paper carriage, means for locating said paper carriage relative to said printing device comprising a row of spaced stops and an escapement device cooperating therewith, a manipulative device operable by a single manipulation to shift the control of said carriage from one of said stops past the adjacent stop and to the second stop.

217. In a printing machine, in combination, a paper feeding device, a paper feed disabling mechanism, a print disabling device, a manipulative device and operative connections therefrom to said print disabling device, and a key and operative connections from said key to both said print disabling device and said paper feed disabling mechanism.

218. In a printing machine, a plurality of main levers; a plurality of type carriers supported on said plurality of main levers, each of said type carriers having thereon a plurality of numeral type and a plurality of letter type interspersed with said numeral type; means for individually and differentially adjusting said main levers to bring any desired numeral type thereon to the printing point; means for simultaneously actuating the type carriers to cause printing by the type at the printing point; and means for simultaneously shifting said type carriers on said main levers to bring letter type instead of numeral type to the printing point.

219. In a printing machine, a plurality of main levers; a plurality of type carriers supported on said plurality of main levers, each of said type carriers having thereon a plurality of numeral type and a plurality of letter type interspersed with said numeral type; means for individually and differentially adjusting said main levers to bring any desired numeral type thereon to the printing point; means for simultaneously actuating the type carriers to cause printing by the type at the printing point; and means for simultaneously shifting said type carriers on said main levers to bring letter type instead of numeral type to the printing point, said shifting means comprising an auxiliary lever pivoted on each main lever and connected with a type carrier, and a device for rocking said auxiliary levers about their pivots on said main levers.

220. In a printing machine comprising an item printing mechanism having printing segments, an item counting and numbering mechanism adapted to count and number the items printed and comprising a set of printing wheels; in combination, means for bodily moving said item printing segments to take an impression therefrom, and means for bodily moving said set of printing wheels simultaneously with said segments to take an impression therefrom.

221. The combination of a printing mechanism, an operating mechanism therefor, means for controlling said printing mechanism to cause the same to print items when operated by said operating mechanism, a counting mechanism operable by said operating mechanism to count the items printed, devices for causing said printing mechanism to print a line, and means under control of said devices for preventing the operation of said counting mechanism by said operating mechanism when said line is printed.

222. The combination of a printing mechanism, an operating mechanism therefor, means for controlling said printing mechanism to cause the same to print items when operated by said operating mechanism, a counting and printing mechanism operable by said operating mechanism to count and number the items printed, devices for causing said printing mechanism to print a line, and means under control of said devices for preventing the operation of said counting and printing mechanism by said operating mechanism when said line is printed.

223. In a printing machine, in combination, a set of item printing type, a carriage supporting a platen adapted for cooperation with said type and movable transversely thereof, a counting device adapted to count the items printed on said platen by said type, and means for controlling said counting device by the movement of said carriage.

224. In a printing machine, in combination, a set of item printing type, a carriage supporting a platen adapted for cooperation with said type and movable transversely thereof, a counting and numbering device adapted to count and number the items printed on said platen by said type, and means for controlling said counting and numbering device by the movement of said carriage.

225. In a printing machine, the combination of a number printing mechanism comprising an operating device, a letter printing mechanism comprising a plurality of levers, means actuated by the displacement of one of said levers for disabling said operating device, and means actuated by said operating device for blocking the movement of said levers.

226. In a printing machine, the combination of a number printing mechanism comprising an operating device, a letter printing mechanism comprising a plurality of levers, a platen co-operating with both of said printing mechanisms, and means actuated by said operating device for preventing the operation of the letter printing levers when the number printing mechanism is in operation.

227. In a printing machine, the combination of a number printing mechanism comprising an operating device and controlling means therefor, a letter printing mechanism comprising a lever, a platen co-operating with both of said printing mechanisms, and means actuated by said lever for disabling said controlling means.

228. In a printing machine comprising a set of simultaneously operable number printing type, a set of number type controlling keys, a set of individually operable letter printing type and a set of letter type actuating keys; in combination, a column space escapement comprising co-operating stops and a pawl so arranged as to remain in engagement with one of said stops during the operation of printing one or more numbers by said number printing type, a letter space escapement, and connections whereby actuation of any of said letter keys disengages the column space escapement pawl from its stop.

229. In a printing machine comprising a set of simultaneously operable number printing type, a set of number type controlling keys, a set of individually operable letter printing type and a set of letter type actuating keys; in combination, a column space escapement, means for controlling said column space escapement operable in conjunction with said number printing type, a letter space escapement comprising a rack and a pair of pawls co-operating with said rack, an actuating device for said pawls, connections from said actuating device whereby actuation of any of said letter keys causes said pawls to alternately engage said rack, and connections from said actuating device to said column space escapement controlling means whereby actuation of said column space escapement operates said actuating device to disengage both letter space escapement pawls from said rack.

230. In a printing machine, the combination of number printing mechanism, a typewriting mechanism comprising letter keys, a platen co-operating with the number printing and typewriting mechanisms, a carriage supporting said platen, a column space escapement for the carriage comprising parts which remain in carriage holding position during the operation of printing numbers, a letter space escapement for the carriage, and means whereby the column space escapement is rendered inoperative and the letter space escapement is rendered operative by the actuation of any of said letter keys.

231. In a printing machine, in combination, a plurality of type carriers arranged side-by-side, each carrier bearing a set of numeral type and certain of said carriers bearing a set of letter type arranged alternately with said numeral type; means comprising a row of numeral keys associated with each of said carriers for controlling the selection of particular numeral type thereon; key controlled means for shifting the carriers which bear letter type to select said letter type instead of the numeral type; and a platen for receiving impressions from all of the type thus selected.

232. In a printing machine, in combination, a plurality of type carriers arranged side-by-side, each carrier bearing a set of numeral type and certain of said carriers bearing a set of letter type arranged alternately with said numeral type, supporting arms for said carriers, means comprising a row of numeral keys associated with each of said supporting arms for controlling numeral type selecting movement thereof, and means for shifting the carriers comprising letter type relative to their supporting arms for selecting the letter type thereon.

233. In a printing machine, the combination of a platen normally held in a retracted position, printing type, means for advancing said platen from said retracted position into position for receiving an impression from said printing type, means for moving said type toward said platen to print thereon, means for automatically rotating the platen as an incident to its movement to and from impression receiving position, and a manually controlled device for rendering the last-named means inoperative.

234. In a printing machine, in combination, printing type, a transversely movable platen adapted to support a record sheet in position to receive impressions from said type, operating mechanism, line space mechanism and escapement mechanism for said platen operable in and by a single operation of said operating mechanism; means for selectively disconnecting said line space mechanism and said escapement mechanism from said operating mechanism to cause line spacing exclusively or tabulating exclusively for a series of operations at the will of the operator.

235. In a printing machine, in combination, a plurality of type carriers and type carrier controlling mechanism, a carriage movable transversely of said type carriers, a plurality of function controlling tappets mounted on said carriage, a plurality of levers adapted for actuation by said tappets respectively as said tappets engage said levers in the transverse movement of said carriage, means constantly tending to move said carriage in one direction, devices for returning said carriage in the opposite direction, and means controlled by said carriage returning devices for shifting said levers out of operative relation to said tappets during the return movement of said carriage.

236. In a printing machine, in combination, a paper carriage, a platen mounted thereon and adapted to support a record medium, means for moving said carriage transversely, an operating mechanism, means for feeding said record medium on said platen comprising a bail actuated by said operating mechanism and a co-operating lever associated with said platen, and carriage controlled means for shifting said bail out of operative relation with said lever, thereby disabling said feeding means.

237. In a printing machine, in combination, a transversely movable carriage, means mounted on said carriage for supporting a record sheet, means for shifting said carriage transversely from one columnar position to another, an operating mechanism, means for line spacing said record sheet comprising a bail actuated by said operating mechanism and a co-operating lever associated with said carriage, means for shifting said bail out of operative relation with said lever to disable said line spacing means, and a tappet for actuating said line spacing means when brought into engagement therewith by the transverse movement of said carriage.

238. In a calculating machine, the combination of a differentially movable carrier, a type bar having a head supporting a row of type, a two-armed rock lever having one of its arms connected with said type bar, a cam arm, a cam face on said cam arm adapted to engage the second arm of said rock lever to move the type bar toward the printing position, and a second cam face on said cam arm adapted to engage the second arm of said rock lever to move the type bar away from the printing position.

239. In a calculating machine; the combination of a frame; a paper carriage mounted for movement on said frame; a printing mechanism; means for moving said carriage transversely of said printing mechanism by steps; and means for controlling the length of the steps of movement of said carriage comprising a stop plate detachably secured to said carriage, a plurality of sets of stops carried by said stop plate, the spacing of the stops of each of said sets differing from the spacing of the stops of any other of said sets, a single pair of escapement pawls adapted to engage with the stops of any of said sets, and means for bringing the stops of any of said sets into cooperative relation with said single pair of escapement pawls.

WILLIAM S. GUBELMANN.